(12) United States Patent
Yamashita et al.

(10) Patent No.: US 12,031,606 B2
(45) Date of Patent: Jul. 9, 2024

(54) SHOCK ABSORBER

(71) Applicant: Hitachi Astemo, Ltd., Ibaraki (JP)

(72) Inventors: Mikio Yamashita, Hitachinaka (JP); Takamasa Kotani, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 380 days.

(21) Appl. No.: 17/620,781

(22) PCT Filed: Mar. 25, 2020

(86) PCT No.: PCT/JP2020/013424
§ 371 (c)(1),
(2) Date: Dec. 20, 2021

(87) PCT Pub. No.: WO2020/261683
PCT Pub. Date: Dec. 30, 2020

(65) Prior Publication Data
US 2022/0412428 A1  Dec. 29, 2022

(30) Foreign Application Priority Data

Jun. 26, 2019  (JP) ................................ 2019-118696

(51) Int. Cl.
*F16F 9/512* (2006.01)
*F16F 9/19* (2006.01)
(Continued)

(52) U.S. Cl.
CPC ............... *F16F 9/512* (2013.01); *F16F 9/19* (2013.01); *F16F 9/348* (2013.01); *F16F 9/516* (2013.01);
(Continued)

(58) Field of Classification Search
CPC .... F16F 9/512; F16F 9/19; F16F 9/348; F16F 9/516; F16F 9/065; F16F 13/007;
(Continued)

(56) References Cited

U.S. PATENT DOCUMENTS 5,129,488 A * 7/1992 Furuya ................ F16F 9/5126
188/317
5,386,892 A * 2/1995 Ashiba ................ F16F 9/512
188/322.22

(Continued)

FOREIGN PATENT DOCUMENTS

JP          02041666 B2   9/1990
JP          201353683 A   3/2013
(Continued)

OTHER PUBLICATIONS

Written Opinion received in corresponding International Application No. PCT/JP2020/013424 mailed Jun. 9, 2020.
(Continued)

*Primary Examiner* — Robert A. Siconolfi
*Assistant Examiner* — James K Hsiao
(74) *Attorney, Agent, or Firm* — MATTINGLY & MALUR, PC

(57) ABSTRACT

Disclosed is a shock absorber including: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows due to movement of the piston; a first damping force generating mechanism which is provided in the first passage and generates a damping force; and a second damping force generating mechanism which is provided in the second passage and generates a damping force. The second damping (Continued)

force generating mechanism includes a sub valve provided on one side of the second passage, and a volume variable mechanism that changes a volume of a volume chamber provided in parallel with the second passage.

13 Claims, 23 Drawing Sheets

(51) Int. Cl.
  *F16F 9/34* (2006.01)
  *F16F 9/348* (2006.01)
  *F16F 9/516* (2006.01)
  *F16F 9/06* (2006.01)
  *F16F 13/00* (2006.01)
(52) U.S. Cl.
  CPC ............. *F16F 9/065* (2013.01); *F16F 13/007* (2013.01); *F16F 2222/12* (2013.01); *F16F 2228/066* (2013.01); *F16F 2232/08* (2013.01); *F16F 2234/02* (2013.01)
(58) Field of Classification Search
  CPC ............. F16F 2222/12; F16F 2228/066; F16F 2232/08; F16F 2234/02; F16F 9/18; F16F 9/34; F16F 9/465
  See application file for complete search history.

(56) References Cited

U.S. PATENT DOCUMENTS

| | | | | |
|---|---|---|---|---|
| 5,655,633 | A * | 8/1997 | Nakadate | F16F 9/467 188/266.6 |
| 8,978,845 | B2 * | 3/2015 | Kim | F16F 9/5126 188/313 |
| 9,086,111 | B2 * | 7/2015 | Kim | F16F 9/34 |
| 9,261,160 | B2 * | 2/2016 | Lee | F16F 9/5126 |
| 9,488,244 | B2 * | 11/2016 | Mizuno | F16F 9/3482 |
| 9,834,054 | B2 * | 12/2017 | Teraoka | F16F 9/5126 |
| 10,619,694 | B2 * | 4/2020 | Yamashita | F16F 9/19 |
| 11,761,508 | B2 * | 9/2023 | Conti | F16F 9/34 188/266.2 |
| 2011/0147147 | A1 * | 6/2011 | Murakami | F16F 9/464 188/314 |
| 2012/0234639 | A1 * | 9/2012 | Teraoka | F16F 9/5126 188/280 |
| 2012/0312648 | A1 * | 12/2012 | Yu | F16F 9/5126 188/280 |
| 2013/0020158 | A1 * | 1/2013 | Park | F16F 9/34 188/280 |
| 2013/0048451 | A1 * | 2/2013 | Yamashita | F16F 9/5126 188/280 |
| 2013/0140117 | A1 * | 6/2013 | Yu | F16F 9/5126 188/280 |
| 2014/0048365 | A1 | 2/2014 | Kim | |
| 2014/0262654 | A1 * | 9/2014 | Roessle | F16F 9/46 188/315 |
| 2015/0276005 | A1 * | 10/2015 | Kim | F16F 9/348 188/317 |
| 2016/0288604 | A1 | 10/2016 | Teraoka et al. | |
| 2018/0245660 | A1 * | 8/2018 | Yamashita | F16F 9/34 |

FOREIGN PATENT DOCUMENTS

| | | |
|---|---|---|
| JP | 2015-59621 A | 3/2015 |
| JP | 2018-105378 A | 7/2018 |

OTHER PUBLICATIONS

International Search Report received in corresponding International Application No. PCT/JP2020/013424 mailed Jun. 9, 2020.
Written Opinion received in corresponding International Application No. PCT/JP2020/013434 mailed Jun. 9, 2020.
1 Japanese Office Action received in corresponding Japanese Application No. 2022-172244 dated Jan. 30, 2024.
Indian Office Action received in corresponding Indian Application No. 202117059103 dated Jun. 29, 2022.

* cited by examiner

SHOCK ABSORBER

TECHNICAL FIELD

The present invention relates to a shock absorber.

Priority is claimed on Japanese Patent Application No. 2019-118696, filed Jun. 26, 2019, the content of which is incorporated herein by reference.

BACKGROUND ART

In some shock absorbers, two valves are opened in the same stroke (see, for example, Patent Literature 1).

CITATION LIST

Patent Literature

[Patent Literature 1]
Japanese Examined Patent Application, Second Publication No. H2-41666

SUMMARY OF INVENTION

Technical Problem

With the two valves which are opened in the same stroke, it is possible to open one valve without opening the other valve in a region in which a piston speed is low and to open both valves in a region in which the piston speed is higher than that in the region in which the piston speed is low. In such a structure, abnormal noise may be generated especially at the time of high frequency input.

An object of the present invention is to provide a shock absorber capable of suppressing the generation of abnormal noise.

Solution to Problem

An aspect of the present invention includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows due to movement of the piston; a first damping force generating mechanism which is provided in the first passage and generates a damping force; and a second damping force generating mechanism which is provided in the second passage and generates a damping force. The second damping force generating mechanism includes a sub valve provided on one side of the second passage, and a volume variable mechanism that changes a volume of a volume chamber provided in parallel with the second passage.

Another aspect of the present invention includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows due to movement of the piston; a first damping force generating mechanism which is provided in the first passage and generates a damping force; and a second damping force generating mechanism which is provided in the second passage and generates a damping force. The second damping force generating mechanism includes one side sub valve provided on one side of a valve seat member passage portion provided in a valve seat member of the second passage, and a bottomed tubular cap member provided between the piston and the valve seat member in the second passage. The valve seat member is provided in the cap member, and the one side sub valve is provided in a cap chamber between a bottom portion of the cap member and the valve seat member. In the second passage, an orifice is disposed on an upstream side or a downstream side from the one side sub valve in flow by which the one side sub valve is opened. In a region in which a piston speed is low, the one side sub valve is opened in a state in which a valve of the first damping force generating mechanism is closed. In a speed region in which the piston speed is higher than that in the region in which the piston speed is low, the valve of the first damping force generating mechanism and the one side sub valve are both opened. A communication passage communicating with one chamber is formed at the bottom portion of the cap member. In the cap chamber, between the one side sub valve and the bottom portion of the cap member, a movable moving member is provided. A volume variable mechanism is further provided between the moving member and the one side sub valve, wherein the volume variable mechanism is formed with an intermediate chamber whose volume is changed by movement of the moving member.

Still another aspect of the present invention includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows from the chamber on an upstream side to the chamber on a downstream side in the cylinder due to movement of the piston; a first clamping force generating mechanism which is provided in the first passage formed in the piston and generates a clamping force; and a second clamping force generating mechanism which is provided in an annular valve seat member disposed in one of the two chambers, is provided in the second passage which is parallel to the first passage, and generates a clamping force. The second clamping force generating mechanism includes a first sub valve provided on one side of a valve seat member passage portion provided in the valve seat member of the second passage and a second sub valve provided on the other side thereof, and a bottomed tubular cap member provided between the piston and the valve seat member in the second passage. The valve seat member is provided in the cap member, the first sub valve is provided in the one chamber, and the second sub valve is provided in a cap chamber between a bottom portion of the cap member and the valve seat member. In the second passage, an orifice is disposed on an upstream side or a downstream side from the first sub valve in flow by which the first sub valve is opened. In a region in which a piston speed is low, a valve of the second clamping force generating mechanism is opened in a state in which a valve of the first clamping force generating mechanism is closed. In a speed region in which the piston speed is higher than that in the region in which the piston speed is low, the valve of the first clamping force generating mechanism and the valve of the second clamping force generating mechanism are both opened. A communication passage communicating with the one chamber is formed at the bottom portion of the cap member. In the cap chamber, between the second sub valve and the bottom portion of the cap member, a flexible member that closes the communication passage is provided. An intermediate chamber of which communication with the communication passage is blocked by the flexible member is formed between the flexible member and the second sub valve.

Still another aspect of the present invention includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows from the chamber on an upstream side to the chamber on a downstream side in the cylinder due to movement of the piston; a first clamping force generating mechanism which is provided in the first passage formed in the piston and generates a clamping force; and a second clamping force generating mechanism which is provided in an annular valve seat member disposed in one of the two chambers, is provided in the second passage which is parallel to the first passage, and generates a clamping force. The second clamping force generating mechanism includes a first sub valve provided on one side of a valve seat member passage portion provided in the valve seat member of the second passage, and a bottomed tubular cap member provided between the piston and the valve seat member in the second passage. The valve seat member is provided in the cap member, and the first sub valve is provided in the one chamber. In the second passage, an orifice is disposed on an upstream side or a downstream side from the first sub valve in flow by which the first sub valve is opened. In a region in which a piston speed is low, a valve of the second clamping force generating mechanism is opened in a state in which a valve of the first damping force generating mechanism is closed. In a speed region in which the piston speed is higher than that in the region in which the piston speed is low, the valve of the first damping force generating mechanism and the valve of the second damping force generating mechanism are both opened. A communication passage communicating with the one chamber is formed at the bottom portion of the cap member. A flexible member that closes the communication passage is provided in a cap chamber between the bottom portion of the cap member and the valve seat member. An intermediate chamber of which communication with the communication passage is blocked by the flexible member is formed between the flexible member and the valve seat member.

Advantageous Effects of Invention

According to the above-mentioned shock absorber, it is possible to suppress the generation of abnormal noise.

DESCRIPTION OF EMBODIMENTS

First Embodiment

A first embodiment will be described with reference to FIGS. 1 to 6. In the following, for convenience of explanation, the upper side in FIGS. 1 to 3, 7 to 11, and 23 and the left side in FIGS. 12, 14, 17 to 20 will be referred to as "upper," and the lower side in FIGS. 1 to 3, 7 to 11, and 23 and the right side in FIGS. 12, 14 and 17 to 20 will be referred to as "lower."

Figure 1:
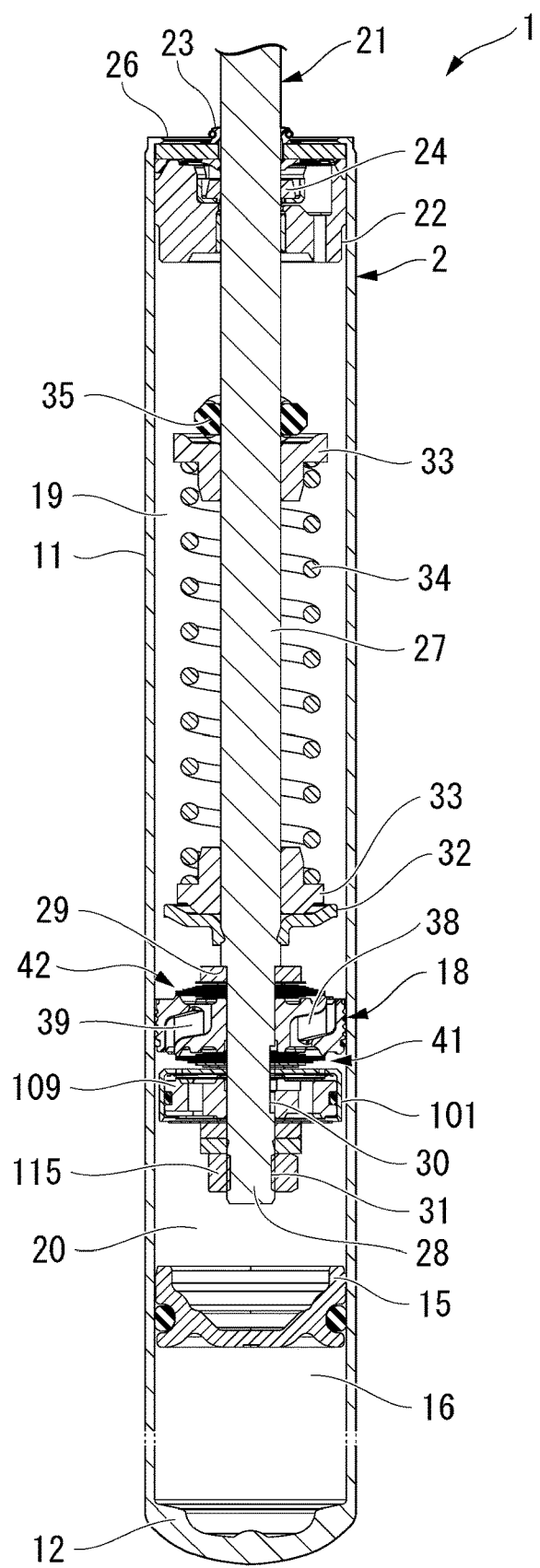
FIG. 1 is a cross-sectional view showing a shock absorber according to a first embodiment of the present invention.

As shown in FIG. 1, a shock absorber 1 of the first embodiment is a so-called mono-tube type hydraulic shock absorber and includes a cylinder 2 which is filled with an oil liquid (not shown) as a working fluid. The cylinder 2 has a bottomed cylindrical shape. The cylinder 2 is an integrally formed product including a cylindrical body portion 11 and a bottom portion 12 which is formed on the lower side of the body portion 11 and closes the lower portion of the body portion 11.

The shock absorber 1 has a division body 15 and a piston 18, both of which are slidably provided inside the cylinder 2. The division body 15 is provided between the piston 18 and the bottom portion 12 of the cylinder 2. The piston 18 defines two chambers, that is, an upper chamber 19 and a lower chamber 20, in the cylinder 2, and the division body 15 defines the lower chamber 20 and a gas chamber 16 in the cylinder 2. In other words, the piston 18 is slidably provided in the cylinder 2 and divides the inside of the cylinder 2 into the upper chamber 19 on one side and the lower chamber 20 on the other side. The upper chamber 19 and the lower chamber 20 in the cylinder 2 are filled with an oil liquid as a working fluid, and the gas chamber 16 in the cylinder 2 is filled with a gas.

The shock absorber 1 includes a piston rod 21 of which one end side portion in an axial direction is disposed inside the cylinder 2 to be connected and fixed to the piston 18 and the other end side portion extends outside the cylinder 2. The piston rod 21 passes through the upper chamber 19 and does not pass through the lower chamber 20. Therefore, the upper chamber 19 is a rod side chamber through which the piston rod 21 passes, and the lower chamber 20 is a bottom side chamber on the bottom portion 12 side of the cylinder 2.

The piston 18 and the piston rod 21 move integrally. In an extension stroke of the shock absorber 1 in which the amount of protrusion of the piston rod 21 from the cylinder 2 is increased, the piston 18 moves toward the upper chamber 19. In a contraction stroke of the shock absorber 1 in which the amount of protrusion of the piston rod 21 from the cylinder 2 is decreased, the piston 18 moves toward the lower chamber 20.

A rod guide 22 is fitted and fixed to an upper end opening side of the cylinder 2, and a seal member 23 is fitted to the upper side which is the outer side of the cylinder 2 with respect to the rod guide 22. The upper end portion of the cylinder 2 is swaged inward in a radial direction to form a locking portion 26, and the seal member 23 is interposed between the locking portion 26 and the rod guide 22. A friction member 24 is provided between the rod guide 22 and the seal member 23.

The rod guide 22, the friction member 24, and the seal member 23 all have annular shapes, and the piston rod 21 is slidably inserted inside each of the rod guide 22, the friction member 24, and the seal member 23 and extends from the inside of the cylinder 2 to the outside thereof. In the piston rod 21, the one end side portion in the axial direction is fixed to the piston 18 inside the cylinder 2, and the other end side portion protrudes outside the cylinder 2 via the rod guide 22, the friction member 24, and the seal member 23.

The rod guide 22 supports the piston rod 21 to be movable in the axial direction while restricting movement thereof in a radial direction and guides the movement of the piston rod 21. The seal member 23 is in close contact with the cylinder 2 at the outer peripheral portion thereof and is in sliding contact with the outer peripheral portion of the piston rod 21 moving in the axial direction at the inner peripheral portion thereof. As a result, the seal member 23 prevents the oil liquid in the cylinder 2 from leaking to the outside. The friction member 24 applies a frictional force to the piston rod 21.

The piston rod 21 has a main shaft portion 27 and an attachment shaft portion 28 having a diameter smaller than that of the main shaft portion 27. In the piston rod 21, the main shaft portion 27 is slidably fitted to the rod guide 22, the friction member 24, and the seal member 23, and the attachment shaft portion 28 is disposed in the cylinder 2 and is connected to the piston 18 and the like. The end portion of the main shaft portion 27 on the attachment shaft portion 28 side is a shaft step portion 29 extending in a direction orthogonal to an axis.

In the outer peripheral portion of the attachment shaft portion 28, at an intermediate position thereof in the axial direction, a passage cutout portion 30 extending in the axial direction is formed, and at a tip end position on a side opposite to the main shaft portion 27 in the axial direction, a male screw 31 is formed. The passage cutout portion 30 is formed by, for example, being cut out of the outer peripheral portion of the attachment shaft portion 28 to have a flat shape in a surface parallel to the central axis of the attachment shaft portion 28. The passage cutout portion 30 can be formed in a so-called two-sided width shape at two positions of the attachment shaft portion 28 which are located at intervals of 180 degrees in a circumferential direction.

The piston rod 21 is provided with a stopper member 32, a pair of supports 33, a coil spring 34, and a buffer 35, which are all annular, at a portion between the piston 18 of the main shaft portion 27 and the rod guide 22. The piston rod 21 is inserted through an inner peripheral side of the stopper member 32, and the stopper member 32 is swaged and fixed to the main shaft portion 27. One support 33, the coil spring 34, the other support 33, and the buffer 35 are disposed in that order from a side of the stopper member 32.

The piston rod 21 is inserted inside the pair of supports 33 and the coil spring 34, and the pair of supports 33 and the coil spring 34 are disposed between the stopper member 32 and the rod guide 22. The piston rod 21 is inserted inside the buffer 35, and the buffer 35 is disposed between the other support 33 and the rod guide 22. In the stopper member 32, the pair of supports 33, the coil spring 34, and the buffer 35, when the piston rod 21 protrudes a predetermined length from the cylinder 2, the buffer 35 comes into contact with the rod guide 22, and the buffer 35 and the coil spring 34 are elastically deformed.

In the shock absorber 1, for example, a protruding portion of the piston rod 21 from the cylinder 2 is disposed at the upper portion and is supported by a vehicle body, and the bottom portion 12 of the cylinder 2 is disposed at the lower portion and is connected to a wheel side. In contrast to this, the cylinder 2 side may be supported by the vehicle body and the piston rod 21 may be connected to the wheel side.

Figure 2:
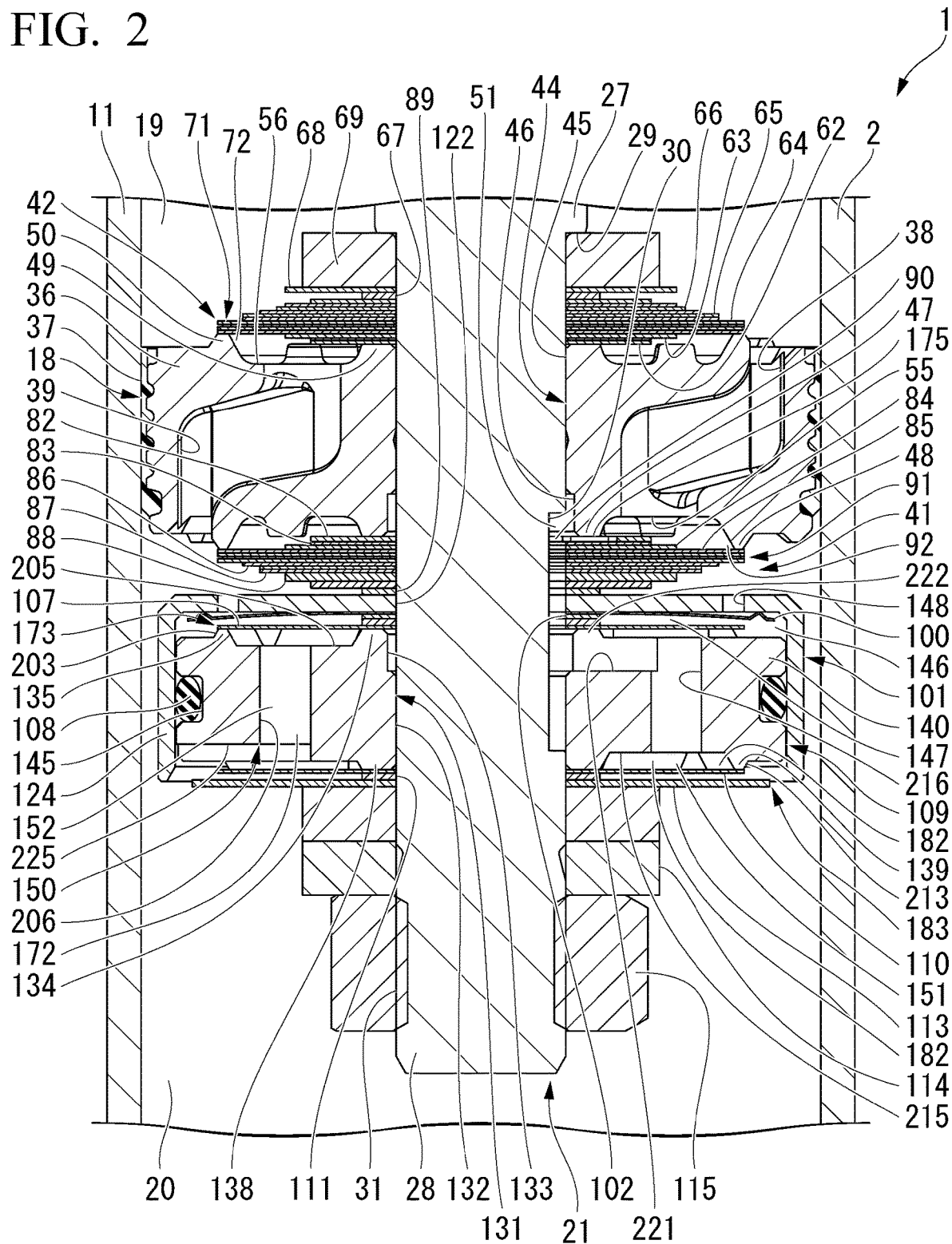
FIG. 2 is a partial cross-sectional view showing a main part of the shock absorber according to the first embodiment of the present invention.

As shown in FIG. 2, the piston 18 is constituted by a piston main body 36 which is made of a metal and is connected to the piston rod 21 and an annular sliding member 37 which is made of a resin, is integrally mounted on the outer peripheral surface of the piston main body 36, and slides in the cylinder 2.

The piston main body 36 is provided with a plurality of (only one is shown in FIG. 2 due to the cross section) passage holes 38 through which the upper chamber 19 and the lower chamber 20 can communicate with each other and a plurality of (only one is shown in FIG. 2 due to the cross section) passage holes 39 through which the upper chamber 19 and the lower chamber 20 can communicate with each other.

The plurality of passage holes 38 are formed at equal pitches with one passage hole 39 interposed therebetween in a circumferential direction of the piston main body 36, and the number of the passage holes 38 is half of the total number of the passage holes 38 and 39. The plurality of passage holes 38 have a crank shape with two bending points. In the passage holes 38, one side in the axial direction of the piston 18 (an upper side in FIG. 2) is open on the outer side of the piston 18 in the radial direction, and the other side in the axial direction of the piston 18 (a lower side in FIG. 2) is open on the inner side of the piston 18 in the radial direction with respect to the one side. An annular groove 55 which allows the plurality of passage holes 38 to communicate with the lower chamber 20 side in the axial direction is formed in the piston main body 36.

On the lower chamber 20 side of the annular groove 55, a first damping force generating mechanism 41 that opens and closes a passage in the annular groove 55 and the plurality of passage holes 38 to generate a damping force is provided. Due to the first damping force generating mechanism 41 disposed on the lower chamber 20 side, the passage in the plurality of passage holes 38 and the annular groove 55 becomes a passage on an extension side through which the oil liquid flows from the upper chamber 19 which becomes an upstream side toward the lower chamber 20 which becomes a downstream side at the time of the movement of the piston 18 toward the upper chamber 19, that is, in the extension stroke. The first damping force generating mechanism 41 provided for the passage in the plurality of passage holes 38 and the annular groove 55 is a damping force generating mechanism on an extension side which suppresses the flow of the oil liquid from the passage in the plurality of passage holes 38 and the annular groove 55 on an extension side toward the lower chamber 20 to generate a damping force.

The passage holes 39 of which the number is the other half of the total number of the passage holes 38 and 39 are formed at equal pitches with one passage hole 38 interposed therebetween in the circumferential direction of the piston main body 36. The plurality of passage holes 39 have a crank shape with two bending points. In the plurality of passage holes 39, the other side in the axial direction of the piston 18 (a lower side in FIG. 2) is open on the outer side of the piston 18 in the radial direction, and one side in the axial direction of the piston 18 (an upper side in FIG. 2) is open on the inner side of the piston 18 in the radial direction with respect to the other side. An annular groove 56 which allows the plurality of passage holes 39 to communicate with the upper chamber 19 side in the axial direction is formed in the piston main body 36.

On the upper chamber 19 side of the annular groove 56, a first damping force generating mechanism 42 that opens and closes a passage in the plurality of passage holes 39 and the annular groove 56 to generate a damping force is provided. Due to the first damping force generating mechanism 42 disposed on the upper chamber 19 side, the passage in the plurality of passage holes 39 and the annular groove 56 becomes a passage on a contraction side through which the oil liquid flows from the lower chamber 20 which becomes an upstream side toward the upper chamber 19 which becomes a downstream side at the time of the movement of the piston 18 toward the lower chamber 20, that is, in the contraction stroke. The first damping force generating mechanism 42 provided for the passage in the plurality of passage holes 39 and the annular groove 56 is a damping force generating mechanism on a contraction side which suppresses the flow of the oil liquid from the passage in the plurality of passage holes 39 and the annular groove 56 on a contraction side toward the upper chamber 19 to generate a damping force.

The piston main body 36 has substantially a disk shape. In the center of the piston main body 36 in the radial direction, an insertion hole 44 into which the attachment shaft portion 28 of the piston rod 21 is inserted is formed to penetrate the piston main body 36 in the axial direction. The insertion hole 44 has a small-diameter hole portion 45 on one side in the axial direction to which the attachment shaft portion 28 of the piston rod 21 is fitted and a large-diameter hole portion 46 on the other side in the axial direction which has a diameter larger than that of the small-diameter hole portion 45. The small-diameter hole portion 45 is provided on the upper chamber 19 side in the axial direction, and the large-diameter hole portion 46 is provided on the lower chamber 20 side in the axial direction.

In the end portion of the piston main body 36 on the lower chamber 20 side in the axial direction, an annular inner seat portion 47 is formed on the inner side of the piston main body 36 in the radial direction with respect to an opening of the annular groove 55 on the lower chamber 20 side. Further, in the end portion of the piston main body 36 on the lower chamber 20 side in the axial direction, an annular valve seat portion 48 constituting a part of the first damping force generating mechanism 41 is formed on the outer side of the piston main body 36 in the radial direction with respect to the opening of the annular groove 55 on the lower chamber 20 side.

In the end portion of the piston main body 36 on the upper chamber 19 side in the axial direction, an annular inner seat portion 49 is formed on the inner side of the piston main body 36 in the radial direction with respect to an opening of the annular groove 56 on the upper chamber 19 side. Further, in the end portion of the piston main body 36 on the upper chamber 19 side in the axial direction, an annular valve seat portion 50 constituting a part of the first damping force generating mechanism 42 is formed on the outer side of the piston main body 36 in the radial direction with respect to the opening of the annular groove 56 on the upper chamber 19 side.

In the insertion hole 44 of the piston main body 36, the large-diameter hole portion 46 is provided on the inner seat portion 47 side in the axial direction with respect to the small-diameter hole portion 45. The passage in the large-diameter hole portion 46 of the piston main body 36 constantly communicates with a piston rod passage portion 51 in the passage cutout portion 30 of the piston rod 21 with the positions thereof in the axial direction overlapping.

The outer side of the piston main body 36 in the radial direction with respect to the valve seat portion 48 has a stepped shape having an axial height lower than that of the valve seat portion 48. An opening of the passage hole 39 on the lower chamber 20 side on a contraction side is disposed in this stepped portion. Further, similarly, the outer side of the piston main body 36 in the radial direction with respect to the valve seat portion 50 has a stepped shape having an axial height lower than that of the valve seat portion 50. An opening of the passage hole 38 on the upper chamber 19 side on an extension side is disposed in this stepped portion.

The first damping force generating mechanism 42 on a contraction side includes the valve seat portion 50 of the piston 18 and has, in order from the piston 18 side in the axial direction, a plurality of (specifically two) disks 62 having the same inner diameter and the same outer diameter, one disk 63, a plurality of (specifically four) disks 64 having the same inner diameter and the same outer diameter, a plurality of (specifically two) disks 65 having the same inner diameter and the same outer diameter, a plurality of (specifically four) disks 66 having the same inner diameter and having outer diameters which decrease as the distance from the piston 18 increases in the axial direction, one disk 67, one disk 68, and one annular member 69. The disks 62 to 68 and the annular member 69 are made of a metal and each have a perforated circular flat plate shape having a constant thickness into which the attachment shaft portion 28 of the piston rod 21 can be fitted. The disks 62 to 68 are plain disks (flat disks without protrusions).

The disk 62 has an outer diameter larger than the outer diameter of the inner seat portion 49 of the piston 18 and smaller than the inner diameter of the valve seat portion 50 of the piston 18 and is constantly in contact with the inner seat portion 49. The disk 63 has an outer diameter larger than the outer diameter of the disk 62 and smaller than the inner diameter of the valve seat portion 50. The plurality of disks 64 have an outer diameter equal to the outer diameter of the valve seat portion 50 of the piston 18 and can be seated on the valve seat portion 50.

The plurality of disks 65 have an outer diameter smaller than the outer diameter of the disk 64. The largest outer diameter disk of the plurality of disks 66 has an outer diameter smaller than the outer diameter of the disk 65. The disk 67 has an outer diameter smaller than the outer diameter of the smallest outer diameter disk of the disks 66 and equal to the outer diameter of the inner seat portion 49 of the piston 18. The disk 68 has an outer diameter larger than the outer diameter of the smallest outer diameter disk of the disks 66 and smaller than the outer diameter of the largest outer diameter disk of the disks 66. The annular member 69 has an outer diameter smaller than the outer diameter of the disk 68 and larger than the outer diameter of the shaft step portion 29 of the piston rod 21. The annular member 69 is thicker and more rigid than the disks 62 to 68 and is in contact with the shaft step portion 29.

The plurality of disks 64, the plurality of disks 65, and the plurality of disks 66 constitute a main valve 71 on a contraction side which can be detached and seated with respect to the valve seat portion 50. When the main valve 71 is separated from the valve seat portion 50, the main valve 71 allows the passage in the plurality of passage holes 39 and the annular groove 56 to communicate with the upper chamber 19 and suppresses the flow of oil liquid with the valve seat portion 50 to generate a damping force. The annular member 69, together with the disk 68, restricts the deformation of the main valve 71 in an opening direction beyond a specified value by coming into contact with the main valve 71.

The passage in the plurality of passage holes 39 and the annular groove 56 and the passage between the main valve 71 and the valve seat portion 50 which appears when the valve is opened constitute a first passage 72 on a contraction side through which the oil liquid flows from the lower chamber 20 which becomes an upstream side in the cylinder 2 to the upper chamber 19 which becomes a downstream side in the cylinder 2 by the movement of the piston 18 toward the lower chamber 20 side. The first damping force generating mechanism 42 on a contraction side which generates a damping force includes the main valve 71 and the valve seat portion 50 and is therefore provided in the first passage 72. The first passage 72 is formed in the piston 18 including the valve seat portion 50, and the oil liquid passes through the first passage 72 when the piston rod 21 and the piston 18 move to the contraction side.

Here, in the first damping force generating mechanism 42 on a contraction side, in each of the valve seat portion 50 and the main valve 71 in contact therewith, a fixed orifice that allows the upper chamber 19 and the lower chamber 20 to communicate with each other even when the valve seat portion 50 and the main valve 71 are in contact with each other is not formed. That is, the first damping force generating mechanism 42 on a contraction side does not allow the upper chamber 19 and the lower chamber 20 to communicate with each other if the valve seat portion 50 and the main valve 71 are in contact with each other over the entire circumference. In other words, a fixed orifice that allows the upper chamber 19 and the lower chamber 20 to constantly communicate with each other is not formed in the first passage 72, and thus the first passage 72 is not a passage that allows the upper chamber 19 and the lower chamber 20 to constantly communicate with each other.

The first damping force generating mechanism 41 on an extension side includes the valve seat portion 48 of the piston 18 and has, in order from the piston 18 side in the axial direction, one disk 82, one disk 83, one disk 84, a plurality of (specifically four) disks 85 having the same inner diameter and the same outer diameter, one disk 86, a plurality of (specifically two) disks 87 having the same inner diameter and the same outer diameter, a plurality of (specifically two) disks 88 having the same inner diameter and having outer diameters which decrease as the distance from the piston 18 increases in the axial direction, and one disk 89. The disks 82 to 89 are made of a metal, and all of them are plain disks that each have a perforated circular flat plate shape having a constant thickness into which the attachment shaft portion 28 of the piston rod 21 can be fitted.

Figure 3:
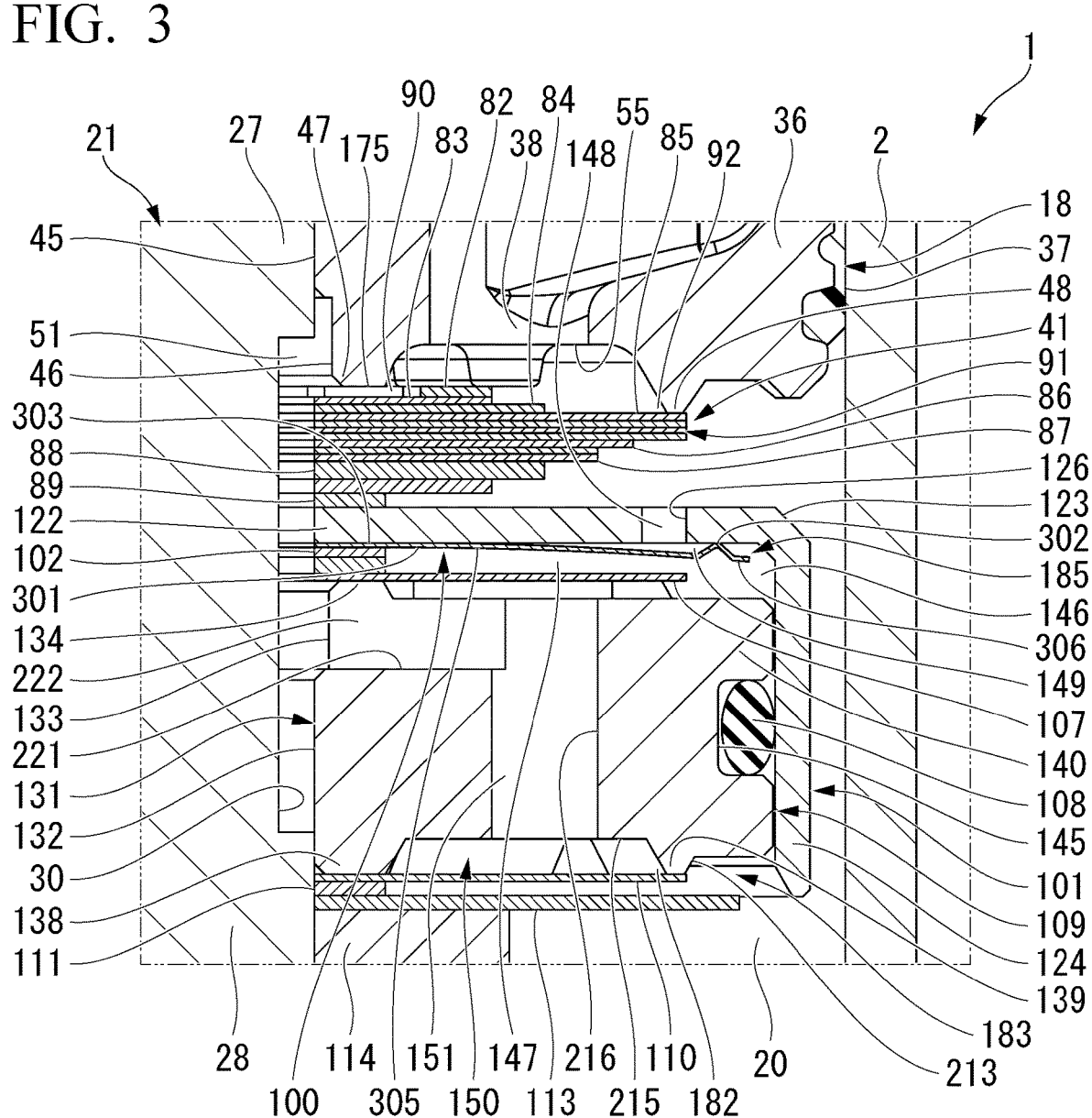
FIG. 3 is a partial cross-sectional view showing the periphery of a cap member and a valve seat member of the shock absorber according to the first embodiment of the present invention.

The disk 82 has an outer diameter larger than the outer diameter of the inner seat portion 47 of the piston 18 and smaller than the inner diameter of the valve seat portion 48 of the piston 18 and is constantly in contact with the inner seat portion 47. As shown in FIG. 3, in the disk 82, a cutout portion 90 that allows the passage in the annular groove 55 and the plurality of passage holes 38 to constantly communicate with the passage in the large-diameter hole portion 46 of the piston 18 and the piston rod passage portion 51 in the passage cutout portion 30 of the piston rod 21 is formed from an intermediate position outside the inner seat portion 47 in the radial direction to the inner peripheral edge portion in the radial direction. The cutout portion 90 is formed during press forming of the disk 82. The cutout portion 90 faces the large-diameter hole portion 46 of the piston 18 to be adjacent thereto. The disk 83 has the same outer diameter as the disk 82, and the cutout portion as in the disk 82 is not formed in the disk 83. The disk 84 has an outer diameter larger than the outer diameter of the disk 83 and smaller than the inner diameter of the valve seat portion 48.

The plurality of disks 85 have an outer diameter equal to the outer diameter of the valve seat portion 48 of the piston 18 and can be seated on the valve seat portion 48. The disk 86 has an outer diameter smaller than the outer diameter of the disk 85. The plurality of disks 87 have an outer diameter smaller than the outer diameter of the disk 86. The larger outer diameter disk of the plurality of disks 88 has an outer diameter smaller than the outer diameter of the disk 87. The disk 89 has an outer diameter smaller than the outer diameter of the smaller outer diameter disk of the plurality of disks 88 and equal to the outer diameter of the inner seat portion 47 of the piston 18. As shown in FIG. 2, the disk 89 can be a common part having the same shape as the disk 67. The plurality of disks 88 are thicker and more rigid than the disks 85 to 87.

The plurality of disks 85, the one disk 86, the plurality of disks 87, and the plurality of disks 88 constitute a main valve 91 on an extension side which can be detached and seated with respect to the valve seat portion 48. When the main valve 91 is separated from the valve seat portion 48, the main valve 91 allows the passage in the annular groove 55 and the plurality of passage holes 38 to communicate with the lower chamber 20 and suppresses the flow of oil liquid with the valve seat portion 48 to generate a damping force.

The passage in the plurality of passage holes 38 and the annular groove 55 and the passage between the main valve 91 and the valve seat portion 48 which appears when the valve is opened constitute a first passage 92 on an extension side through which the oil liquid flows from the upper chamber 19 which becomes an upstream side in the cylinder 2 to the lower chamber 20 which becomes a downstream side in the cylinder 2 by the movement of the piston 18 toward the upper chamber 19 side. The first damping force generating mechanism 41 on an extension side which generates a damping force includes the main valve 91 and the valve seat portion 48 and is therefore provided in the first passage 92. The first passage 92 is formed in the piston 18 including the valve seat portion 48, and the oil liquid passes through the first passage 92 when the piston rod 21 and the piston 18 move to the extension side.

In the first damping force generating mechanism 41 on an extension side, in each of the valve seat portion 48 and the main valve 91 in contact therewith, a fixed orifice that allows the upper chamber 19 and the lower chamber 20 to communicate with each other even when the valve seat portion 48 and the main valve 91 are in contact with each other is not formed. That is, the first damping force generating mechanism 41 on an extension side does not allow the upper chamber 19 and the lower chamber 20 to communicate with each other if the valve seat portion 48 and the main valve 91 are in contact with each other over the entire circumference. In other words, a fixed orifice that allows the upper chamber 19 and the lower chamber 20 to constantly communicate with each other is not formed in the first passage 92, and thus the first passage 92 is not a passage that allows the upper chamber 19 and the lower chamber 20 to constantly communicate with each other.

As shown in FIG. 3, on a side of the first damping force generating mechanism 41 on an extension side opposite to the piston 18, in order from the first damping force generating mechanism 41 side, one cap member 101, one flexible disk 100 (a flexible member or a moving member), a plurality of (specifically two) disks 102, one sub valve 107 (a second sub valve), one valve seat member 109 provided with one O-ring 108 on the outer peripheral side thereof, one sub valve 110 (a first sub valve), one disk 111, one disk 113, and a plurality of (specifically two) annular members 114 shown in FIG. 2 are provided such that the attachment shaft portion 28 of the piston rod 21 is fitted to the inside of each of them. In the attachment shaft portion 28 of the piston rod 21, at a portion protruding with respect to the annular member 114, the male screw 31 is formed, and a nut 115 is screwed onto the male screw 31. The nut 115 is in contact with the annular member 114.

The flexible disk 100, the cap member 101, the disks 102, 111, and 113, the sub valves 107 and 110, the valve seat member 109, and the annular member 114 are all made of a metal. The disks 102, 111, and 113, the sub valve 107 and 110, and the annular member 114 each have a perforated circular flat plate shape having a constant thickness into which the attachment shaft portion 28 of the piston rod 21 can be fitted. The disks 102, 111, and 113 and the sub valves 107 and 110 are plain disks. The flexible disk 100, the cap member 101, and the valve seat member 109 each have an annular shape into which the attachment shaft portion 28 of the piston rod 21 can be fitted.

The cap member 101 is an integrally formed product having a bottomed tubular shape and is integrally formed by, for example, plastic working or cutting of a metal plate. As shown in FIG. 3, the cap member 101 has a bottom portion 122 having a perforated circular plate shape and a constant thickness, an intermediate tapered portion 123 that extends from the outer peripheral edge portion of the bottom portion 122 while expanding in diameter to one side of the bottom portion 122 in the axial direction, and a cylindrical tubular portion 124 that extends from the end edge portion of the intermediate tapered portion 123 on a side opposite to the bottom portion 122 in a direction opposite to the bottom portion 122.

The bottom portion 122 has a perforated circular plate shape in which the attachment shaft portion 28 of the piston rod 21 is fitted to the inner peripheral portion thereof. When the attachment shaft portion 28 is fitted to the inner peripheral portion of the bottom portion 122, the cap member 101 is positioned with respect to the piston rod 21 in the radial direction and is disposed coaxially therewith. A plurality of passage holes 126 that penetrate the bottom portion 122 in the axial direction of the bottom portion 122 is formed between the inner peripheral portion and the outer peripheral portion of the bottom portion 122. The plurality of passage holes 126 are disposed at positions equidistant from the center of the bottom portion 122 at equal intervals in a circumferential direction of the bottom portion 122 and are formed on the outer peripheral portion side with respect to the center between the inner peripheral portion and the outer peripheral portion of the bottom portion 122. The cap member 101 is disposed in an orientation in which the bottom portion 122 is located closer to the piston 18 than the tubular portion 124, is in contact with the disk 89, and is fitted to the attachment shaft portion 28 at the inner peripheral portion of the bottom portion 122.

The cap member 101 is thicker than the disks 85 to 88, has a bottomed tubular shape, and has higher rigidity than the disks 85 to 88. Therefore, the cap member 101 restricts the deformation of the main valve 91 constituted by the plurality of disks 85 to 88 in an opening direction beyond a specified value by coming into contact with the main valve 91.

The flexible disk 100 has a main body portion 301 and a disk protruding portion 302 (a flexible member side protruding portion) protruding from the main body portion 301. The main body portion 301 has a perforated circular flat plate shape having a constant thickness in a natural state before being assembled to the shock absorber 1, and the inner peripheral surface and the outer peripheral surface of the main body portion 301 are coaxial. The disk protruding portion 302 protrudes from the main body portion 301 toward one side of the main body portion 301 in the axial direction. The disk protruding portion 302 has an annular shape coaxial with the main body portion 301 and is formed on the outer peripheral surface side with respect to the central position between the inner peripheral surface and the outer peripheral surface of the main body portion 301. The attachment shaft portion 28 of the piston rod 21 can be fitted into the main body portion 301. When the attachment shaft portion 28 is fitted to the inner peripheral portion of the main body portion 301, the flexible disk 100 is positioned with respect to the piston rod 21 in the radial direction and is disposed coaxially therewith.

The flexible disk 100 is formed by the press forming from a single plate material having a constant thickness, and thus the main body portion 301 and the disk protruding portion 302 are integrally formed with each other. The disk protruding portion 302 extends from the outer peripheral side of the main body portion 301 while the diameter is reduced in a tapered shape to one side in the axial direction, then folds back at an inner side in the radial direction toward the other side in the axial direction, and extends while the diameter is reduced in a tapered shape to the other side in the axial direction to join the main body portion 301. In other words, the cross-sectional shape of the disk protruding portion 302 at a surface including the central axis of the flexible disk 100 has a tapered V-shape in which the width in the radial direction becomes narrower as the distance from the main body portion 301 in the axial direction increases. The disk protruding portion 302 has an axisymmetric shape. The disk protruding portion 302 has a circular shape in which an apex on a side opposite to the main body portion 301 in the axial direction of the flexible disk 100 is concentric with the inner peripheral portion and the outer peripheral portion of the flexible disk 100, and the height of the disk protruding portion 302 from the main body portion 301 is constant over the entire circumference.

The flexible disk 100 is housed in the cap member 101, the disk protruding portion 302 is oriented to protrude from the main body portion 301 toward the bottom portion 122 in the axial direction, and the disk protruding portion 302 is in contact with the bottom portion 122. The disk 102 has an outer diameter smaller than the minimum inner diameter of the disk protruding portion 302. The flexible disk 100 is interposed between the disk 102 and the bottom portion 122 on the inner peripheral side of the main body portion 301 and is incorporated in the shock absorber 1. As a result, the main body portion 301 is elastically deformed in a tapered shape to be separated from the bottom portion 122 in the axial direction toward the outer side in the radial direction.

In a state in which the flexible disk 100 is incorporated in the shock absorber 1, the inner diameter of a tip end surface of the disk protruding portion 302 in contact with the bottom portion 122 is larger than twice the maximum distance from the center of the bottom portion 122 to each of the plurality of passage holes 126. As a result, the flexible disk 100 is disposed such that the annular disk protruding portion 302 surrounds the entire plurality of passage holes 126 on the outer side in the radial direction of the bottom portion 122 and is in contact with the bottom portion 122 over the entire circumference.

In the flexible disk 100, a portion of the inner peripheral portion of the main body portion 301 which overlaps the disk 102 is an inner peripheral side contact portion 303 that is constantly in contact with the disk 102 and the bottom portion 122 of the cap member 101 over the entire circumference. The outer diameter of the inner peripheral side contact portion 303 is smaller than twice the minimum distance from the center of the bottom portion 122 to each of the plurality of passage holes 126. As a result, the flexible disk 100 is disposed such that the inner peripheral side contact portion 303 surrounds the entire plurality of passage holes 126 on the inner side in the radial direction of the bottom portion 122 and is in contact with the bottom portion 122 over the entire circumference.

In a state in which the flexible disk 100 is incorporated in the shock absorber 1, the main body portion 301 constitutes the inner peripheral side contact portion 303, a flexible portion 305 between the inner peripheral side contact portion 303 and the disk protruding portion 302, and an outer peripheral edge portion 306 on the outer side in the radial direction with respect to the disk protruding portion 302. Here, the outer peripheral edge portion 306 has an outer diameter smaller than the minimum inner diameter of the intermediate tapered portion 123 of the cap member 101, and thus the flexible disk 100 does not comes into contact with the intermediate tapered portion 123 and the tubular portion 124. The flexible disk 100 has a tapered shape such that the flexible portion 305 and the outer peripheral edge portion 306 are separated from the bottom portion 122 in the axial direction toward the outer side in the radial direction. The flexible disk 100 can be elastically deformed such that the flexible portion 305 approaches the bottom portion 122 or returns to its original state.

The valve seat member 109 has a perforated circular plate shape in which a through hole 131 extending in the axial direction and penetrating in a thickness direction through which the attachment shaft portion 28 is inserted is formed in the center in the radial direction. The through hole 131 has a small-diameter hole portion 132 on one side in the axial direction to which the attachment shaft portion 28 of the piston rod 21 is fitted and a large-diameter hole portion 133 on the other side in the axial direction which has a diameter larger than that of the small-diameter hole portion 132.

Figure 4A:
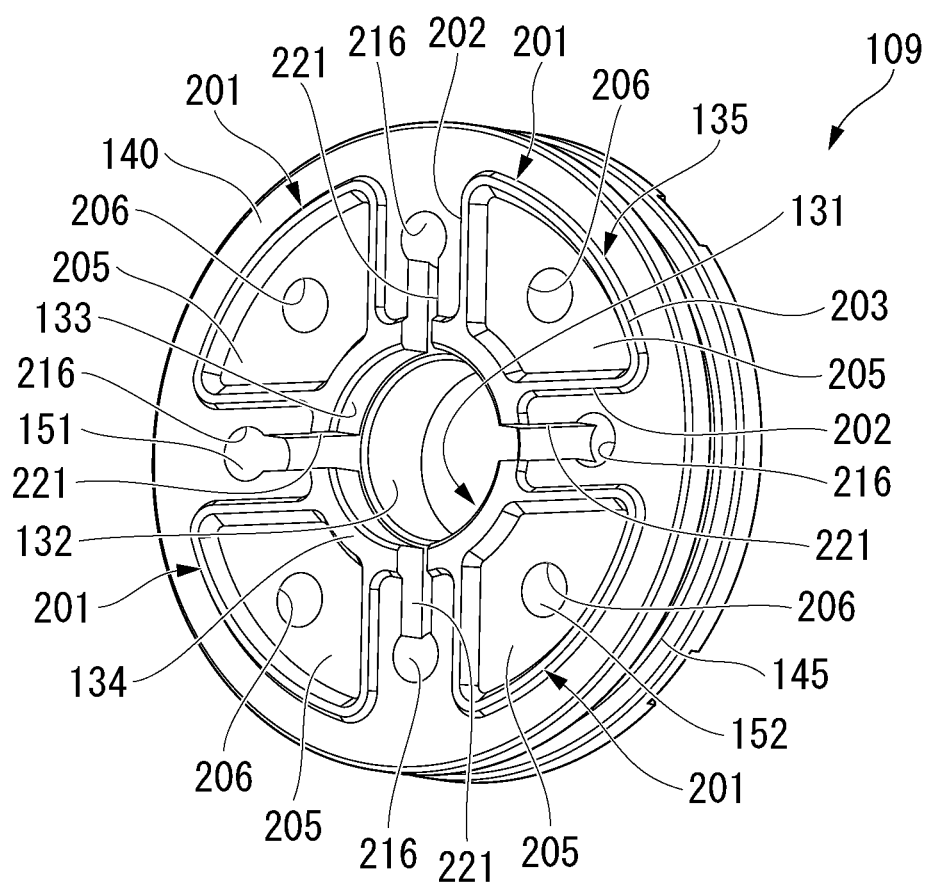
FIG. 4A is a perspective view showing the valve seat member of the shock absorber according to the first embodiment of the present invention from one side in an axial direction.
Figure 4B:
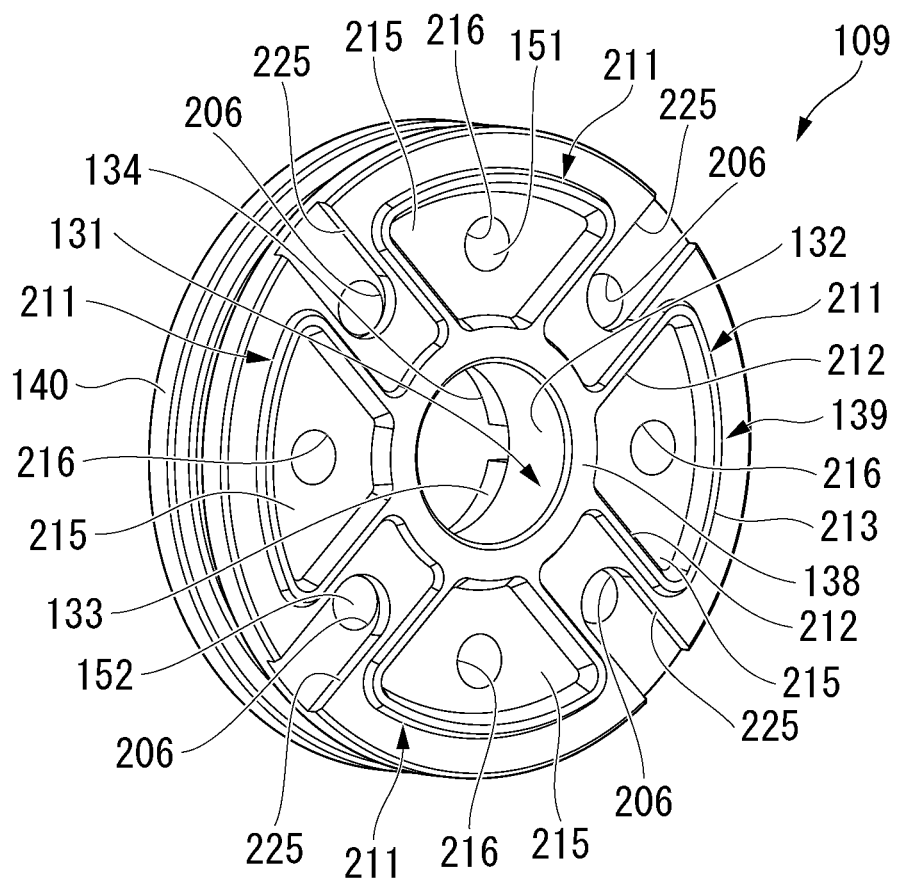
FIG. 4B is a perspective view showing the valve seat member of the shock absorber according to the first embodiment of the present invention from the other side in the axial direction.

As shown in FIG. 4A, the valve seat member 109 has an inner seat portion 134 having an annular shape that surrounds the large-diameter hole portion 133 at an end portion on the large-diameter hole portion 133 side in the axial direction and a valve seat portion 135 that extends outward in the radial direction from the inner seat portion 134. Further, as shown in FIG. 4B, the valve seat member 109 has an inner seat portion 138 having an annular shape that surrounds the small-diameter hole portion 132 at an end portion on the small-diameter hole portion 132 side opposite to the large-diameter hole portion 133 in the axial direction and a valve seat portion 139 that extends outward in the radial direction from the inner seat portion 138. In the valve seat member 109, a portion among the inner seat portion 134, the valve seat portion 135, the inner seat portion 138, and the valve seat portion 139 in the axial direction is a main body portion 140 having a perforated circular plate shape.

As shown in FIG. 4A, the inner seat portion 134 protrudes from the inner peripheral edge portion on the large-diameter hole portion 133 side of the main body portion 140 in the axial direction to one side of the main body portion 140 in the axial direction, and the valve seat portion 135 also protrudes from the main body portion 140 to the same side as the inner seat 134 in the axial direction of the main body 140 at the outer side of the inner seat 134 in the radial direction. In the inner seat portion 134 and the valve seat portion 135, tip end surfaces on the protruding side, that is, tip end surfaces on a side opposite to the main body portion 140, are flat surfaces and extend in a direction orthogonal to an axis of the valve seat member 109 to be disposed in the same plane.

As shown in FIG. 4B, the inner seat portion 138 protrudes from the inner peripheral edge portion on the small-diameter hole portion 132 side of the main body portion 140 in the axial direction to a side opposite to the inner seat portion 134 of the main body portion 140 in the axial direction, and the valve seat portion 139 also protrudes from the main body portion 140 to the same side as the inner seat 138 in the axial direction of the main body 140 at the outer side of the inner seat 138 in the radial direction. In the inner seat portion 138 and the valve seat portion 139, tip end surfaces on the protruding side, that is, tip end surfaces on a side opposite to the main body portion 140, are flat surfaces and extend in a direction orthogonal to an axis of the valve seat member 109 to be disposed in the same plane. The inner seat portions 134 and 138 have the same outer diameter.

As shown in FIG. 4A, the valve seat portion 135 is a deformed seat having a petal shape, and has a plurality of, specifically four, valve seat constituent portions 201. These valve seat constituent portions 201 have the same shape and are disposed at equal intervals in the circumferential direction of the valve seat member 109.

The inner seat portion 134 has an annular shape centered on the central axis of the valve seat member 109. Each of the valve seat constituent portions 201 has a pair of extension portions 202 that extend outward in the radial direction from the inner seat portion 134 and a connecting portion 203 that connects end portions of the pair of extension portions 202 on a side opposite to the inner seat portion 134. The pair of extension portions 202 each have a linear shape and are mirror-symmetrical with respect to a surface including the central axis of the valve seat member 109. The pair of extension portions 202 are disposed to be perpendicular to each other when seen in the axial direction of the valve seat member 109. The connecting portion 203 has an arc shape centered on the central axis of the valve seat member 109.

A passage recess 205 which is surrounded by the valve seat constituent portion 201 and a part of the inner seat portion 134 that connects the pair of extension portions 202 to each other and is recessed from the tip end surfaces on the protruding side thereof in the axial direction of the valve seat member 109 is formed. A bottom surface of the passage recess 205 is formed by the main body portion 140. The passage recess 205 is formed inside each of the valve seat constituent portions 201. All the passage recesses 205 are formed at positions equidistant from the central axis of the valve seat member 109 and are formed at equal intervals in the circumferential direction of the valve seat member 109.

At the central position of the passage recess 205 in the circumferential direction of the valve seat member 109, a passage hole 206 that penetrates the main body portion 140 in the axial direction to penetrate the valve seat member 109 in the axial direction is formed. The passage hole 206 is a linear hole parallel to the central axis of the valve seat member 109. The passage hole 206 is formed in a bottom surface of each of the passage recesses 205. All the passage holes 206 are formed at positions equidistant from the central axis of the valve seat member 109 and are formed at equal intervals in the circumferential direction of the valve seat member 109.

The adjacent extension portions 202 of the valve seat constituent portions 201 disposed adjacent to each other in the circumferential direction of the valve seat member 109 are separated from each other in the circumferential direction of the valve seat member 109, are parallel to each other, and are parallel to a line in the radial direction which passes through the central axis of the valve seat member 109. The extension portions 202 on a far side in the circumferential direction of the valve seat constituent portions 201 disposed adjacent to each other in the circumferential direction of the valve seat member 109 are disposed on the same straight line parallel to the line in the radial direction which passes through the central axis of the valve seat member 109.

As shown in FIG. 4B, the valve seat portion 139 is a deformed seat having a petal shape, and has a plurality of, specifically four, valve seat constituent portions 211. These valve seat constituent portions 211 have the same shape and are disposed at equal intervals in the circumferential direction of the valve seat member 109. The valve seat constituent portions 211 have the same shapes as the valve seat constituent portions 201.

The inner seat portion 138 has an annular shape centered on the central axis of the valve seat member 109. Each of the valve seat constituent portions 211 has a pair of extension portions 212 that extend outward in the radial direction from the inner seat portion 138 and a connecting portion 213 that connects end portions of the pair of extension portions 212 on a side opposite to the inner seat portion 138. The pair of extension portions 212 each have a linear shape and are mirror-symmetrical with respect to a surface including the central axis of the valve seat member 109. The pair of extension portions 212 are disposed to be perpendicular to each other when seen in the axial direction of the valve seat member 109. The connecting portion 213 has an arc shape centered on the central axis of the valve seat member 109. The outer diameter of outer edge portions disposed on the same circle of all the connecting portions 213 is the same as the outer diameter of outer edge portions disposed on the same circle of all the connecting portions 203, and the inner diameter of inner edge portions disposed on the same circle of all the connecting portions 213 is the same as the inner diameter of inner edge portions disposed on the same circle of all the connecting portions 203.

A passage recess 215 which is surrounded by the valve seat constituent portion 211 and a part of the inner seat portion 138 that connects the pair of extension portions 212 to each other and is recessed from the tip end surfaces on the protruding side thereof in the axial direction of the valve seat member 109 is formed. A bottom surface of the passage recess 215 is formed by the main body portion 140. The passage recess 215 is formed inside each of the valve seat constituent portions 211. All the passage recesses 215 are formed at positions equidistant from the central axis of the valve seat member 109 and are formed at equal intervals in the circumferential direction of the valve seat member 109.

At the central position of the passage recess 215 in the circumferential direction of the valve seat member 109, a passage hole 216 that penetrates the main body portion 140 in the axial direction to penetrate the valve seat member 109 in the axial direction is formed. The passage hole 216 is a linear hole parallel to the central axis of the valve seat member 109. The passage hole 216 is formed in a bottom surface of each of the passage recesses 215. All the passage holes 216 are formed at positions equidistant from the central axis of the valve seat member 109 and are formed at equal intervals in the circumferential direction of the valve seat member 109.

The adjacent extension portions 212 of the valve seat constituent portions 211 disposed adjacent to each other in the circumferential direction of the valve seat member 109 are separated from each other in the circumferential direction of the valve seat member 109, are parallel to each other, and are parallel to a line in the radial direction which passes through the central axis of the valve seat member 109. The extension portions 212 on a far side in the circumferential direction of the valve seat constituent portions 211 disposed adjacent to each other in the circumferential direction of the valve seat member 109 are disposed on the same straight line parallel to the line in the radial direction which passes through the central axis of the valve seat member 109.

Here, a disposition pitch of the plurality of valve seat constituent portions 201 in the circumferential direction of the valve seat members 109 and a disposition pitch of the plurality of valve seat constituent portions 211 in the circumferential direction of the valve seat members 109 are the same, and the valve seat constituent portions 201 and the valve seat component portion 211 are shifted from each other by half a pitch. In other words, the central position of the valve seat constituent portion 211 is disposed at the central position between the valve seat constituent portion 201 and the valve seat constituent portion 201 which are adjacent to each other in the circumferential direction of the valve seat member 109, and conversely, the central position of the valve seat constituent portion 201 is disposed at the central position between the valve seat constituent portion 211 and the valve seat constituent portion 211 which are adjacent to each other in the circumferential direction of the valve seat member 109.

All the passage recesses 205 and all the passage recesses 215 are formed at positions equidistant from the central axis of the valve seat member 109, and the passage recesses 205 and the passage recesses 215 are alternately disposed in a staggered shape in the circumferential direction of the valve seat member 109. All the passage holes 206 and all the passage holes 216 are formed at positions equidistant from the central axis of the valve seat member 109, and the passage holes 206 and the passage holes 216 are alternately provided at equal intervals on the same circumference.

As shown in FIG. 4B, the passage hole 206 is disposed between the valve seat constituent portion 211 and the valve seat constituent portion 211 which are adjacent to each other in the circumferential direction of the valve seat member 109, and thus the passage hole 206 is disposed outside a range of the valve seat portion 139. As shown in FIG. 4A, the passage hole 216 is disposed between the valve seat constituent portion 201 and the valve seat constituent portion 201 which are adjacent to each other in the circumferential direction of the valve seat member 109, and thus the passage hole 216 is disposed outside a range of the valve seat portion 135.

In the valve seat member 109, a passage groove 221 that crosses the inner seat portion 134 in the radial direction is formed on the large-diameter hole portion 133 side in the axial direction over the inner seat portion 134 and the main body portion 140. The passage groove 221 is formed to be recessed from the tip end surface of the inner seat portion 134 on a side opposite to the main body portion 140 in the axial direction of the valve seat member 109 and to be further recessed than the end surface of the main body portion 140 on the inner seat portion 134 side. The passage groove 221 is provided along a line in the radial direction which passes through the center of the valve seat member 109 on the line in the radial direction and extends inward in the radial direction of the valve seat member 109 from the passage hole 216 that is open between the valve seat constituent portion 201 and the valve seat constituent portion 201 to be connected to the large-diameter hole portion 133. The passage groove 221 is provided for each of the passage holes 216. A plurality of, specifically four, passage grooves 221 are provided at equal intervals in the circumferential direction of the valve seat member 109 with the positions aligned in the radial direction of the valve seat member 109. The inner seat portion 134 is formed intermittently in the circumferential direction by the formation of the passage groove 221.

As shown in FIG. 3, the passage hole 216 and the passage recess 215 to which the passage hole 216 is open form a first passage portion 151 provided in the valve seat member 109. In the valve seat member 109, a plurality of, specifically four, first passage portions 151 are provided at equal intervals in the circumferential direction of the valve seat member 109 with the positions aligned in the radial direction of the valve seat member 109. In other words, the valve seat member 109 is provided with the plurality of first passage portions 151 at equal intervals on the same circumference.

The passage groove 221 forms a radial passage 222 extending in the radial direction toward the first passage portion 151. In the valve seat member 109, a plurality of, specifically four, radial passages 222 are provided at equal intervals in the circumferential direction of the valve seat member 109 with the positions aligned in the radial direction of the valve seat member 109.

As shown in FIG. 4B, in the valve seat member 109, a passage groove 225 is formed on the small-diameter hole portion 132 side of the main body portion 140 in the axial direction. The passage groove 225 is formed to be recessed from the end surface of the main body portion 140 on the inner seat portion 138 in the axial direction of the valve seat member 109. The passage groove 225 is provided along a line in the radial direction which passes through the center of the valve seat member 109 on the line in the radial direction and extends outward in the radial direction of the valve seat member 109 from the passage hole 206 that is open between the valve seat constituent portion 211 and the valve seat constituent portion 211 to be connected to the outer peripheral surface of the main body portion 140. The passage hole 206 is open to a bottom surface of the passage groove 225. The passage groove 225 is provided for each of the passage holes 206. A plurality of, specifically four, passage grooves 225 are provided at equal intervals in the circumferential direction of the valve seat member 109 with the positions aligned in the radial direction of the valve seat member 109.

As shown in FIG. 2, the passage hole 206 and the passage recess 205 to which the passage hole 206 is open form a second passage portion 152 provided in the valve seat member 109. In the valve seat member 109, a plurality of, specifically four, second passage portions 152 are provided at equal intervals in the circumferential direction of the valve seat member 109 with the positions aligned in the radial direction of the valve seat member 109. In other words, the valve seat member 109 is provided with the plurality of second passage portions 152 at equal intervals on the same circumference.

The plurality of first passage portions 151 and the plurality of second passage portions 152 are provided in the valve seat member 109 to form a valve seat member passage portion 150 through which the oil liquid flows. In other words, the valve seat member passage portion 150 has the first passage portions 151 and the second passage portions 152, and the plurality of first passage portions 151 and the plurality of second passage portions 152 are alternately provided at equal intervals on the same circumference.

As shown in FIG. 3, in the valve seat member 109, at an intermediate position of the outer peripheral portion in the axial direction, an annular seal groove 145 which is recessed inward in the radial direction is formed. The O-ring 108 is disposed in the seal groove 145. In the valve seat member 109, in a state in which the inner seat portion 138 and the valve seat portion 139 face a side opposite to the bottom portion 122, the outer peripheral portion is fitted to the tubular portion 124 of the cap member 101, and the valve seat portion 109 is provided in the cap member 101. In this state, the O-ring 108 seals the gap between the tubular portion 124 of the cap member 101 and the valve seat member 109.

The cap member 101, the O-ring 108, and the valve seat member 109 constitute a cap chamber 146 inside the cap member 101. The cap chamber 146 is provided between the bottom portion 122 of the cap member 101 and the valve seat member 109. The flexible disk 100, the plurality of disks 102, and the sub valve 107 are provided in the cap chamber 146.

The flexible disk 100 is provided between the sub valve 107 in the cap chamber 146 and the bottom portion 122 of the cap member 101. In the flexible disk 100, the disk protruding portion 302 is constantly in contact with the bottom portion 122 of the cap member 101 over the entire circumference to surround the entire plurality of passage holes 126 on the outer side in the radial direction of the bottom portion 122. Further, in the flexible disk 100, the inner peripheral side contact portion 303 is constantly in contact with the bottom portion 122 of the cap member 101 over the entire circumference to surround the entire plurality of passage holes 126 on the inner side in the radial direction of the bottom portion 122.

Therefore, due to the flexible disk 100, the cap chamber 146 is divided into an intermediate chamber 147 on the sub valve 107 side with respect to the flexible disk 100 and a communication chamber 149 (a volume chamber) on the plurality of passage holes 126 side with respect to the flexible disk 100. The communication chamber 149 constantly communicates with a communication passage 148 in the plurality of passage holes 126. The flexible disk 100 blocks the communication of the intermediate chamber 147 with the communication passage 148. In other words, in the cap chamber 146, between the sub valve 107 and the bottom portion 122 of the cap member 101, the flexible disk 100 that closes the communication passage 148 is provided. In other words, the intermediate chamber 147 of which the communication with the communication passage 148 is blocked by the flexible disk 100 is formed between the flexible disk 100 and the sub valve 107.

As the flexible disk 100 bends, the volume of the intermediate chamber 147 changes. That is, the bending of the flexible disk 100 causes the intermediate chamber 147 to have a function as an accumulator. When the communication chamber 149 absorbs the increase of the volume of the intermediate chamber 147, the volume of the communication chamber 149 decreases to discharge the oil liquid. When the communication chamber 149 absorbs the decrease of the volume of the intermediate chamber 147, the volume of the communication chamber 149 increases to cause the oil liquid to flow in. This prevents the deformation of the flexible disk 100 from being hindered by the oil liquid in the communication chamber 149.

As shown in FIG. 2, the annular valve seat member 109 and the bottomed tubular cap member 101 are disposed in the lower chamber 20 which is one of the upper chamber 19 and the lower chamber 20. At this time, in the valve seat member 109, the valve seat portion 135 is disposed on the cap chamber 146 side, and the valve seat portion 139 is disposed on the lower chamber 20 side. The valve seat member 109 divides the intermediate chamber 147 of the cap chamber 146 and the lower chamber 20 from each other and is provided to face both the intermediate chamber 147 and the lower chamber 20. The plurality of passage grooves 225 are provided facing the lower chamber 20, and the plurality of second passage portions 152 constantly communicate with the lower chamber 20 via the passages in the plurality of passage grooves 225. The communication passage 148 formed in the bottom portion 122 of the cap member 101 constantly communicates with the lower chamber 20 which is one of the upper chamber 19 and the lower chamber 20.

The radial passage 222 in the passage groove 221 that is open to the first passage portion 151 of the valve seat member 109 constantly communicates with the intermediate chamber 147, and the inside of the intermediate chamber 147, the passage in the large-diameter hole portion 133 of the valve seat member 109, and the piston rod passage portion 51 in the passage cutout portion 30 of the piston rod 21 constantly communicate with each other. Therefore, the intermediate chamber 147 constantly communicates with the upper chamber 19 via the radial passage 222 in the passage groove 221 of the valve seat member 109, the passage in the large-diameter hole portion 133 of the valve seat member 109, the piston rod passage portion 51 in the passage cutout portion 30 of the piston rod 21, the passage in the large-diameter hole portion 46 of the piston 18, the passage in the cutout portion 90 of the disk 82, and the passage in the annular groove 55 and the plurality of passage holes 38 of the piston 18.

As shown in FIG. 3, the disk 102 has an outer diameter equal to the outer diameter of the inner seat portion 47. As shown in FIG. 2, the sub valve 107 has a disk shape, has an outer diameter equal to the outer diameter of the valve seat portion 135 of the valve seat member 109, is constantly in contact with the inner seat portion 134, and can be detached and seated with respect to the valve seat portion 135. The sub valve 107 closes all the second passage portions 152 by being seated on the entire valve seat portion 135. Further, the sub valve 107 closes the second passage portions 152 inside the valve seat constituent portions 201 by being seated on the entire valve seat constituent portions 201 of the valve seat portion 135 shown in FIG. 4A.

As shown in FIG. 2, the sub valve 107 that can be detached and seated with respect to the valve seat portion 135 is provided in the cap chamber 146, and when the sub valve 107 is separated from the valve seat portion 135 in the cap chamber 146, the sub valve 107 allows the plurality of second passage portions 152 and the intermediate chamber 147 of the cap chamber 146 to communicate with each other and thus allows the lower chamber 20 to communicate with the upper chamber 19. At this time, the sub valve 107 suppresses the flow of the oil liquid with the valve seat portion 135 to generate a damping force. The sub valve 107 is an inflow valve that is opened when the oil liquid flows into the intermediate chamber 147 from the lower chamber 20 via the plurality of second passage portions 152 and is a check valve that restricts the outflow of the oil liquid from the intermediate chamber 147 to the lower chamber 20 via the second passage portions 152. Here, as shown in FIG. 4A, the passage hole 216 constituting the first passage portion 151 is open outside the range of the valve seat portion 135 in the valve seat member 109 and thus constantly communicates with the intermediate chamber 147 regardless of the sub valve 107 seated on the valve seat portion 135 as shown in FIG. 2.

The passage in the plurality of passage grooves 225, the plurality of second passage portions 152, the passage between the sub valve 107 and the valve seat portion 135 which appears when the valve is opened, the intermediate chamber 147, the radial passage 222 in the passage groove 221 of the valve seat member 109, the passage in the large-diameter hole portion 133 of the valve seat member 109, the piston rod passage portion 51 in the passage cutout portion 30 of the piston rod 21, the passage in the large-diameter hole portion 46 of the piston 18, the passage in the cutout portion 90 of the disk 82, and the passage in the annular groove 55 and the plurality of passage holes 38 of the piston 18 constitute a second passage 172 through which the oil liquid flows from the lower chamber 20 which becomes an upstream side in the cylinder 2 to the upper chamber 19 which becomes a downstream side in the cylinder 2 by the movement of the piston 18 toward the lower chamber 20. The second passage 172 becomes a passage on a contraction side through which the oil liquid flows from the lower chamber 20 which becomes an upstream side toward the upper chamber 19 which becomes a downstream side at the time of the movement of the piston 18 toward the lower chamber 20, that is, in the contraction stroke.

The second passage 172 includes the piston rod passage portion 51 in the passage cutout portion 30 formed by cutting out the piston rod 21, in other words, a part of the second passage 172 is formed by being cut out of the piston rod 21. In addition to the formation of the piston rod passage portion 51 by cutting out the piston rod 21, the piston rod passage portion 51 may be formed by penetrating the inside of the piston rod 21 in a hole shape such that one end is open in the passage in the large-diameter hole portion 133 of the valve seat member 109 and the other end is open in the passage in the large-diameter hole portion 46 of the piston 18. Therefore, the second passage 172 has the piston rod passage portion 51 formed by cutting out or penetrating the piston rod 21.

The sub valve 107, the valve seat portion 135, the plurality of disks 102, the flexible disk 100, and the cap member 101 constitute a second damping force generating mechanism 173 on a contraction side which is provided in the second passage 172 on a contraction side, opens and closes the second passage 172, and suppresses the flow of the oil liquid from the second passage 172 to the upper chamber 19 to generate a damping force. In other words, in the second damping force generating mechanism 173, the valve seat portion 135 is provided in the valve seat member 109. The sub valve 107 constituting the second damping force generating mechanism 173 on a contraction side is a sub valve on a contraction side.

In the second passage 172, when the second damping force generating mechanism 173 is in an opened state, the passage in the cutout portion 90 of the disk 82 becomes the narrowest among portions in which a flow path cross-sectional area is fixed, the flow path cross-sectional area of the passage in the cutout portion 90 is narrower than that of each of the upstream side and downstream side thereof, and the passage in the cutout portion 90 becomes an orifice 175 in the second passage 172. The orifice 175 is disposed on a downstream side from the sub valve 107 in the flow of the oil liquid when the sub valve 107 is opened and the oil liquid flows through the second passage 172. The orifice 175 is formed by being cut out of the disk 82 in the first damping force generating mechanism 41, which is in contact with the piston 18.

In the second damping force generating mechanism 173 on a contraction side, in each of the valve seat portion 135 and the sub valve 107 in contact therewith, a fixed orifice that allows the upper chamber 19 and the lower chamber 20 to communicate with each other even when the valve seat portion 135 and the sub valve 107 are in contact with each other is not formed. That is, the second damping force generating mechanism 173 on a contraction side does not allow the upper chamber 19 and the lower chamber 20 to communicate with each other if the valve seat portion 135 and the sub valve 107 are in contact with each other over the entire circumference. In other words, a fixed orifice that allows the upper chamber 19 and the lower chamber 20 to constantly communicate with each other is not formed in the second passage 172, and thus the second passage 172 is not a passage that allows the upper chamber 19 and the lower chamber 20 to constantly communicate with each other.

The second passage 172 on a contraction side through which the upper chamber 19 and the lower chamber 20 can communicate with each other is parallel to the first passage 72 which is also a passage on a contraction side through which the upper chamber 19 and the lower chamber 20 can communicate with each other, the first damping force generating mechanism 42 is provided in the first passage 72, and the second damping force generating mechanism 173 is provided in the second passage 172. Therefore, the first damping force generating mechanism 42 on a contraction side and the second damping force generating mechanism 173 on a contraction side are disposed in parallel.

As shown in FIG. 3, the sub valve 110 has a disk shape, has an outer diameter equal to the outer diameter of the valve seat portion 139 of the valve seat member 109, is constantly in contact with the inner seat portion 138, and can be detached and seated with respect to the valve seat portion 139. The sub valve 110 closes all the first passage portions 151 by being seated on the entire valve seat portion 139. Further, the sub valve 110 closes the first passage portions 151 inside the valve seat constituent portions 211 by being seated on the entire valve seat constituent portions 211 of the valve seat portion 139 shown in FIG. 4B. As shown in FIG. 3, the sub valve 110 can be a common part having the same shape as the sub valve 107. The outer diameter of the disk 111 is smaller than the outer diameter of the sub valve 110 and is equal to the outer diameter of the inner seat portion 138.

The sub valve 110 is provided in the lower chamber 20 and allows the intermediate chamber 147 and the lower chamber 20 to communicate with each other by being separated from the valve seat portion 139. At this time, the sub valve 110 suppresses the flow of the oil liquid with the valve seat portion 139 to generate a damping force. The sub valve 110 is a discharge valve that is opened when the oil liquid is discharged from the inside of the intermediate chamber 147 to the lower chamber 20 via the plurality of first passage portions 151 of the valve seat member 109 and is a check valve that restricts the inflow of the oil liquid from the lower chamber 20 to the inside of the intermediate chamber 147 via the first passage portions 151. Here, as shown in FIG. 4B, the passage hole 206 constituting the second passage portion 152 is open outside the range of the valve seat portion 139 in the valve seat member 109 and thus constantly communicates with the lower chamber 20 regardless of the sub valve 110 seated on the valve seat portion 139 as shown in FIG. 2.

The passage in the plurality of passage holes 38 and the annular groove 55 of the piston 18, the passage in the cutout portion 90 of the disk 82, the piston rod passage portion 51 in the passage cutout portion 30 of the piston rod 21, the passage in the large-diameter hole portion 46 of the piston 18, the passage in the large-diameter hole portion 133 of the valve seat member 109, the radial passage 222 in the passage groove 221 of the valve seat member 109, the intermediate chamber 147, the plurality of first passage portions 151 of the valve seat member 109, and the passage between the sub valve 110 and the valve seat portion 139 which appears when the valve is opened constitute a second passage 182 through which the oil liquid flows from the upper chamber 19 which becomes an upstream side in the cylinder 2 to the lower chamber 20 which becomes a downstream side in the cylinder 2 by the movement of the piston 18 toward the upper chamber 19.

The second passage 182 becomes a passage on an extension side through which the oil liquid flows from the upper chamber 19 which becomes an upstream side toward the lower chamber 20 which becomes a downstream side at the time of the movement of the piston 18 toward the upper chamber 19, that is, in the extension stroke. The second passage 182 includes the piston rod passage portion 51 in the passage cutout portion 30 formed by cutting out the piston rod 21, in other words, a part of the second passage 182 is formed by being cut out of the piston rod 21.

The cap member 101, the sub valve 110, the valve seat portion 139, the disks 111 and 113, and the annular member 114 constitute a second damping force generating mechanism 183 on an extension side which is provided in the second passage 182 on an extension side, opens and closes the second passage 182, and suppresses the flow of the oil liquid from the second passage 182 to the lower chamber 20 to generate a damping force. In other words, in the second damping force generating mechanism 183, the valve seat portion 139 is provided in the valve seat member 109. The sub valve 110 constituting the second damping force generating mechanism 183 on an extension side is a sub valve on an extension side.

As shown in FIG. 3, the communication chamber 149 that communicates with the lower chamber 20 is disposed in parallel with the second passage 172 shown in FIG. 2 and the second passage 182 shown in FIGS. 2 and 3. The second damping force generating mechanisms 173 and 183 each have a volume variable mechanism 185 that can change the volume of the communication chamber 149. The volume variable mechanism 185 is constituted by the flexible disk 100, the bottom portion 122 of the cap member 101, the communication chamber 149, and the communication passage 148. The flexible disk 100 changes to reduce the volume of the communication chamber 149 by deforming and moving toward the bottom portion 122 and changes to increase the volume of the communication chamber 149 by deforming and moving away from the bottom portion 122.

In the second passage 182, when the second damping force generating mechanism 183 is in an opened state, as shown in FIG. 2, the passage in the cutout portion 90 of the disk 82 becomes the narrowest among portions in which a flow path cross-sectional area is fixed, the flow path cross-sectional area of the passage in the cutout portion 90 is narrower than that of each of the upstream side and downstream side thereof, and the passage in the cutout portion 90 becomes an orifice 175 also in the second passage 182. The orifice 175 is common to the second passages 172 and 182. The orifice 175 is disposed on an upstream side from the sub valve 110 in the flow of the oil liquid when the sub valve 110 is opened and the oil liquid flows through the second passage 182. The orifice 175 may be disposed on a downstream side from the sub valve 110 in the flow of the oil liquid when the sub valve 110 is opened and the oil liquid flows through the second passage 182. The sub valve 110 and the above sub valve 107 are independently opened and closed.

In the second damping force generating mechanism 183 on an extension side, in each of the valve seat portion 139 and the sub valve 110 in contact therewith, a fixed orifice that allows the upper chamber 19 and the lower chamber 20 to communicate with each other even when the valve seat portion 139 and the sub valve 110 are in contact with each other is not formed. That is, the second damping force generating mechanism 183 on an extension side does not allow the upper chamber 19 and the lower chamber 20 to communicate with each other if the valve seat portion 139 and the sub valve 110 are in contact with each other over the entire circumference. In other words, a fixed orifice that allows the upper chamber 19 and the lower chamber 20 to constantly communicate with each other is not formed in the second passage 182, and thus the second passage 182 is not a passage that allows the upper chamber 19 and the lower chamber 20 to constantly communicate with each other. The annular member 114, together with the disk 113, restricts the deformation of the sub valve 110 in the opening direction beyond a specified value by coming into contact with the sub valve 110.

In the shock absorber 1, as a flow for passing the oil liquid in the axial direction at least in the piston 18, the upper chamber 19 and the lower chamber 20 can communicate with each other via only the first damping force generating mechanisms 41 and 42 and the second damping force generating mechanisms 173 and 183. Therefore, in the shock absorber 1, on the passage of the oil liquid that passes through at least the inside of the piston 18 in the axial direction, a fixed orifice that allows the upper chamber 19 and the lower chamber 20 to constantly communicate with each other is not provided. Since the shock absorber 1 is a mono-tube type, the shock absorber 1 is not provided with a fixed orifice that allows the upper chamber 19 and the lower chamber 20 to constantly communicate with each other as a whole.

The second passage 182 on an extension side through which the upper chamber 19 and the lower chamber 20 can communicate with each other is parallel to the first passage 92 which is also a passage on an extension side through which the upper chamber 19 and the lower chamber 20 can communicate with each other, except for the passage in the annular groove 55 and the plurality of passage holes 38 on the upper chamber 19 side. In the parallel portion, the first damping force generating mechanism 41 is provided in the first passage 92, and the second damping force generating mechanism 183 is provided in the second passage 182. Therefore, the first damping force generating mechanism 41 on an extension side and the second damping force generating mechanism 183 on an extension side are disposed in parallel.

The second damping force generating mechanisms 173 and 183 include the valve seat member 109, the sub valve 110 provided on one side of the valve seat member passage portion 150 which is a portion of the second passages 172 and 182 provided in the valve seat member 109 and the sub valve 107 provided on the other side of the valve seat member passage portion 150, and the bottomed tubular cap member 101 provided between the piston 18 and the valve seat member 109 in the second passages 172 and 182. The valve seat member 109 is provided in the cap member 101, the sub valve 110 is provided on the lower chamber 20 side of the valve seat member 109, and the sub valve 107 is provided in the cap chamber 146 formed between the bottom portion 122 of the cap member 101 and the valve seat member 109. The valve seat member 109 is provided with the radial passage 222 that communicates with the piston rod passage portion 51 and extends in the radial direction toward the first passage portion 151 on an extension side.

In a case in which the piston 18 or the like is assembled to the piston rod 21, the annular member 69, the disk 68, the disk 67, the plurality of disks 66, the plurality of disks 65, the plurality of disks 64, the disk 63, the plurality of disks 62, and the piston 18 are superposed on the shaft step portion 29 in order while the attachment shaft portion 28 of the piston rod 21 is inserted. At this time, the piston 18 is oriented such that the small-diameter hole portion 45 is located on the shaft step portion 29 side.

In addition, the disk 82, the disks 83, the disk 84, the plurality of disks 85, the disk 86, the plurality of disks 87, the plurality of disks 88, the disk 89, and the cap member 101 are superposed on the piston 18 in order while the attachment shaft portion 28 is inserted. At this time, the cap member 101 is oriented such that the bottom portion 122 is located on the piston 18 side and is in contact with the disk 89.

Further, the flexible disk 100, the plurality of disks 102, the sub valve 107, and the valve seat member 109 on which the O-ring 108 is mounted are superposed on the bottom portion 122 of the cap member 101 in order while the attachment shaft portion 28 is inserted. At this time, as shown in FIG. 3, in the flexible disk 100, the disk protruding portion 302 is oriented to protrude from the main body portion 301 toward the bottom portion 122, the disk protruding portion 302 is in contact with the bottom portion 122, and the inner peripheral side contact portion 303 is in contact with the disk 102. Further, at this time, in the valve seat member 109, as shown FIG. 2, the inner seat portion 134 and the valve seat portion 135 are oriented to be located on the sub valve 107, and the outer peripheral portion and the O-ring 108 are fitted to the tubular portion 124 of the cap member 101.

Further, the sub valve 110, the disk 111, the disk 113, and the plurality of annular members 114 are superposed on the valve seat member 109 in order while the attachment shaft portion 28 is inserted. In this state, the nut 115 is screwed to the male screw 31 of the piston rod 21 protruding with respect to the annular member 114, and the nut 115 and the shaft step portion 29 clamp at least the inner peripheral side of the above-described constituent elements in the axial direction.

In this state, the inner peripheral side of the main valve 71 is clamped between the inner seat portion 49 of the piston 18 and the disk 67 via the disks 62 and 63, and the main valve 71 is in contact with the valve seat portion 50 of the piston 18 over the entire circumference. Further, in this state, the inner peripheral side of the main valve 91 is clamped between the inner seat portion 47 of the piston 18 and the disk 89 via the disks 82 to 84, and the main valve 91 is in contact with the valve seat portion 48 of the piston 18 over the entire circumference.

Further, in this state, as shown in FIG. 3, in the flexible disk 100, the disk protruding portion 302 is in contact with the bottom portion 122 while the flexible disk 100 is elastically deformed, and the inner peripheral side contact portion 303 is clamped between the bottom portion 122 of the cap member 101 and the disk 102. Further, in this state, as shown in FIG. 2, the inner peripheral side of the sub valve 107 is clamped between the inner seat portion 134 of the valve seat member 109 and the disk 102, and the sub valve 107 is in contact with the valve seat portion 135 of the valve seat member 109 over the entire circumference. Further, in this state, the inner peripheral side of the sub valve 110 is clamped between the inner seat portion 138 of the valve seat member 109 and the disk 111, and the sub valve 110 is in contact with the valve seat portion 139 of the valve seat member 109 over the entire circumference.

As shown in FIG. 3, in the flexible disk 100, when the disk protruding portion 302 is in contact with the bottom portion 122 and the inner peripheral side contact portion 303 is clamped between the bottom portion 122 of the cap member 101 and the disk 102, the disk protruding portion 302 is in contact with the bottom portion 122 of the cap member 101 over the entire circumference in a state in which a preload corresponding to the height of the disk protruding portion 302 is applied. Although the sub valve 107 bends in a direction toward the flexible disk 100 when the valve is opened, a sufficient gap is provided between the sub valve 107 and the flexible disk 100. Therefore, even when the sub valve 107 is lifted to the maximum, the sub valve 107 does not come into contact with the flexible disk 100.

As shown in FIG. 2, between the first damping force generating mechanism 41 on an extension side and the second damping force generating mechanism 183 on an extension side, the main valve 91 of the first damping force generating mechanism 41 has a rigidity and a valve opening pressure higher than those of the sub valve 110 of the second damping force generating mechanism 183. Therefore, in the extension stroke, in an extremely low speed region in which a piston speed is lower than a predetermined value, the valve of the second damping force generating mechanism 183 is opened in a state in which the valve of the first damping force generating mechanism 41 is closed. Further, in a normal speed region in which the piston speed is this predetermined value or more, the valve of the first damping force generating mechanism 41 and the valve of the second damping force generating mechanism 183 are both opened. The sub valve 110 is an extremely low speed valve which is opened to generate a damping force in a region in which the piston speed is extremely low.

That is, in the extension stroke, the piston 18 moves to the upper chamber 19 side, and thus the pressure in the upper chamber 19 increases and the pressure in the lower chamber 20 decreases. Then, although neither each of the first damping force generating mechanisms 41 and 42 nor each of the second damping force generating mechanisms 173 and 183 has a fixed orifice that allows the upper chamber 19 and the lower chamber 20 to constantly communicate with each other, the oil liquid in the upper chamber 19 flows into the intermediate chamber 147 via the passage in the plurality of passage holes 38 and the annular groove 55 of the piston 18, the orifice 175, the passage in the large-diameter hole portion 46 of the piston 18, the piston rod passage portion 51 in the passage cutout portion 30 of the piston rod 21, the passage in the large-diameter hole portion 133 of the valve seat member 109, and the radial passage 222 in the passage groove 221 of the valve seat member 109. As a result, the pressure in the intermediate chamber 147 is increased. Therefore, in the volume variable mechanism 185 shown in FIG. 3, the flexible portion 305 of the flexible disk 100 bends toward the bottom portion 122 to increase the capacity of the intermediate chamber 147, and thus the pressure increase in the intermediate chamber 147 is suppressed. At this time, since the flexible disk 100 bends and moves toward the bottom portion 122, the volume variable mechanism 185 reduces the volume of the communication chamber 149.

Here, in the extension stroke of the shock absorber 1 at the time of low frequency input (at the time of large amplitude excitation), the amount of the oil liquid flowing from the upper chamber 19 into the intermediate chamber 147 becomes large as described above. Therefore, the flexible disk 100 is greatly deformed, the flexible portion 305 comes into contact with the bottom portion 122 of the cap member 101, and the contact area thereof becomes large. When the contact area of the flexible disk 100 with the bottom portion 122 is increased in this way, the amount of bending of the flexible disk 100 is limited, and thus the flexible disk 100 does not bend when a certain amount or more of a differential pressure is applied. Since the flexible disk 100 is completely bent in this way, the capacity of the intermediate chamber 147 is not increased. This state is the same as a state in which the flexible disk 100 and the communication passage 148 are not present, and the pressure in the intermediate chamber 147 is increased to the state in which the valve of the second damping force generating mechanism 183 is opened.

Figure 5:
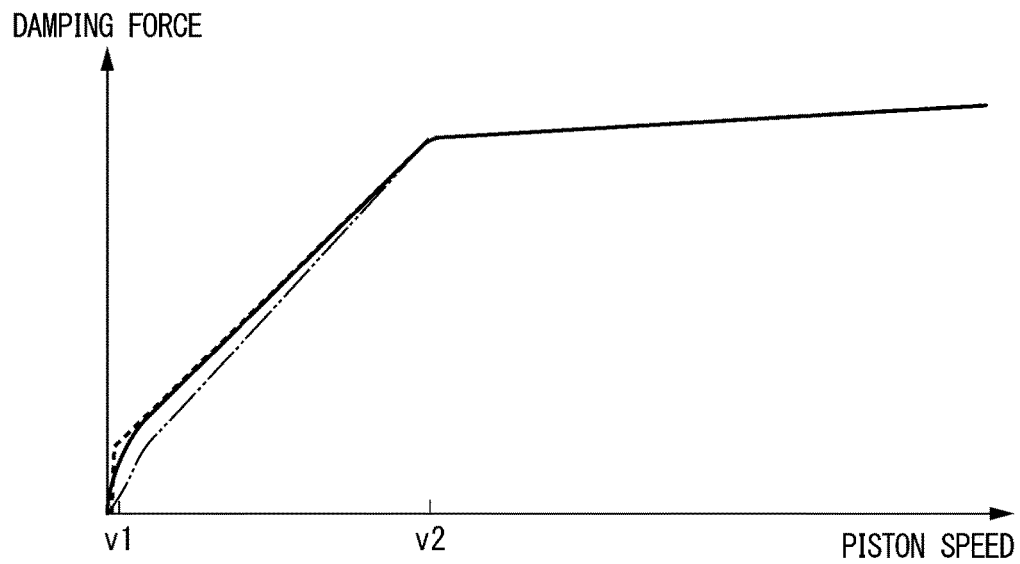
FIG. 5 is a characteristic diagram showing damping force characteristics of the shock absorber according to the first embodiment of the present invention.

At this time, since neither each of the first damping force generating mechanisms 41 and 42 nor each of the second damping force generating mechanisms 173 and 183 has a fixed orifice that allows the upper chamber 19 and the lower chamber 20 to constantly communicate with each other, as shown by a solid line in FIG. 5, in the extension stroke in which the piston speed is less than a first predetermined value v1 at which the valve of the second damping force generating mechanism 183 is opened, the damping force rises steeply. Further, in a region in which the piston speed is higher than the first predetermined value v1 and in an extremely low speed region in which the piston speed is higher than the first predetermined value and lower than a second predetermined value v2 (v1 or more and less than v2), the valve of the second damping force generating mechanism 183 is opened in a state in which the valve of the first damping force generating mechanism 41 is closed.

That is, the sub valve 110 is separated from the valve seat portion 139, and the upper chamber 19 and the lower chamber 20 communicate with each other through the second passage 182 on an extension side. Therefore, the oil liquid in the upper chamber 19 flows to the lower chamber 20 via the passage in the plurality of passage holes 38 and the annular groove 55 of the piston 18, the orifice 175, the passage in the large-diameter hole portion 46 of the piston 18, the piston rod passage portion 51 in the passage cutout portion 30 of the piston rod 21, the passage in the large-diameter hole portion 133 of the valve seat member 109, the intermediate chamber 147, the radial passage 222 in the passage groove 221 of the valve seat member 109, the first passage portion 151 in the valve seat member 109, and the passage between the sub valve 110 and the valve seat portion 139. As a result, even in the extremely low speed region in which the piston speed is lower than the second predetermined value, the damping force of the valve characteristics (the characteristics in which the damping force is substantially proportional to the piston speed) can be obtained.

Further, in the extension stroke, in the normal speed region in which the piston speed is the second predetermined value v2 or more, the valve of the first damping force generating mechanism 41 is opened while a state in which the valve of the second damping force generating mechanism 183 is opened remains. That is, the sub valve 110 is separated from the valve seat portion 139, and the oil liquid flows from the upper chamber 19 to the lower chamber 20 through the second passage 182 on an extension side, but at this time, the flow of the oil liquid is throttled by the orifice 175 provided on the downstream side from the main valve 91 in the second passage 182, and thus the pressure applied to the main valve 91 increases and a differential pressure increases, the main valve 91 is separated from the valve seat portion 48, and the oil liquid flows from the upper chamber 19 to the lower chamber 20 through the first passage 92 on an extension side. Therefore, the oil liquid in the upper chamber 19 flows to the lower chamber 20 via the passage in the plurality of passage holes 38 and the annular groove 55 and the passage between the main valve 91 and the valve seat portion 48.

As a result, even in the above normal speed region in which the piston speed is the second predetermined value v2 or more, the damping force of the valve characteristics (the characteristics in which the damping force is substantially proportional to the piston speed) can be obtained. The rate of the increase of the damping force on an extension side with respect to the increase of the piston speed in the normal speed region is lower than the rate of the increase of the damping force on an extension side with respect to the increase of the piston speed in the extremely low speed region. In other words, the inclination of the rate of the increase of the damping force on an extension side with respect to the increase in the piston speed in the normal speed region can be made lower than that in the extremely low speed region.

Here, in the extension stroke, in the normal speed region in which the piston speed is the second predetermined value v2 or more, the differential pressure between the upper chamber 19 and the lower chamber 20 is higher than that in the low speed region in which the piston speed is the first predetermined value v1 or more and less than the second predetermined value v2, but, since the first passage 92 is not throttled by the orifice, it is possible to allow the oil liquid to flow via the first passage 92 at a large flow rate by the main valve 91 being opened. By this and by throttling the second passage 182 with the orifice 175, it is possible to prevent the sub valve 110 from being deformed.

Further, at this time, pressures in opposite directions from the lower chamber 20 and the intermediate chamber 147 are applied to the sub valve 107 in a closed state. Even if the differential pressure between the upper chamber 19 and the lower chamber 20 becomes large, since the orifice 175 is formed on the upstream side from the sub valve 107 in the second passage 182, the pressure increase in the intermediate chamber 147 becomes gentle with respect to the pressure increase in the upper chamber 19, which prevents the pressure difference between the intermediate chamber 147 and the lower chamber 20 from becoming large. Therefore, it is possible to prevent the pressure difference between the intermediate chamber 147 and the lower chamber 20 received by the sub valve 107 in a closed state from becoming large, and it is possible to prevent the large back pressure from the intermediate chamber 147 side toward the lower chamber 20 side from being applied to the sub valve 107.

The shock absorber 1 is provided with, as a flow path through which the oil liquid flows from the upper chamber 19 to the lower chamber 20 in the extension stroke, the first passage 92 and the second passage 182 in parallel and is provided with the main valve 91 and the sub valve 110 in parallel. Further, the orifice 175 is connected in series with the sub valve 110.

As described above, in the extension stroke, in the normal speed region in which the piston speed is the second predetermined value v2 or more, it is possible to allow the oil liquid to flow via the first passage 92 at a large flow rate by the main valve 91 being opened. As a result, the flow rate of the oil liquid flowing through the passage between the sub valve 110 and the valve seat portion 139 is reduced. Therefore, for example, the rate of the increase of the damping force with respect to the increase in the piston speed in the normal speed region (v2 or more) for the piston speed can be reduced. In other words, the inclination of the rate of the increase of the damping force on an extension side with respect to the increase in the piston speed in the normal speed region (v2 or more) can be made lower than that in the extremely low speed region (less than v2). As a result, the degree of freedom in design can be expanded.

In the extension stroke at the time of high frequency input (at the time of small amplitude excitation) in which a higher frequency is input to the shock absorber 1 than that at the time of low frequency input described above, the amount of the oil liquid flowing from the upper chamber 19 into the intermediate chamber 147 is small. Therefore, the deformation of the flexible disk 100 is small, and the volume variable mechanism 185 can absorb the volume of the oil liquid flowing into the intermediate chamber 147 by the amount of bending of the flexible disk 100. Therefore, the increase in the pressure in the intermediate chamber 147 becomes small. Therefore, at the time of rising of an extremely low speed damping force, it is possible to make the state of the shock absorber a state in which, as it were, there is no flexible disk 100 and the intermediate chamber 147 constantly communicates with the lower chamber 20 through the communication passage 148 of the cap member 101, that is, a state in which the structure of the shock absorber is the same as a structure having no second damping force generating mechanism 183.

Therefore, in comparison with the damping force characteristics at the time of low frequency input shown by the solid line in FIG. 5, the rise of the extremely low speed damping force becomes gentle as shown by a two-dot chain line in FIG. 5. Further, in the extremely low speed region (less than v2), when the flexible disk 100 is bent, the valve of the second damping force generating mechanism 183 is opened while increasing the volume of the oil liquid flowing into the intermediate chamber 147, and thus the extremely low speed damping force with respect to the same piston speed is lower than that at the time of low frequency input in which the flexible disk 100 is completely bent and the volume of the oil liquid flowing into the intermediate chamber 147 is not changed. In other words, when the frequency of the piston 18 exceeds a predetermined frequency, the volume variable mechanism 185 including the flexible disk 100 limits the flow rate of the oil liquid to the sub valve 110 of the second damping force generating mechanism 183. When the rigidity (the plate thickness or the like) of the flexible disk 100 is variously formed, it is possible to adjust the change in damping force (the inclination of the damping force with respect to the piston speed) until the valve of the second damping force generating mechanism 183 is opened.

As shown in FIG. 2, between the first damping force generating mechanism 42 on a contraction side and the second damping force generating mechanism 173 on a contraction side, the main valve 71 of the first damping force generating mechanism 42 has a rigidity and a valve opening pressure higher than those of the sub valve 107 of the second damping force generating mechanism 173. Therefore, in the contraction stroke, in the extremely low speed region in which the piston speed is lower than a predetermined value, the valve of the second damping force generating mechanism 173 is opened in a state in which the valve of the first damping force generating mechanism 42 is closed, and in a normal speed region in which the piston speed is higher than the predetermined value, the valve of the first damping force generating mechanism 42 and the valve of the second damping force generating mechanism 173 are both opened. The sub valve 107 is an extremely low speed valve which is opened to generate a damping force in a region in which the piston speed is extremely low.

That is, in the contraction stroke, the piston 18 moves to the lower chamber 20 side, and thus the pressure in the lower chamber 20 increases and the pressure in the upper chamber 19 decreases. Then, since neither each of the first damping force generating mechanisms 41 and 42 nor each of the second damping force generating mechanisms 173 and 183 has a fixed orifice that allows the lower chamber 20 and the upper chamber 19 to constantly communicate with each other, the oil liquid does not flow until the valve of the second damping force generating mechanism 173 is opened. Therefore, the damping force rises steeply. In a region in which the piston speed is higher than a third predetermined value at which the valve of the second damping force generating mechanism 173 is opened and in an extremely low speed region in which the piston speed is higher than the third predetermined value and lower than a fourth predetermined value, the valve of the second damping force generating mechanism 173 is opened in a state in which the valve of the first damping force generating mechanism 42 is closed.

That is, the sub valve 107 is separated from the valve seat portion 135, and the lower chamber 20 and the upper chamber 19 communicate with each other through the second passage 172 on a contraction side. Therefore, the oil liquid in the lower chamber 20 flows to the upper chamber 19 via the passage in the passage groove 225 of the valve seat member 109, the second passage portion 152, the passage between the sub valve 107 and the valve seat portion 135, the intermediate chamber 147, the radial passage 222 in the passage groove 221 of the valve seat member 109, the passage in the large-diameter hole portion 133 of the valve seat member 109, the piston rod passage portion 51 in the passage cutout portion 30 of the piston rod 21, the passage in the large-diameter hole portion 46 of the piston 18, the orifice 175, and the passage in the annular groove 55 and the plurality of passage holes 38 of the piston 18. As a result, even in the extremely low speed region in which the piston speed is lower than the fourth predetermined value, the damping force of the valve characteristics (the characteristics in which the damping force is substantially proportional to the piston speed) can be obtained.

Further, in the contraction stroke, in the normal speed region in which the piston speed is the fourth predetermined value or more, the valve of the first damping force generating mechanism 42 is opened while a state in which the valve of the second damping force generating mechanism 173 is opened remains. That is, the sub valve 107 is separated from the valve seat portion 135, and the oil liquid flows from the lower chamber 20 to the upper chamber 19 through the second passage 172 on a contraction side, but at this time, in the second passage 172, the flow rate of the oil liquid is throttled by the orifice 175, and thus a differential pressure generated at the main valve 71 provided in the first passage 72 increases, the main valve 71 is separated from the valve seat portion 50, and the oil liquid flows from the lower chamber 20 to the upper chamber 19 through the first passage 72 on a contraction side. Therefore, the oil liquid in the lower chamber 20 flows to the upper chamber 19 via the passage in the plurality of passage holes 39 and the annular groove 56 and the passage between the main valve 71 and the valve seat portion 50.

As a result, even in the above normal speed region in which the piston speed is the fourth predetermined value or more, the damping force of the valve characteristics (the characteristics in which the damping force is substantially proportional to the piston speed) can be obtained. The rate of the increase of the damping force on a contraction side with respect to the increase of the piston speed in the normal speed region is lower than the rate of the increase of the damping force on a contraction side with respect to the increase of the piston speed in the extremely low speed region. In other words, the inclination of the rate of the increase of the damping force on a contraction side with respect to the increase in the piston speed in the normal speed region can be made lower than that in the extremely low speed region.

In the contraction stroke, in the normal speed region in which the piston speed is the fourth predetermined value or more, the differential pressure between the upper chamber 19 and the lower chamber 20 is higher than that in the low speed region, but, since the first passage 72 is not throttled by the orifice, it is possible to allow the oil liquid to flow via the first passage 72 at a large flow rate by the main valve 71 being opened. Therefore, the damping force in the normal speed region for the piston speed can be reduced, and the degree of freedom in design can be expanded.

Further, at this time (in a case in which the piston speed is high), the differential pressure between the lower chamber 20 and the upper chamber 19 becomes large, but the second passage 172 is throttled with the orifice 175, and thus the pressure in the intermediate chamber 147 communicating with the upper chamber 19 via the orifice 175 becomes the pressure between the lower chamber 20 and the upper chamber 19. Therefore, it is possible to prevent the differential pressure between the intermediate chamber 147 and the lower chamber 20 from becoming too large. By this and by opening the main valve 71 to allow the oil liquid to flow at a large flow rate through the first passage 72, it is possible to prevent the sub valve 107 from being deformed.

Further, at this time, pressures in opposite directions from the lower chamber 20 and the intermediate chamber 147 are applied to the sub valve 110 in a closed state. The differential pressure between the lower chamber 20 and the upper chamber 19 is large, but the lower chamber 20 and the intermediate chamber 147 communicate with each other by the sub valve 107 being opened, and the orifice 175 is provided between the intermediate chamber 147 which becomes a downstream side of the sub valve 110 and the upper chamber 19. Therefore, it is possible to prevent the pressure in the intermediate chamber 147 from dropping too much, and it is also possible to increase the pressure in the intermediate chamber 147 in accordance with the increase in the pressure in the lower chamber 20. Therefore, the differential pressure generated on surfaces of the sub valve 110 on the upstream side and downstream side is small, and it is possible to prevent a large back pressure from the lower chamber 20 side toward the intermediate chamber 147 side from being applied to the sub valve 110.

The above shock absorber 1 is provided with, as a flow path through which the oil liquid flows from the lower chamber 20 to the upper chamber 19 in the contraction stroke, the first passage 72 and the second passage 172 in parallel and is provided with the main valve 71 and the sub valve 107 in parallel. Further, the orifice 175 is connected in series with the sub valve 107 in the second passage 172.

In the contraction stroke, when the pressure in the lower chamber 20 increases, the pressure in the communication passage 148 and the communication chamber 149 also increases. However, it is set that the valve of the second damping force generating mechanism 173 is opened before the flexible disk 100 is deformed by the pressure in the communication passage 148 and the communication chamber 149. Therefore, in the contraction stroke, the flexible disk 100 does not allow the communication chamber 149 to communicate with the intermediate chamber 147.

As described above, in the extension stroke of the shock absorber 1, in the normal speed region in which the piston speed is the second predetermined value v2 or more, the differential pressure between the upper chamber 19 and the lower chamber 20 becomes large, but, since the pressure increase in the intermediate chamber 147 can be suppressed with the orifice 175 formed on the upstream side from the sub valve 107, the deformation of the sub valve 107 due to the back pressure can be suppressed. Further, in the contraction stroke, in the normal speed region in which the piston speed is the fourth predetermined value or more, the differential pressure between the lower chamber 20 and the upper chamber 19 becomes larger than that in the low speed region, but by allowing the oil liquid to flow at a large flow rate in the first passage 72 and by throttling the downstream side from the sub valve 107 in the second passage 172 with the orifice 175, it is possible to suppress the deformation of the sub valve 107. Therefore, the durability of the sub valve 107 can be improved.

Further, in the extension stroke of the shock absorber 1, in the normal speed region in which the piston speed is the second predetermined value v2 or more, the differential pressure between the upper chamber 19 and the lower chamber 20 becomes larger than that in the low speed region, but by allowing the oil liquid to flow at a large flow rate in the first passage 92 and by throttling the second passage 182 with the orifice 175, it is possible to suppress the deformation of the sub valve 110. Further, in the contraction stroke, in the normal speed region in which the piston speed is the fourth predetermined value or more, the differential pressure between the lower chamber 20 and the upper chamber 19 becomes large, but the lower chamber 20 and the intermediate chamber 147 communicate with each other by the sub valve 107 being opened, and the flow of the oil liquid from the intermediate chamber 147 to the upper chamber 19 is throttled with the orifice 175 provided between the intermediate chamber 147 and the upper chamber 19. Therefore, the differential pressure between the lower chamber 20 and the intermediate chamber 147 is small, and deformation of the sub valve 110 due to the back pressure can be suppressed. Therefore, the durability of the sub valve 110 can be improved.

Since the shock absorber 1 has the second damping force generating mechanisms 173 and 183 which are independent in the contraction stroke and the extension stroke, the degree of freedom in setting the damping force characteristics is increased.

Patent Literature 1 described above describes a shock absorber having two valves which are opened in the same stroke. By employing a structure in which two valves which are opened in the same stroke are provided in this way, it is possible to open one valve without opening the other valve in a region in which the piston speed is low and to open both valves in a region in which the piston speed is higher than that in the region in which the piston speed is low. In a shock absorber having such a structure, if it is set that the damping force is generated at the time of low frequency input in the extremely low speed region in order to improve the responsiveness at the time of fine steering input, the flat feeling in ride quality on a smooth road, or the like, abnormal noise may be generated at the time of high frequency input.

The shock absorber 1 of the first embodiment has the first passage 92 and the second passage 182 through which the oil liquid flows by the movement of the piston 18, the first damping force generating mechanism 41 which is provided in the first passage 92 and generates a damping force, and the second damping force generating mechanism 183 which is provided in the second passage 182 and generates a damping force. The second damping force generating mechanism 183 includes the sub valve 110 provided on one side of the second passage 182 and the volume variable mechanism 185 that changes the volume of the communication chamber 149 provided in parallel with the second passage 182. As a result, the volume variable mechanism 185 makes it possible to change the volume of the communication chamber 149 provided in parallel with the second passage 182. Therefore, it is possible to change the flow rate of the oil liquid flowing through the second passage 182. Therefore, it is possible to suppress the generation of abnormal noise.

Further, the volume variable mechanism 185 has the communication chamber 149 and the flexible disk 100 that moves to change the volume of the communication chamber 149. Therefore, the volume variable mechanism 185 can be configured in a simple manner.

When the frequency of the piston 18 exceeds the predetermined frequency, the flow rate of the oil liquid to the sub valve 110 is limited by the volume variable mechanism 185. Therefore, it is possible to suppress the generation of abnormal noise especially at the time of high frequency input.

Further, the first passage 92 and the second passage 182 are connected in parallel. Therefore, it is possible to reduce the flow rate of the oil liquid flowing through the second passage 182. Therefore, it is possible to suppress the deformation of the sub valve 110.

In the shock absorber 1 of the first embodiment, the sub valve 110 and the sub valve 107 of the second damping force generating mechanisms 173 and 183 of the second passages 172 and 182 which are parallel to the first passages 72 and 92 of the piston 18 provided with the first damping force generating mechanisms 41 and 42 are provided in the valve seat member 109 disposed in the lower chamber 20. At the same time, the bottomed tubular cap member 101 is provided between the piston 18 and the valve seat member 109 in the second passages 172 and 182, and the valve seat member 109 is disposed inside the cap member 101. At this time, the sub valve 110 is provided on the lower chamber 20 side, and the sub valve 107 is provided in the cap chamber 146 formed between the bottom portion 122 of the cap member 101 and the valve seat member 109. Then, the communication passage 148 communicating with the lower chamber 20 is formed in the bottom portion 122 of the cap member 101, and the flexible disk 100 that closes the communication passage 148 is provided between the second sub valve 107 in the cap chamber 146 and the bottom portion 122 of the cap member 101. As a result, the intermediate chamber 147 of which the communication with the communication passage 148 is blocked by the flexible disk 100 can be formed between the flexible disk 100 and the second sub valve 107. The intermediate chamber 147 constitutes the second passages 172 and 182, and the capacity thereof becomes variable when the flexible disk 100 bends.

With this configuration, in the extension stroke of the shock absorber 1 at the time of low frequency input, the amount of the oil liquid flowing from the upper chamber 19 into the intermediate chamber 147 is large. Therefore, the flexible disk 100 is completely bent, and then the capacity of the intermediate chamber 147 is not increased. Therefore, as shown by the solid line in FIG. 5, it is possible to steeply raise the damping force in the extension stroke when the piston speed is less than a first predetermined value v1. On the other hand, in the extension stroke of the shock absorber 1 at the time of high frequency input at which the abnormal noise is apt to be generated, the amount of the oil liquid flowing from the upper chamber 19 into the intermediate chamber 147 is small. Therefore, it is possible to absorb the volume of the oil liquid flowing into the intermediate chamber 147 by the bending of the flexible disk 100. As a result, the intermediate chamber 147 can be brought into a state similar to the state in which the intermediate chamber 147 constantly communicates with the lower chamber 20 through the communication passage 148 of the cap member 101. Accordingly, in comparison with the damping force characteristics at the time of low frequency input shown by the solid line in FIG. 5, the rise of the extremely low speed damping force becomes gentle as shown by a two-dot chain line in FIG. 5. The change in damping force generated when the valve of the second damping force generating mechanism 183 is opened becomes smooth, and in the extremely low speed region (less than v2), the extremely low speed damping force with respect to the same piston speed becomes lower than that at the time of low frequency input. In other words, the second damping force generating mechanism 183 can have a frequency-dependent function.

In this way, the shock absorber 1 generates the damping force sufficiently even at the extremely low speed with respect to the low frequency input in which the damping force is required even at the extremely low speed in order to improve the responsiveness at the time of the fine steering input, the flat feeling in ride quality on a smooth road, or the like. Meanwhile, the shock absorber 1 weakens the damping force at the extremely low speed and makes the change of the damping force generated when the valve of the second damping force generating mechanism 183 is opened become smooth with respect to the high frequency input in which the abnormal noise is apt to be generated to suppress the abnormal noise. Therefore, it is possible to achieve both the desired damping performance at extremely low speed and the suppression of the abnormal noise.

Here, in order to verify the effect of suppressing the abnormal noise of the shock absorber 1 of the first embodiment, rod acceleration correlating with the generation of the abnormal noise was analyzed. That is, one end of a spring mechanism having a predetermined characteristic is fixed in position, the piston rod 21 of the shock absorber 1 is connected to the other end thereof, the cylinder 2 is connected to a vibration source, and the cylinder 2 is vibrated by the vibration source with a predetermined sinusoidal wave. In this case, the rod acceleration which is the acceleration of the piston rod 21 and the damping force of the shock absorber 1 were analyzed. Further, for comparison, the same analysis was performed with respect to a shock absorber of a comparative example having a configuration in which the bottom portion 122 of the cap member 101 does not have the communication passage 148 and the flexible disk 100 is not provided in the cap chamber 146 in comparison with the shock absorber 1. The analysis result is shown in FIG. 6.

Figure 6:
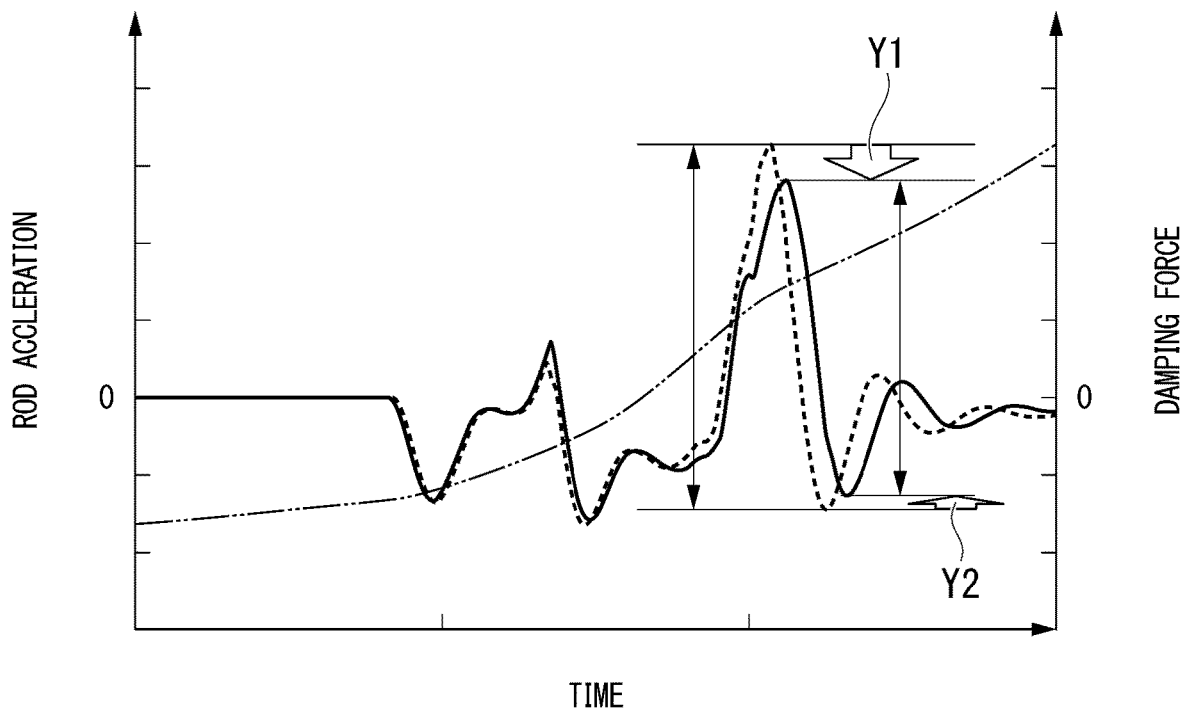
FIG. 6 is a characteristic diagram showing analysis results of rod acceleration and a damping force of the shock absorber according to the first embodiment of the present invention.

FIG. 6 shows the characteristics at the time of reversing the stroke from the contraction stroke to the extension stroke in which the abnormal noise is especially apt to be generated and the damping force shown by the two-dot chain line in FIG. 6 changes from minus to plus. As is clear from FIG. 6, in the rod acceleration of the shock absorber 1 of the first embodiment shown by the solid line in FIG. 6, a peak value on a plus side is close to 0 as shown by an arrow Y1 and a peak value on a minus side is close to 0 as shown by an arrow Y2 as compared with rod acceleration of the comparative example shown by the broken line in FIG. 6. As a result, it can be seen that the effect of suppressing the abnormal noise that correlates with the rod acceleration can be obtained.

In the shock absorber 1 of the first embodiment, the disk protruding portion 302 that is constantly in contact with the bottom portion 122 of the cap member 101 is integrally formed with the flexible disk 100, and thus it is possible to suppress the increase of the number of parts and the increase of the assembling man-hours. Further, since the flexible disk 100 can be manufactured by the press forming, the cost of parts can be reduced.

Further, the orifice 175 is disposed on the upstream side from the sub valve 110 of the second passage 182 in flow during the extension stroke in which the sub valve 110 is opened. As a result, during the contraction stroke, the sub valve 107 is opened with respect to the lower chamber 20, the oil liquid flows into the intermediate chamber 147, and the orifice 175 throttles the flow of the oil liquid flowing to the upper chamber 19. Therefore, the differential pressure between the intermediate chamber 147 and the lower chamber 20 becomes small, the sub valve 110 in a closed state which receives the back pressure from the lower chamber 20 receives the same pressure as that of the lower chamber 20 from the intermediate chamber 147, and the received back pressure (the differential pressure) is suppressed. Therefore, the durability of the sub valve 110 can be improved.

Further, the valve seat member passage portion 150 has the first passage portions 151 on an extension side and the second passage portions 152 on a contraction side, and the plurality of first passage portions 151 on an extension side and the plurality of second passage portions 152 on a contraction side are alternately provided at equal intervals on the same circumference. Therefore, the valve seat portion 139 on an extension side can be formed by the plurality of valve seat constituent portions 211 formed by surrounding the first passage portions 151, and the valve seat portion 135 on a contraction side can be formed by the plurality of valve seat constituent portion 201 formed by surrounding the second passage portions 152. Therefore, it is possible to suppress sudden valve opening and hydraulic fluctuation at the time of valve opening of the second damping force generating mechanism 183 on an extension side including the sub valve 110 and the valve seat portion 139 and to smoothly change the damping force characteristics.

That is, as shown by the solid line in FIG. 5, in the extension stroke when the piston speed is less than the first predetermined value v1, it is possible to smoothly change the damping force characteristics when the piston speed transitions to the extremely low speed region (v1 or more and less than v2) higher than the first predetermined value v1 at which the valve of the second damping force generating mechanism 183 is opened after the damping force steeply rises. Here, the broken line shown in FIG. 5 is the damping force characteristics in a case in which the sub valve 110 is detached and seated with respect to one annular valve seat portion, but in comparison with this, the damping force characteristics of the shock absorber 1 of the first embodiment change smoothly.

Similarly, in the second damping force generating mechanism 173 on a contraction side which includes the valve seat portion 135 having the same shape as that of the valve seat portion 139 and the sub valve 107, it is also possible to smoothly change the damping force characteristics at the time of valve opening.

Moreover, since the plurality of first passage portions 151 on an extension side and the plurality of second passage portions 152 on a contraction side are alternately provided on the same circumference, it is possible to increase both the diameters of the sub valves 107 and 110, to lower the valve rigidity in both the extension and contraction strokes, to suppress the hydraulic fluctuation, and to smoothly change the damping force characteristics.

Here, if the continuation of the damping force in the extremely low speed region is not smooth, in other words, if the damping coefficient becomes discontinuous, a non-linear feeling will be given to the fine steering operation such as slowly turning the steering in the same lane. In addition, a steep change in damping force may make the ride quality stiff and uncomfortable. On the other hand, the shock absorber 1 of the first embodiment can suppress deterioration in steering stability and ride quality while increasing the damping force in the extremely low speed region. Further, since the hydraulic fluctuation can be suppressed, the generation of the abnormal noise can also be suppressed.

Further, since the present embodiment has a structure in which the piston rod 21 is inserted into the piston 18, the cap member 101, and the valve seat member 109, it is possible to compactly dispose the piston 18, the cap member 101, and the valve seat member 109.

Since a part of each of the second passages 172 and 182 is formed by being cut out or penetrated of the piston rod 21, the second passages 172 and 182 can be easily formed.

Since the radial passage 222 that communicates with the piston rod passage portion 51 and extends in the radial direction toward the first passage portion 151 on an extension side is formed in the valve seat member 109, it is possible to allow the piston rod passage portion 51 and the first passage portion 151 on an extension side communicate with each other with a simple structure.

Since the orifice 175 is formed by being cut out of a disk 82 in the first damping force generating mechanism 41 on an extension side, which is in contact with the piston 18, the orifice 175 can be easily formed.

Since the differential pressure between the intermediate chamber 147 and the lower chamber 20 does not increase in both the expansion stroke and the contraction stroke, it is possible to use a thin pressed part as the cap member 101. Therefore, it is advantageous in terms of manufacturability and weight reduction.

In the above first embodiment, the second damping force generating mechanisms 173 and 183 are provided on the lower chamber 20 side which is one of the upper chamber 19 and the lower chamber 20, but they can also be provided on the upper chamber 19 side. In this case, for example, the cap member 101, the flexible disk 100, the plurality of disks 102, the sub valve 107, the valve seat member 109 on which the O-ring 108 is mounted, the sub valve 110, the disk 111, and the disk 113 are disposed between the annular member 69 and the disk 68 in that arrangement order with reversed in the axial direction. Therefore, the disk 113 of these is in contact with the annular member 69, and the cap member 101 is in contact with the disk 68. Further, the disk 89 is in contact with the annular member 114.

Further, in this case, the plurality of disks 62 and the disk 82 having the cutout portion 90 are exchanged with each other such that the passage in the cutout portion 90 communicates with the passage in the annular groove 56 on a contraction side. In addition, the large-diameter hole portion 46 of the piston 18 is formed on the inner seat portion 49 side to be adjacent to and to face the cutout portion 90, and the passage cutout portion 30 is formed such that the piston rod passage portion 51 allows the passage of the cutout portion 90 of the disk 82, the passage in the large-diameter hole portion 46 of the piston 18, and the passage in the large-diameter hole portion 133 of the valve seat member 109 to communicate with each other.

With this configuration, the second damping force generating mechanism 173 becomes the second damping force generation mechanism on an extension side, and the second damping force generation mechanism 183 becomes the second damping force generation mechanism on a contraction side. Then, the first passage portion 151 becomes a passage portion on a contraction side, and the radial passage 222 of the valve seat member 109 communicates with the piston rod passage portion 51 and extends in the radial direction toward the first passage portion 151 on a contraction side. As a result, it is possible to achieve both the desired damping performance at extremely low speed and the suppression of the abnormal noise in the contraction stroke.

Second Embodiment

Next, a second embodiment will be described mainly based on FIG. 7, focusing on portions different from the first embodiment. The portions common to the first embodiment are represented by the same terms and the same reference signs.

Figure 7:
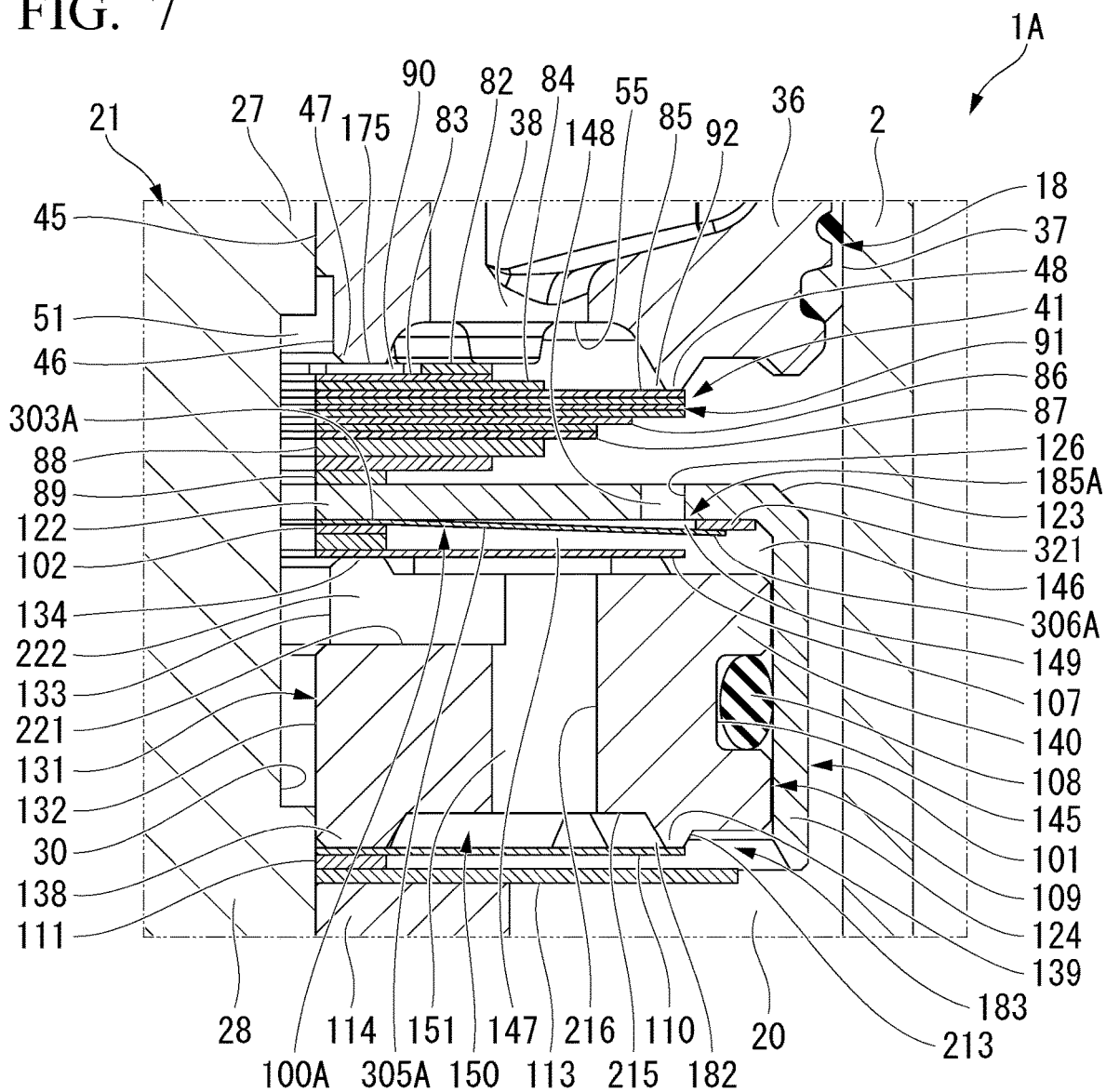
FIG. 7 is a partial cross-sectional view showing the periphery of a cap member and a valve seat member of a shock absorber according to a second embodiment of the present invention.

In a shock absorber 1A of the second embodiment, as shown in FIG. 7, instead of the flexible disk 100 having the disk protruding portion 302 of the first embodiment, a flexible disk 100A (a flexible member or a moving member) and a step adjustment shim 321 are provided.

The flexible disk 100A is a plain disk (a flat disk without protrusions) which has a perforated circular flat plate shape having a constant thickness in a natural state before being assembled to the shock absorber 1A, and into which the attachment shaft portion 28 of the piston rod 21 can be fitted. The flexible disk 100A has an inner peripheral surface and an outer peripheral surface coaxially disposed and has an axisymmetric shape. When the attachment shaft portion 28 is fitted to the inner peripheral portion of the flexible disk 100A, the flexible disk 100A is positioned with respect to the piston rod 21 in the radial direction and is disposed coaxially therewith. The disk protruding portion 302 of the first embodiment is not formed in the flexible disk 100A. The flexible disk 100A is also formed by the press forming from a single plate material having a constant thickness.

The step adjustment shim 321 has a perforated circular flat plate shape having a constant thickness and has an inner peripheral surface and an outer peripheral surface both of which are cylindrical surfaces and are coaxially disposed. The step adjustment shim 321 has an axisymmetric shape. The step adjustment shim 321 is also formed by the press forming from a single plate material having a constant thickness. The step adjustment shim 321 is formed separately from the flexible disk 100A.

The step adjustment shim 321 has an inner diameter larger than the outer diameter of the disk 102 and is larger than twice the maximum distance from the center of the bottom portion 122 to each of the plurality of passage holes 126. Further, the step adjustment shim 321 has an outer diameter equal to the minimum inner diameter of the intermediate tapered portion 123 of the cap member 101.

The step adjustment shim 321 is placed on the bottom portion 122 of the cap member 101, and at that time, the step adjustment shim 321 is positioned with respect to the cap member 101 in the radial direction by the intermediate tapered portion 123 and is disposed coaxially with the cap member 101. The step adjustment shim 321 is disposed to surround the entire plurality of passage holes 126 on the outer side in the radial direction of the bottom portion 122 and is in contact with the bottom portion 122 over the entire circumference. When the step adjustment shim 321 is placed on the bottom portion 122, the surface opposite to the bottom portion 122 becomes a flat surface extending in a direction orthogonal to the axis of the cap member 101.

The flexible disk 100A and the step adjustment shim 321 are housed in the cap member 101, and at that time, the step adjustment shim 321 is disposed between the flexible disk 100A and the bottom portion 122 of the cap member 101. The flexible disk 100A is incorporated in the shock absorber 1, is interposed between the disk 102 and the bottom portion 122 on the inner peripheral side thereof, and is in contact with the step adjustment shim 321 on the outer peripheral side thereof over the entire circumference. As a result, the flexible disk 100A is elastically deformed in a tapered shape to be separated from the bottom portion 122 in the axial direction toward the outer side in the radial direction.

In the flexible disk 100A, a portion of the inner peripheral portion thereof which overlaps the disk 102 is an inner peripheral side contact portion 303A that is constantly in contact with the bottom portion 122 of the cap member 101 and the disk 102 over the entire circumference. The outer diameter of the inner peripheral side contact portion 303A is smaller than twice the minimum distance from the center of the bottom portion 122 to each of the plurality of passage holes 126. As a result, in the flexible disk 100A, the inner peripheral side contact portion 303A is disposed to surround the entire plurality of passage holes 126 on the inner side in the radial direction of the bottom portion 122 and is in contact with the bottom portion 122 over the entire circumference.

The flexible disk 100A has the inner peripheral side contact portion 303A, an outer peripheral edge portion 306A, and a flexible portion 305A between them. The outer peripheral edge portion 306A of the flexible disk 100A has an outer diameter larger than the inner diameter of the step adjustment shim 321 and smaller than the minimum inner diameter of the intermediate tapered portion 123 of the cap member 101. The flexible disk 100A is in contact with the step adjustment shim 321 at the outer peripheral edge portion 306A over the entire circumference and is elastically deformed in a tapered shape such that the flexible portion 305A and the outer peripheral edge portion 306A are separated from the bottom portion 122 in the axial direction toward the outer side in the radial direction. The flexible disk 100A is deformed such that the flexible portion 305A approaches the bottom portion 122 or returns to its original state.

The flexible disk 100A, the step adjustment shim 321, the plurality of disks 102, and the sub valve 107 are provided in the cap chamber 146. The flexible disk 100A is provided between the sub valve 107 in the cap chamber 146 and the bottom portion 122 of the cap member 101. The flexible disk 100A is constantly in contact with the step adjustment shim 321 provided to surround the entire plurality of passage holes 126 on the outer side in the radial direction of the bottom portion 122 over the entire circumference. Further, in the flexible disk 100A, the inner peripheral side contact portion 303A is constantly in contact with the bottom portion 122 of the cap member 101 over the entire circumference to surround the entire plurality of passage holes 126 on the inner side in the radial direction of the bottom portion 122.

Due to the flexible disk 100A and the step adjustment shim 321, the cap chamber 146 is divided into the intermediate chamber 147 on the sub valve 107 side and the communication chamber 149 communicating with the communication passage 148 in the plurality of passage holes 126. The flexible disk 100A blocks the communication of the intermediate chamber 147 with the communication passage 148. In other words, in the cap chamber 146, between the sub valve 107 and the bottom portion 122 of the cap member 101, the flexible disk 100A that closes the communication passage 148 is provided. In other words, the intermediate chamber 147 of which the communication with the communication passage 148 is blocked by the flexible disk 100A is formed between the flexible disk 100A and the sub valve 107. As the flexible portion 305A of the flexible disk 100A bends, the volume of the intermediate chamber 147 changes.

The second embodiment has a volume variable mechanism 185A which is partially different from the volume variable mechanism 185. The volume variable mechanism 185A of the second embodiment is constituted by the flexible disk 100A, the step adjustment shim 321, the bottom portion 122 of the cap member 101, the communication chamber 149, and the communication passage 148. Also in the second embodiment, the flexible disk 100A changes to reduce the volume of the communication chamber 149 provided in parallel with the second passage 182 by deforming and moving toward the bottom portion 122 and changes to increase the volume of the communication chamber 149 by deforming and moving away from the bottom portion 122.

In a case in which the piston 18 or the like is assembled to the piston rod 21, the annular member 69, the disk 68, the disk 67, the plurality of disks 66, the plurality of disks 65, the plurality of disks 64, the disk 63, the plurality of disks 62, the piston 18, the disk 82, the disks 83, the disk 84, the plurality of disks 85, the disk 86, the plurality of disks 87, the plurality of disks 88, the disk 89, and the cap member 101 are superposed on the shaft step portion 29 in order while the attachment shaft portion 28 of the piston rod 21 is inserted as in the first embodiment.

Further, the step adjustment shim 321, the flexible disk 100A, the plurality of disks 102 are superposed on the bottom portion 122 of the cap member 101 in order while the attachment shaft portion 28 is inserted.

Further, the sub valve 107, the valve seat member 109 on which the O-ring 108 is mounted, the sub valve 110, the disk 111, the disk 113, and the plurality of annular members 114 are superposed on the plurality of disks 102 in order while the attachment shaft portion 28 is inserted as in the first embodiment. In this state, the nut 115 is screwed to the male screw 31 of the piston rod 21 protruding with respect to the annular member 114, and the nut 115 and the shaft step portion 29 clamp at least the inner peripheral side of the above-described constituent elements except for the step adjustment shim 321 in the axial direction.

In this state, the flexible disk 100A is in contact with the step adjustment shim 321 at the outer peripheral edge portion 306A while being elastically deformed and presses the step adjustment shim 321 against the bottom portion 122 of the cap member 101. Further, in this state, in the flexible disk 100A, the inner peripheral side contact portion 303A is clamped between the bottom portion 122 of the cap member 101 and the disk 102.

In the flexible disk 100, when the outer peripheral edge portion 306A is in contact with the step adjustment shim 321 and the inner peripheral side contact portion 303A is clamped between the bottom portion 122 of the cap member 101 and the disk 102, the outer peripheral edge portion 306A is in contact with the step adjustment shim 321 over the entire circumference in a state in which a preload corresponding to the height of the step adjustment shim 321 is applied, and the step adjustment shim 321 is brought into contact with the bottom portion 122 over the entire circumference. As in the first embodiment, even when the sub valve 107 is lifted to the maximum, the sub valve 107 does not come into contact with the flexible disk 100A.

The shock absorber 1A of the second embodiment includes the sub valve 110 provided on one side of the second passage 182 and the volume variable mechanism 185A that changes the volume of the communication chamber 149 provided in parallel with the second passage 182. As a result, the volume variable mechanism 185A makes it possible to change the volume of the communication chamber 149 provided in parallel with the second passage 182. Therefore, as in the first embodiment, it is possible to change the flow rate of the oil liquid flowing through the second passage 182. Therefore, it is possible to suppress the generation of abnormal noise.

In the shock absorber 1A of the second embodiment, the intermediate chamber 147 of which the communication with the communication passage 148 is blocked by the flexible disk 100A and the step adjustment shim 321 is formed between the flexible disk 100A and the second sub valve 107, and the capacity of the intermediate chamber 147 is made variable by the bending of the flexible disk 100A. As a result, as in the first embodiment, it is possible to achieve both the desired damping performance at extremely low speed and the suppression of the abnormal noise.

Further, the shock absorber 1A of the second embodiment uses the step adjustment shim 321 which is separate from the flexible disk 100A and the cap member 101. Therefore, it is possible to easily adjust the preload of the flexible disk 100A by selecting the step adjustment shim 321 from among a plurality of ones having different thicknesses for use.

In the above second embodiment, the second damping force generating mechanisms 173 and 183 are provided on the lower chamber 20 side which is one of the upper chamber 19 and the lower chamber 20, but they can also be provided on the upper chamber 19 side. In this case, for example, the cap member 101, the step adjustment shim 321, the flexible disk 100A, the plurality of disks 102, the sub valve 107, the valve seat member 109 on which the O-ring 108 is mounted, the sub valve 110, the disk 111, and the disk 113 are disposed between the annular member 69 (see FIG. 2) and the disk 68 (see FIG. 2) in that arrangement order with reversed in the axial direction. Besides this, as described in the first embodiment, the same changes as those in the case where the second damping force generating mechanisms 173 and 183 are provided in the upper chamber 19 are made.

Third Embodiment

Next, a third embodiment will be described mainly based on FIG. 8, focusing on portions different from the second embodiment. The portions common to the first embodiment are represented by the same terms and the same reference signs.

Figure 8:
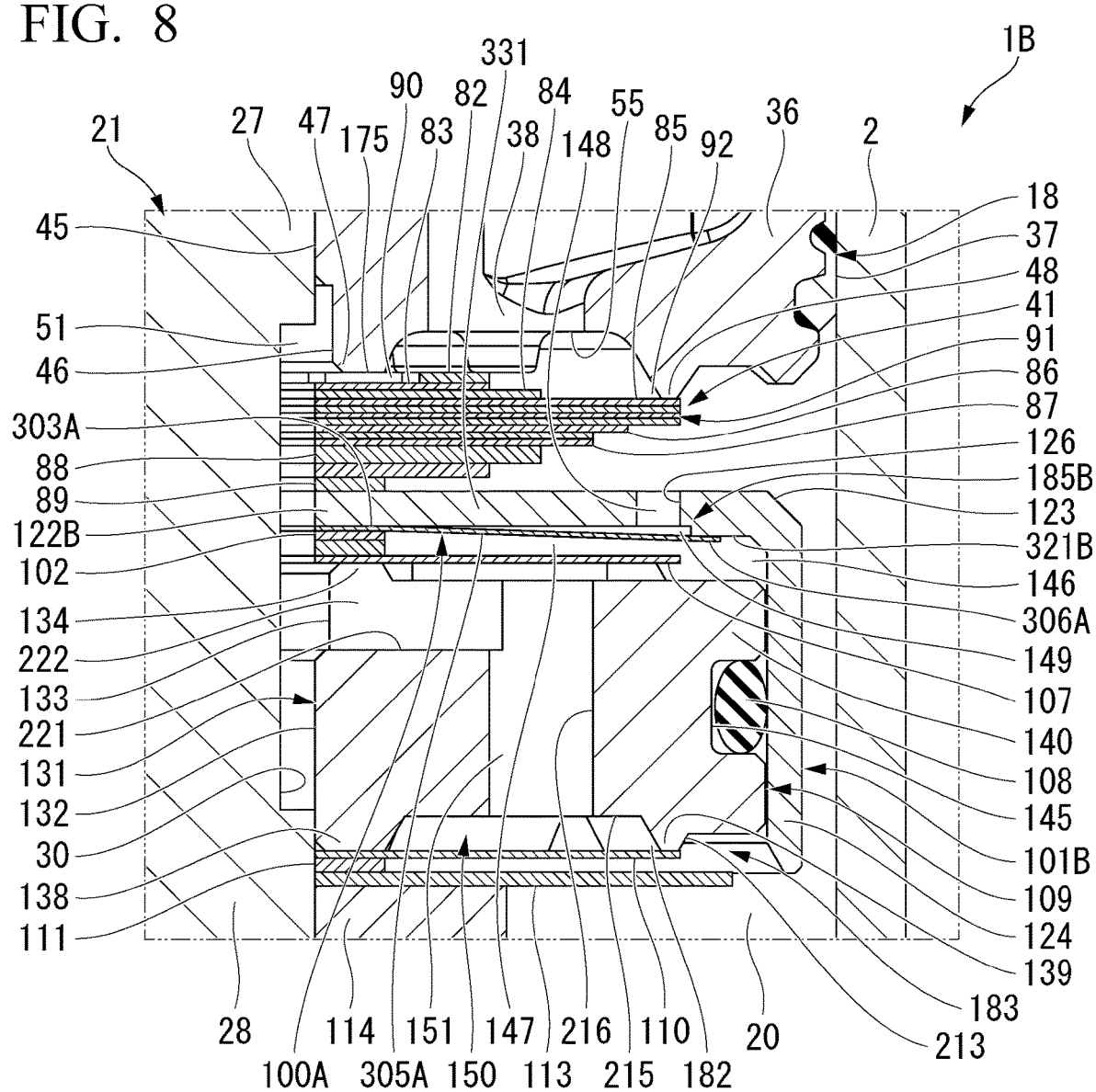
FIG. 8 is a partial cross-sectional view showing the periphery of a cap member and a valve seat member of a shock absorber according to a third embodiment of the present invention.

In a shock absorber 1B of the third embodiment, as shown in FIG. 8, the step adjustment shim 321 of the second embodiment is not provided. In the shock absorber 1B of the third embodiment, a cap member 101B which is partially different from the cap member 101 of the first and second embodiments is provided instead of the cap member 101 of the first and second embodiments.

A bottom portion 122B of the cap member 101B is different from the bottom portion 122 of the first embodiment. The bottom portion 122B has a bottom portion main body 331 having a perforated circular plate shape and a constant thickness similar to the bottom portion 122 of the first embodiment and an annular cap protruding portion 321B (a cap member side protruding portion) that protrudes on the same side as the intermediate tapered portion 123 in the axial direction inside the intermediate tapered portion 123 in the radial direction from the outer peripheral edge portion of the bottom portion main body 331. The outer peripheral side of the cap protruding portion 321B is connected to the intermediate tapered portion 123. The cap member 101B is also an integrally formed product including the bottom portion 122B constituted by the bottom portion main body 331 and the cap protruding portion 321B, the intermediate tapered portion 123, and the tubular portion 124 and is integrally formed by, for example, plastic working or cutting of a metal plate.

The bottom portion 122B has a shape in which the step adjustment shim 321 which is a separate body in the second embodiment is integrally formed as the cap protruding portion 321B on the bottom portion main body 331 similar to the bottom portion 122 of the second embodiment. The inner peripheral surface of the cap protruding portion 321B is a cylindrical surface, and a side of the cap protruding portion 321B opposite to the bottom portion main body 331 in the axial direction is a flat surface extending in a direction orthogonal to the axis of the cap member 101B. The plurality of passage holes 126 similar to those of the first and second embodiments which penetrate the bottom portion main body 331 in the axial direction of the bottom portion main body 331 are formed inside the cap protruding portion 321B of the bottom portion main body 331 in the radial direction in the bottom portion 122B.

In the flexible disk 100A, the inner peripheral side contact portion 303A on the inner peripheral side thereof is interposed between the disk 102 and the bottom portion main body 331 in a state in which the flexible disk 100A is incorporated in the shock absorber 1B, and the outer peripheral edge portion 306A on the outer peripheral side thereof is in contact with the cap protruding portion 321B of the cap member 101B over the entire circumference. As a result, the flexible disk 100A is elastically deformed in a tapered shape such that the flexible portion 305A and the outer peripheral edge portion 306A are separated from the bottom portion main body 331 in the axial direction toward the outer side in the radial direction.

The flexible disk 100A is in contact with the cap protruding portion 321B over the entire circumference to divide the cap chamber 146 into the intermediate chamber 147 and the communication chamber 149. As the flexible portion 305A of the flexible disk 100A bends, the volume of the intermediate chamber 147 changes.

The third embodiment has a volume variable mechanism 185B which is partially different from the volume variable mechanism 185A. The volume variable mechanism 185B is constituted by the flexible disk 100A, the bottom portion 122B of the cap member 101B, the communication chamber 149, and the communication passage 148. Also in the volume variable mechanism 185B, the flexible disk 100A changes to reduce the volume of the communication chamber 149 provided in parallel with the second passage 182 by deforming and moving toward the bottom portion main body 331 of the bottom portion 122B and changes to increase the volume of the communication chamber 149 by deforming and moving away from the bottom portion main body 331 of the bottom portion 122.

In a case in which the piston 18 or the like is assembled to the piston rod 21, the annular member 69, the disk 68, the disk 67, the plurality of disks 66, the plurality of disks 65, the plurality of disks 64, the disk 63, the plurality of disks 62, the piston 18, the disk 82, the disks 83, the disk 84, the plurality of disks 85, the disk 86, the plurality of disks 87, the plurality of disks 88, and the disk 89 are superposed on the shaft step portion 29 in order while the attachment shaft portion 28 of the piston rod 21 is inserted as in the first and second embodiments.

Further, the cap member 101B with the bottom portion 122B facing the piston 18 side, the flexible disk 100A, and the plurality of disks 102 are superposed on the disk 89 in order while the attachment shaft portion 28 is inserted.

Further, the sub valve 107, the valve seat member 109 on which the O-ring 108 is mounted, the sub valve 110, the disk 111, the disk 113, and the plurality of annular members 114 are superposed on the plurality of disks 102 in order while the attachment shaft portion 28 is inserted as in the first and second embodiments. In this state, the nut 115 is screwed to the male screw 31 of the piston rod 21 protruding with respect to the annular member 114, and the nut 115 and the shaft step portion 29 clamp at least the inner peripheral side of the above-described constituent elements in the axial direction.

In this state, the flexible disk 100A is in contact with the cap protruding portion 321B of the cap member 101B at the outer peripheral edge portion 306A. Further, in this state, in the flexible disk 100A, the inner peripheral side contact portion 303A is clamped between the bottom portion main body 331 of the cap member 101B and the disk 102.

In the flexible disk 100A, when the outer peripheral edge portion 306A is in contact with the cap protruding portion 321B of the cap member 101B and the inner peripheral side contact portion 303A is clamped between the bottom portion main body 331 of the cap member 101B and the disk 102, the outer peripheral edge portion 306A is in contact with the cap protruding portion 321B over the entire circumference in a state in which a preload corresponding to the height of the cap protruding portion 321B is applied. As in the first and second embodiments, even when the sub valve 107 is lifted to the maximum, the sub valve 107 does not come into contact with the flexible disk 100A.

The second damping force generating mechanism 183B of the third embodiment includes the sub valve 110 provided on one side of the second passage 182 and the volume variable mechanism 185B that changes the volume of the communication chamber 149 provided in parallel with the second passage 182. As a result, the volume variable mechanism 185B makes it possible to change the volume of the communication chamber 149 provided in parallel with the second passage 182. Therefore, as in the second embodiment, it is possible to change the flow rate of the oil liquid flowing through the second passage 182. Therefore, it is possible to suppress the generation of abnormal noise.

In the shock absorber 1B of the third embodiment, the intermediate chamber 147 of which the communication with the communication passage 148 is blocked by the flexible disk 100A is formed between the flexible disk 100A and the second sub valve 107, and the capacity of the intermediate chamber 147 can be made variable by the bending of the flexible disk 100A. As a result, as in the first embodiment, it is possible to achieve both the desired damping performance at extremely low speed and the suppression of the abnormal noise.

Further, the cap protruding portion 321B that is constantly in contact with the flexible disk 100A is integrally formed with the bottom portion 122B of the cap member 101B, and thus it is possible to suppress the increase of the number of parts and the increase of the assembling man-hours.

In the above third embodiment, the second damping force generating mechanisms 173 and 183B are provided on the lower chamber 20 side which is one of the upper chamber 19 and the lower chamber 20, but they can also be provided on the upper chamber 19 side. In this case, for example, the cap member 101B, the flexible disk 100A, the plurality of disks 102, the sub valve 107, the valve seat member 109 on which the O-ring 108 is mounted, the sub valve 110, the disk 111, and the disk 113 are disposed between the annular member 69 (see FIG. 2) and the disk 68 (see FIG. 2) in that arrangement order with reversed in the axial direction. Besides this, as described in the first embodiment, the same changes as those in the case where the second damping force generating mechanisms 173 and 183B are provided in the upper chamber 19 are made.

Fourth Embodiment

Next, a fourth embodiment will be described mainly based on FIGS. 9 and 10, focusing on portions different from the second embodiment. The portions common to the second embodiment are represented by the same terms and the same reference signs.

Figure 9:
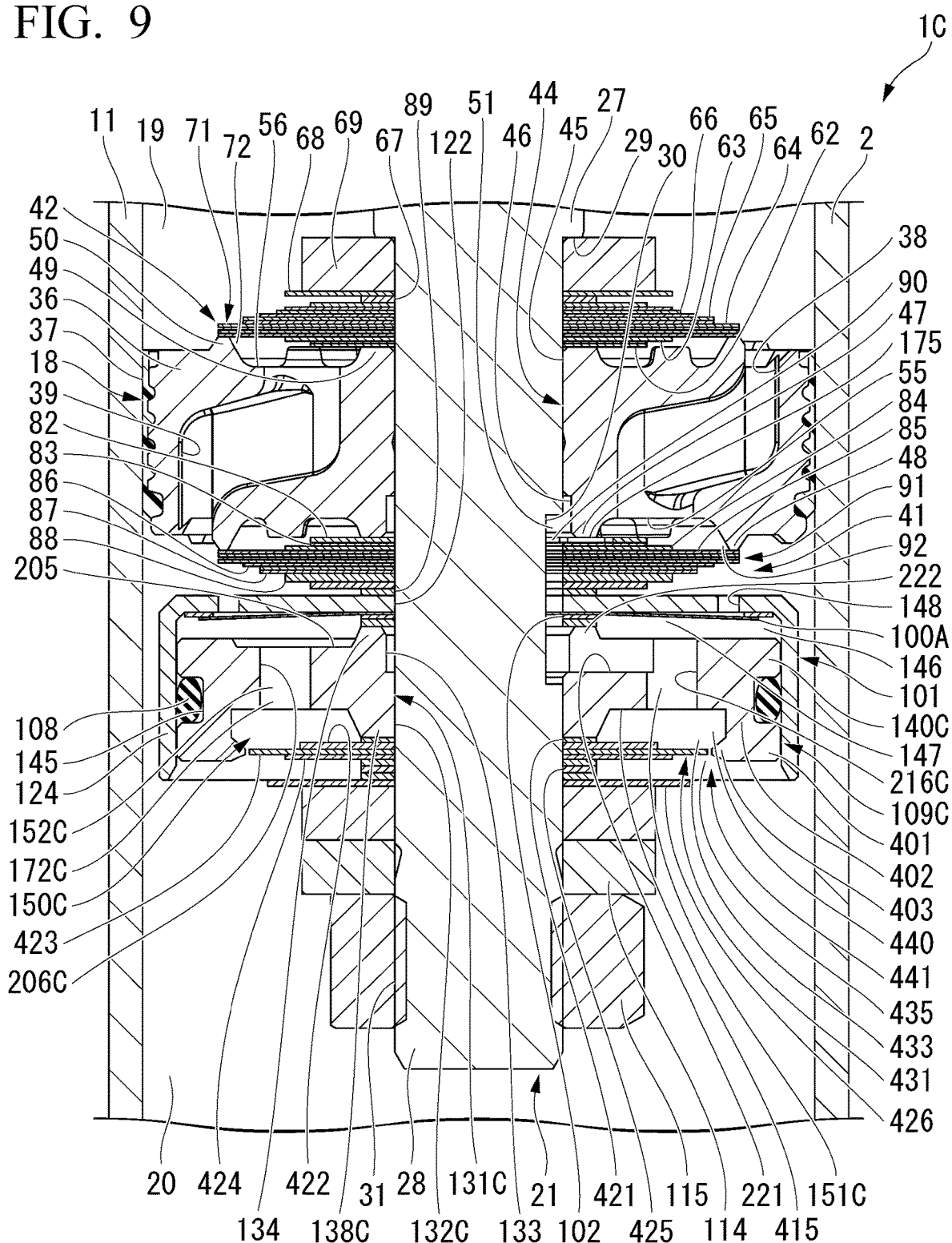
FIG. 9 is a partial cross-sectional view showing a main part of a shock absorber according to a fourth embodiment of the present invention.

In a shock absorber 1C of the fourth embodiment, as shown in FIG. 9, a valve seat member 109C which is partially different from the valve seat member 109 of the second embodiment is provided instead of the valve seat member 109 of the second embodiment.

The valve seat member 109C has a through hole 131C having a shorter axial length than that of the through hole 131 of the second embodiment. The through hole 131C has a small-diameter hole portion 132C on one side in the axial direction which has a shorter axial length than that of the small-diameter hole portion 132 of the second embodiment and the large-diameter hole portion 133 on the other side in the axial direction which is the same as that of the second embodiment. The small-diameter hole portion 132C is also a portion of the through hole 131C to which the attachment shaft portion 28 of the piston rod 21 is fitted.

In the valve seat member 109C, the end portion on the large-diameter hole portion 133 side in the axial direction has the inner seat portion 134 similar to that of the second embodiment. In the valve seat member 109C, an end portion on the small-diameter hole portion 132C side in the axial direction is different from that of the second embodiment. The valve seat member 109C has an inner seat portion 138C having an annular shape that surrounds the small-diameter hole portion 132C and a passage forming portion 401 having a tubular shape that surrounds the inner seat portion 138C at the end portion on the small-diameter hole portion 132C in the axial direction. In the valve seat member 109C, a portion among the inner seat portion 134, the inner seat portion 138C, and the passage forming portion 401 in the axial direction is a main body portion 140C of which the thickness is mainly different from that of the main body portion 140 of the second embodiment.

The inner seat portion 134 protrudes from the inner peripheral edge portion of the main body portion 140C on the large-diameter hole portion 133 side in the axial direction to one side of the main body portion 140C in the axial direction.

The inner seat portion 138C protrudes from the inner peripheral edge portion of the main body portion 140C on the small-diameter hole portion 132C side in the axial direction to a side of the main body portion 140C opposite to the inner seat portion 134 in the axial direction. The passage forming portion 401 protrudes from the main body portion 140C to the same side as the inner seat portion 138C in the axial direction of the main body portion 140C at the radial outer side of the inner seat portion 138C. In the inner seat portion 138C, a tip end surface on the protruding side, that is, a tip end surface on a side opposite to the main body portion 140C in the axial direction is a flat surface. The inner seat portions 134 and 138C have the same outer diameter.

The passage forming portion 401 includes a cylindrical portion 402 having a cylindrical shape which protrudes from the main body portion 140C to the same side as the inner seat portion 138C in the axial direction of the main body portion 140C at the radial outer side of the inner seat portion 138C, and an annular protrusion 403 having a annular shape which protrudes inward in the radial direction from the inner peripheral portion of the end portion of the cylindrical portion 402 on a side opposite to main body portion 140C.

Figure 10:
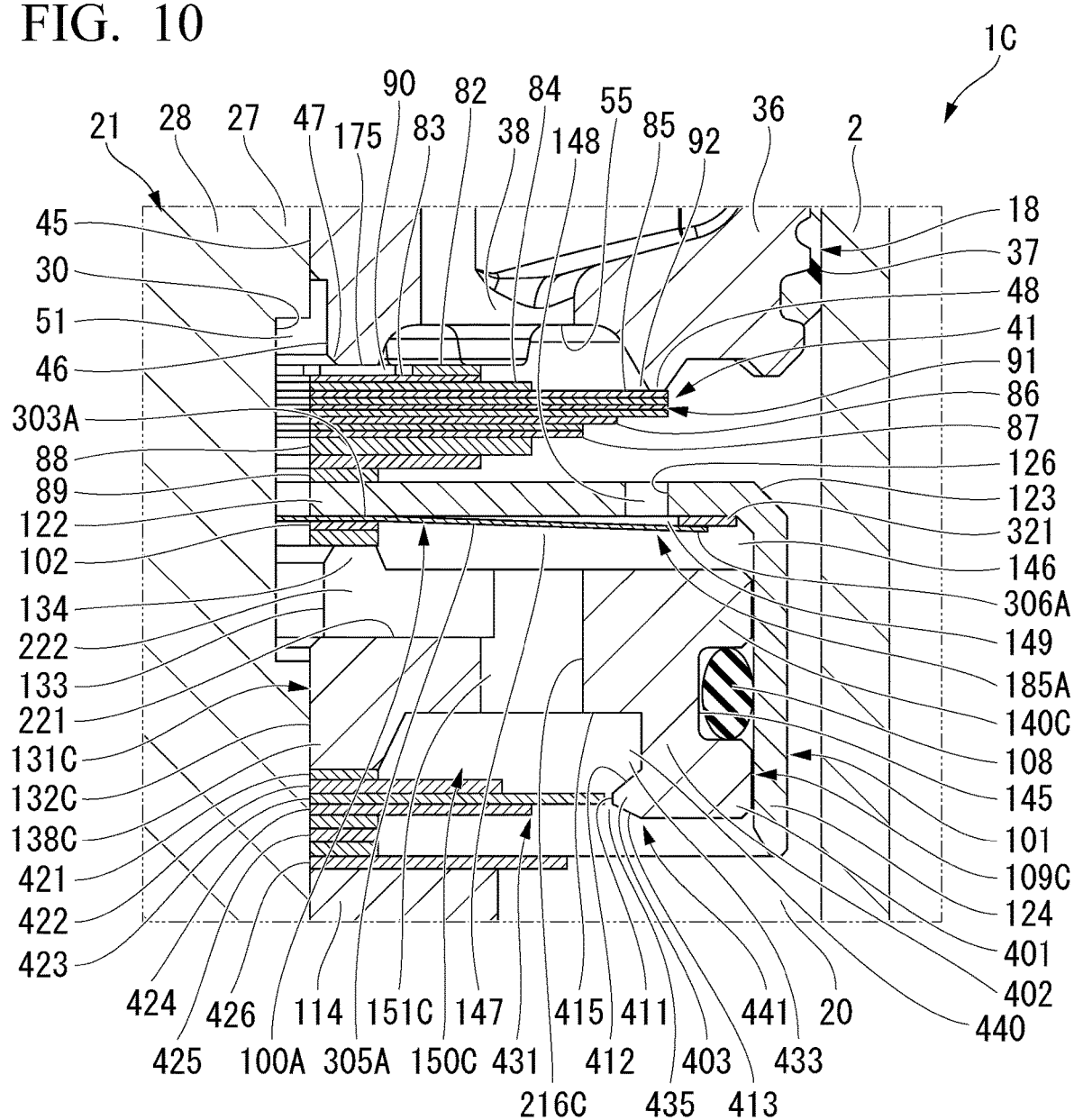
FIG. 10 is a partial cross-sectional view showing the periphery of a cap member and a valve seat member of the shock absorber according to the fourth embodiment of the present invention.

As shown in FIG. 10, the annular protrusion 403 has an intermediate cylindrical surface 411 having a constant diameter smaller than the inner diameter of the cylindrical portion 402, a base end side tapered surface 412 which is located on the main body portion 140C side from the intermediate cylindrical surface 411 in the axial direction and has a larger diameter toward the main body portion 140C side, and a tip end side tapered surface 413 which is located on a side opposite to the intermediate cylindrical surface 411 from the main body portion 140C in the axial direction and has a larger diameter as the distance from the main body portion 140C increases. The base end side tapered surface 412 and the tip end side tapered surface 413 are inclined at the same angle with respect to the intermediate cylindrical surface 411.

The valve seat member 109C has the main body portion 140C, the inner seat portion 138C, and a passage forming portion 401, and an annular passage recess 415 is formed by being surrounded by these portions. The passage recess 415 is recessed from the inner seat portion 138C and a tip end surface of the passage forming portion 401 on the protruding side in the axial direction of the valve seat member 109C.

As shown in FIG. 9, a passage hole 206C having a shorter axial length than the passage hole 206 of the second embodiment is formed at an intermediate position of the passage recess 415 in the radial direction of the valve seat member 109C. The passage hole 206C is also formed in a bottom surface of each of the passage recesses 205. The passage hole 206C is also open to a bottom surface of the passage recess 415.

A passage hole 216C having a shorter axial length than the passage hole 216 of the second embodiment is formed at an intermediate position of the passage recess 415 in the radial direction of the valve seat member 109C. The passage groove 221 extends from the passage hole 216C to the large-diameter hole portion 133. The passage hole 216C is also open to a bottom surface of the passage recess 415.

The passage hole 216C and the passage recess 415 to which the passage hole 216C is open form a first passage portion 151C provided in the valve seat member 109C. The radial passage 222 of the passage groove 221 extends in the radial direction toward the first passage portion 151. The passage hole 206C and the passage recess 415 to which the passage hole 206C is open form a second passage portion 152C provided in the valve seat member 109C. In the present embodiment, a sub valve 431 also serves as the sub valve 107 of the first embodiment.

The plurality of first passage portions 151C and the plurality of second passage portions 152C are provided in the valve seat member 109C to form a valve seat member passage portion 150C through which the oil liquid flows. In other words, the valve seat member passage portion 150C has the plurality of first passage portions 151C and the plurality of second passage portions 152C. The passage recess 415 is a portion common to the first passage portions 151C and the second passage portions 152C.

In the valve seat member 109C, at an intermediate position of the outer peripheral portion in the axial direction between the main body portion 140C and the passage forming portion 401, the seal groove 145 similar to that of the second embodiment is formed. The O-ring 108 is disposed in the seal groove 145 to seal a gap between the tubular portion 124 of the cap member 101 and the valve seat member 109C.

The cap member 101, the O-ring 108, and the valve seat member 109C constitute a cap chamber 146 similar to that of the second embodiment inside the cap member 101. The annular valve seat member 109C and the bottomed tubular cap member 101 are disposed in the lower chamber 20 which is one of the upper chamber 19 and the lower chamber 20. At this time, in the valve seat member 109C, the inner seat portion 134 is disposed on the cap chamber 146 side, and the passage forming portion 401 is disposed on the lower chamber 20 side. The valve seat member 109C divides the intermediate chamber 147 of the cap chamber 146 and the lower chamber 20 from each other and is provided to face both the intermediate chamber 147 and the lower chamber 20.

In the shock absorber 1C of the fourth embodiment, instead of the sub valve 110, the disk 111, and the disk 113 of the second embodiment, one disk 421, one disk 422, one disk valve 423, one disk 424, a plurality of (specifically three) disks 425, and one disk 426 are provided between the valve seat member 109C and the annular member 114.

The disks 421, 422, 424 to 426 and the disk valve 423 are made of a metal and each have a perforated circular flat plate shape having a constant thickness into which the attachment shaft portion 28 of the piston rod 21 can be fitted. The disks 421, 422, 424 to 426 and the disk valve 423 are all plain disks and are provided such that the attachment shaft portion 28 of the piston rod 21 is fitted to the inside of each of them.

The disk 421 has an outer diameter which is the same as the outer diameter of the tip end surface of the inner seat portion 138C. The disk 422 has an outer diameter larger than the outer diameter of the disk 421. The outer diameter of the disk valve 423 has an outer diameter larger than the outer diameter of the disk 422 and smaller than the inner diameter of the intermediate cylindrical surface 411 of the passage forming portion 401 by a predetermined amount. The disk 424 has an outer diameter smaller than the outer diameter of the disk valve 423 and larger than the outer diameter of the disk 422. The disk 425 has an outer diameter which is the same as the outer diameter of the disk 421. The disk 426 has an outer diameter smaller than the outer diameter of the disk valve 423 and larger than the outer diameter of the disk 424 and the outer diameter of the annular member 114.

The disks 421, 422, 424 to 426 and the disk valve 423 are clamped between the valve seat member 109C and the nut 115 at least on the inner peripheral sides thereof. The outer peripheral surface of the disk valve 423 which is a cylindrical surface overlaps the intermediate cylindrical surface 411 of the annular protrusion 403 of the passage forming portion 401 of the valve seat member 109C in an axial position to face the intermediate cylindrical surface 411 in the radial direction. The disks 421 and 425 are integrally connected to the piston rod 21 to support the inner peripheral side of the disk valve 423 in a cantilevered manner via the disks 422 and 424.

In the disk valve 423, an outer peripheral end is a free end, and disk valve 423 can be elastically deformed. In addition to the disk valve 423, also in the disks 422 and 424, each outer peripheral side is a free end, and the disks 422 and 424 can be elastically deformed. In the disk valve 423 and the disks 422 and 424, each inner peripheral side is connected to the piston rod 21 to integrally move with the piston rod 21, and each outer peripheral side constitutes a sub valve 431 (a first sub valve) that can be elastically deformed.

The sub valve 431 including the disk valve 423 forms a member inner chamber 433 with the valve seat member 109C. The member inner chamber 433 is formed by the passage recess 415 and the sub valve 431. The member inner chamber 433 constantly communicates with the upper chamber 19 via the plurality of first passage portion 151C, the intermediate chamber 147, the radial passage 222 in the passage groove 221 of the valve seat member 109C, the passage in the large-diameter hole portion 133 of the valve seat member 109, the piston rod passage portion 51 in the passage cutout portion 30 of the piston rod 21, the passage in the large-diameter hole portion 46 of the piston 18, the passage in the cutout portion 90 of the disk 82, and the passage in the annular groove 55 and the plurality of passage holes 38 of the piston 18.

The member inner chamber 433 constantly communicates with the lower chamber 20 via a variable passage 435 between the disk valve 423 and the passage forming portion 401. The disk valve 423 supported in a cantilevered manner by the disks 421 and 425 together with the disks 422 and 424 is elastically deformed with a differential pressure between the member inner chamber 433 and the lower chamber 20, that is, a differential pressure between the upper chamber 19 and the lower chamber 20.

In the variable passage 435, when the disk valve 423 is not elastically deformed and the position of disk valve 423 in the axial direction overlaps the position of the intermediate cylindrical surface 411 of the annular protrusion 403 in the axial direction, a flow path cross-sectional area is minimized. When the disk valve 423 is elastically deformed, as the distance from the intermediate cylindrical surface 411 increases, the flow path cross-sectional area increases.

The variable passage 435 between the sub valve 431 and the passage forming portion 401, the member inner chamber 433, the plurality of second passage portions 152C of the valve seat member 109C, the intermediate chamber 147, the radial passage 222 in the passage groove 221 of the valve seat member 109C, the passage in the large-diameter hole portion 133 of the valve seat member 109C, the piston rod passage portion 51 in the passage cutout portion 30 of the piston rod 21, the passage in the large-diameter hole portion 46 of the piston 18, the passage in the cutout portion 90 of the disk 82, and the passage in the annular groove 55 and the plurality of passage holes 38 of the piston 18 constitute a second passage 172C through which the oil liquid flows from the lower chamber 20 which becomes an upstream side to the upper chamber 19 which becomes a downstream side in the cylinder 2 by the movement of the piston 18 toward the lower chamber 20, that is, in the contraction stroke.

The second passage 172C becomes a passage on a contraction side through which the oil liquid flows from the lower chamber 20 which becomes an upstream side toward the upper chamber 19 which becomes a downstream side at the time of the movement of the piston 18 toward the lower chamber 20, that is, in the contraction stroke. A fixed orifice that allows the upper chamber 19 and the lower chamber 20 to constantly communicate with each other is not formed in the second passage 172C, and thus the second passage 172C is not a passage that allows the upper chamber 19 and the lower chamber 20 to constantly communicate with each other.

The passage in the plurality of passage holes 38 and the annular groove 55 of the piston 18, the passage in the cutout portion 90 of the disk 82, the piston rod passage portion 51 in the passage cutout portion 30 of the piston rod 21, the passage in the large-diameter hole portion 46 of the piston 18, the passage in the large-diameter hole portion 133 of the valve seat member 109C, the radial passage 222 in the passage groove 221 of the valve seat member 109C, the intermediate chamber 147, the plurality of first passage portions 151C of the valve seat member 109C, the member inner chamber 433, and the variable passage 435 between the sub valve 431 and the passage forming portion 401 constitute a second passage 440 through which the oil liquid flows from the upper chamber 19 which becomes an upstream side in the cylinder 2 to the lower chamber 20 which becomes a downstream side in the cylinder 2 by the movement of the piston 18 toward the upper chamber 19, that is, in the extension stroke. The second passage 440 allows the upper chamber 19 and the lower chamber 20 constantly communicate with each other.

The second passage 440 allows the oil liquid to flow from the lower chamber 20 which becomes an upstream side in the cylinder 2 to the upper chamber 19 which becomes a downstream side in the cylinder 2 also at the time of the movement of the piston 18 toward the lower chamber 20, that is, in the contraction stroke. Therefore, the second passage 440 becomes a passage on a contraction side through which the oil liquid flows from the lower chamber 20 which becomes an upstream side toward the upper chamber 19 which becomes a downstream side at the time of the movement of the piston 18 toward the lower chamber 20, that is, in the contraction stroke. Further, the second passage 440 becomes a passage on an extension side through which the oil liquid flows from the upper chamber 19 which becomes an upstream side toward the lower chamber 20 which becomes a downstream side at the time of the movement of the piston 18 toward the upper chamber 19, that is, in the extension stroke.

The sub valve 431 and the passage forming portion 401 of the valve seat member 109C constitute a second damping force generating mechanism 441 in both expansion and contraction strokes which is provided in the second passage 440 through which the oil liquid flows in both expansion and contraction strokes, opens and closes the second passage 440, and suppresses the flow of the oil liquid in the second passage 440 to generate a damping force. The second damping force generating mechanism 441 is also provided in the second passage 172C through which the oil liquid flows in the contraction stroke, opens and closes the second passage 172C, and suppresses the flow of the oil liquid in the second passage 172C to generate a damping force.

In the second passages 172C and 440, the passage in the cutout portion 90 of the disk 82 becomes the narrowest among portions in which a flow path cross-sectional area is fixed to be throttled more than the front and back thereof and becomes an orifice 175 in the second passages 172C and 440.

The second passages 172C and 440 which are passages on a contraction side through which the upper chamber 19 and the lower chamber 20 can communicate with each other are parallel to the first passage 72 which is a passage on a contraction side through which the upper chamber 19 and the lower chamber 20 can communicate with each other, the first damping force generating mechanism 42 is provided in the first passage 72, and the second damping force generating mechanism 441 is provided in the second passages 172C and 440. Therefore, the first damping force generating mechanism 42 and the second damping force generating mechanism 441 are disposed in parallel.

The second passage 440 which is a passage on an extension side through which the upper chamber 19 and the lower chamber 20 can communicate with each other is parallel to the first passage 92 which is a passage on an extension side through which the upper chamber 19 and the lower chamber 20 can communicate with each other, except for the passage in the plurality of passage holes 38 and the annular groove 55 on the upper chamber 19 side. In the parallel portion, the first damping force generating mechanism 41 is provided in the first passage 92, and the second damping force generating mechanism 441 is provided in the second passage 440. Therefore, the first damping force generating mechanism 41 and the second damping force generating mechanism 441 are disposed in parallel.

Between the first damping force generating mechanism 41 on an extension side and the second damping force generating mechanism 441 on an extension side, the main valve 91 of the first damping force generating mechanism 41 has a rigidity and a valve opening pressure higher than those of the sub valve 431 of the second damping force generating mechanism 441. Therefore, in the extension stroke, in an extremely low speed region in which a piston speed is lower than a predetermined value, the valve of the second damping force generating mechanism 441 is opened in a state in which the valve of the first damping force generating mechanism 41 is closed. Further, in a normal speed region in which the piston speed is this predetermined value or more, the valve of the first damping force generating mechanism 41 and the valve of the second damping force generating mechanism 441 are both opened. The sub valve 431 is an extremely low speed valve which is opened to generate a damping force in a region in which the piston speed is extremely low.

That is, in the extension stroke, the piston 18 moves to the upper chamber 19 side, and thus the pressure in the upper chamber 19 increases and the pressure in the lower chamber 20 decreases, but in the extension stroke in which the piston speed is less than a fifth predetermined value, the second passage 440 allows the upper chamber 19 and the lower chamber 20 communicate with each other via the variable passage 435 in a state in which the flow path cross-sectional area is the smallest. Therefore, the oil liquid in the upper chamber 19 flows to the lower chamber 20 via the passage in the plurality of passage holes 38 and the annular groove 55 of the piston 18, the orifice 175, the passage in the large-diameter hole portion 46 of the piston 18, the passage in the passage cutout portion 30 of the piston rod 21, the passage in the large-diameter hole portion 133 of the valve seat member 109C, the radial passage 222, the first passage portion 151C, the member inner chamber 433, and the variable passage 435 in a state in which the flow path cross-sectional area is the smallest.

At this time, a part of the flowing flows from the first passage portion 151C to the intermediate chamber 147. As a result, the pressure in the intermediate chamber 147 is increased. Therefore, the flexible portion 305A of the flexible disk 100A shown in FIG. 10 bends toward the bottom portion 122 to increase the capacity of the intermediate chamber 147, and thus the increase in the pressure in the intermediate chamber 147 is suppressed.

Here, in the extension stroke of the shock absorber 1C at the time of low frequency input (at the time of large amplitude excitation), the amount of the oil liquid flowing from the upper chamber 19 into the intermediate chamber 147 becomes large as described above. Therefore, the flexible disk 100A is greatly deformed, the flexible portion 305A comes into contact with the bottom portion 122 of the cap member 101, and the contact area thereof becomes large. When the contact area of the flexible disk 100A with the bottom portion 122 is increased in this way, the amount of bending of the flexible disk 100A is limited, and thus the flexible disk 100A does not bend when a certain amount or more of a differential pressure is applied. Since the flexible disk 100A is completely bent in this way, the capacity of the intermediate chamber 147 is not increased. Then, the pressure in the intermediate chamber 147 is increased to the state in which the valve of the second damping force generating mechanism 441 is opened.

In a region in which the piston speed is higher than the fifth predetermined value and in an extremely low speed region in which the piston speed is higher than the fifth predetermined value and lower than a sixth predetermined value, the valve of the second damping force generating mechanism 441 is opened in a state in which the valve of the first damping force generating mechanism 41 is closed. That is, the sub valve 431 of the second damping force generating mechanism 441 is deformed toward the lower chamber 20 and opened to allow the oil liquid to flow from the upper chamber 19 to the lower chamber 20 in the second passage 440 including the variable passage 435. At this time, as the piston speed increases, the amount of deformation of the sub valve 431 toward the lower chamber 20 increases, and the variable passage 435 with the passage forming portion 401 expands. As a result, even in the extremely low speed region in which the piston speed is lower than the sixth predetermined value, the damping force of the valve characteristics (the characteristics in which the damping force is substantially proportional to the piston speed) can be obtained.

Further, in the extension stroke, in the normal speed region in which the piston speed is the sixth predetermined value or more, the valve of the first damping force generating mechanism 41 is opened while a state in which the sub valve 431 of the second damping force generating mechanism 441 is deformed toward the lower chamber 20 to increase a valve opening amount remains as described above. That is, the sub valve 431 is deformed toward the lower chamber 20, and the oil liquid flows from the upper chamber 19 to the lower chamber 20 through the second passage 440 including the variable passage 435, but at this time, the flow of the oil liquid is throttled by the orifice 175 provided on the upstream side from the sub valve 431 in the second passage 440, and thus the pressure applied to the main valve 91 increases and a differential pressure increases, the main valve 91 is separated from the valve seat portion 48, and the oil liquid flows from the upper chamber 19 to the lower chamber 20 through the first passage 92 on an extension side. Therefore, the oil liquid in the upper chamber 19 flows to the lower chamber 20 via the passage in the plurality of passage holes 38 and the annular groove 55 and the passage between the main valve 91 and the valve seat portion 48.

As a result, even in the above normal speed region in which the piston speed is the sixth predetermined value or more, the damping force of the valve characteristics (the characteristics in which the damping force is substantially proportional to the piston speed) can be obtained. The rate of the increase of the damping force on an extension side with respect to the increase of the piston speed in the normal speed region is lower than the rate of the increase of the damping force on an extension side with respect to the increase of the piston speed in the extremely low speed region. In other words, the inclination of the rate of the increase of the damping force on an extension side with respect to the increase in the piston speed in the normal speed region can be made lower than that in the extremely low speed region.

Here, in the extension stroke, in the normal speed region in which the piston speed is the sixth predetermined value or more, the differential pressure between the upper chamber 19 and the lower chamber 20 is higher than that in the low speed region in which the piston speed is the fifth predetermined value or more and less than the sixth predetermined value, but, since the first passage 92 is not throttled by the orifice, it is possible to allow the oil liquid to flow via the first passage 92 at a large flow rate by the main valve 91 being opened. By this and by throttling the second passage 440 with the orifice 175, it is possible to prevent the sub valve 431 from being deformed.

In the extension stroke at the time of high frequency input (at the time of small amplitude excitation) in which a higher frequency is input to the shock absorber 1C than that at the time of low frequency input described above, the amount of the oil liquid flowing from the upper chamber 19 into the intermediate chamber 147 is small. Therefore, the deformation of the flexible disk 100A is small, and it is possible to absorb the volume of the oil liquid flowing into the intermediate chamber 147 by the amount of bending of the flexible disk 100A. Therefore, the increase in the pressure in the intermediate chamber 147 becomes small. Therefore, at the time of rising of an extremely low speed damping force, it is possible to make the state of the shock absorber a state in which, as it were, there is no flexible disk 100A and the intermediate chamber 147 constantly communicates with the lower chamber 20 through the communication passage 148 of the cap member 101, that is, a state in which the structure of the shock absorber is the same as a structure having no second damping force generating mechanism 441.

Therefore, in comparison with the damping force characteristics at the time of low frequency input, the rise of the extremely low speed damping force becomes gentle. Further, in the extremely low speed region, when the flexible disk 100A is bent, the valve of the second damping force generating mechanism 441 is opened while increasing the volume of the oil liquid flowing into the intermediate chamber 147, and thus the extremely low speed damping force with respect to the same piston speed is lower than that at the time of low frequency input in which the flexible disk 100A is completely bent and the volume of the oil liquid flowing into the intermediate chamber 147 is not changed.

Between the first damping force generating mechanism 42 on a contraction side and the second damping force generating mechanism 441 on a contraction side, the main valve 71 of the first damping force generating mechanism 42 has a rigidity and a valve opening pressure higher than those of the sub valve 431 of the second damping force generating mechanism 441. Therefore, in the contraction stroke, in the extremely low speed region in which the piston speed is lower than a predetermined value, the valve of the second damping force generating mechanism 441 is opened in a state in which the valve of the first damping force generating mechanism 42 is closed, and in a normal speed region in which the piston speed is higher than the predetermined value, the valve of the first damping force generating mechanism 42 and the valve of the second damping force generating mechanism 441 are both opened. The sub valve 431 is an extremely low speed valve which is opened to generate a damping force in a region in which the piston speed is extremely low in the contraction stroke.

That is, in the contraction stroke, the piston 18 moves to the lower chamber 20 side, and thus the pressure in the lower chamber 20 increases and the pressure in the upper chamber 19 decreases. Then, in the extension stroke in which the piston speed is less than a seventh predetermined value, the second passage 440 allows the upper chamber 19 and the lower chamber 20 communicate with each other via the variable passage 435 in a state in which the flow path cross-sectional area is the smallest. Therefore, the oil liquid in the lower chamber 20 flows to the upper chamber 19 via the variable passage 435 in a state in which the flow path cross-sectional area is the smallest, the member inner chamber 433, the first passage portion 151 of the valve seat member 109C, the radial passage 222 of the valve seat member 109C, and the passage in the large-diameter hole portion 133 of the valve seat member 109C, the passage in the passage cutout portion 30 of the piston rod 21, the passage in the large-diameter hole portion 46 of the piston 18, the orifice 175, and the passage in the annular groove 55 and the plurality of passage holes 38 of the piston 18.

Then, in a region in which the piston speed is higher than the seventh predetermined value and in an extremely low speed region in which the piston speed is higher than the seventh predetermined value and lower than an eighth predetermined value, the sub valve 431 of the second damping force generating mechanism 441 is deformed toward the member inner chamber 433 and opened in a state in which the valve of the first damping force generating mechanism 42 is closed to allow the oil liquid to flow from the lower chamber 20 to the upper chamber 19 through the second passages 172C and 440 including the variable passage 435. At this time, as the piston speed increases, the amount of deformation of the sub valve 431 toward the member inner chamber 433 increases, and the variable passage 435 with the passage forming portion 401 expands. As a result, even in the extremely low speed region in which the piston speed is lower than the eighth predetermined value, the damping force of the valve characteristics (the characteristics in which the damping force is substantially proportional to the piston speed) can be obtained.

Further, in the contraction stroke, in the normal speed region in which the piston speed is the seventh predetermined value or more, the valve of the first damping force generating mechanism 42 is opened while the sub valve 431 of the second damping force generating mechanism 441 is deformed toward the member inner chamber 433 to increase a valve opening amount as described above. That is, the sub valve 431 is deformed toward the member inner chamber 433, and the oil liquid flows from the lower chamber 20 to the upper chamber 19 through the second passages 172C and 440 including the variable passage 435, but at this time, in the second passages 172C and 440, the flow rate of the oil liquid is throttled by the orifice 175, and thus a differential pressure generated at the main valve 71 increases, the main valve 71 is separated from the valve seat portion 50, and the oil liquid flows from the lower chamber 20 to the upper chamber 19 through the first passage 72 on a contraction side. Therefore, the oil liquid in the lower chamber 20 flows to the upper chamber 19 via the passage in the plurality of passage holes 39 and the annular groove 56 and the passage between the main valve 71 and the valve seat portion 50.

As a result, even in the above normal speed region in which the piston speed is the eighth predetermined value or more, the damping force of the valve characteristics (the characteristics in which the damping force is substantially proportional to the piston speed) can be obtained. The rate of the increase of the damping force on a contraction side with respect to the increase of the piston speed in the normal speed region is lower than the rate of the increase of the damping force on a contraction side with respect to the increase of the piston speed in the extremely low speed region. In other words, the inclination of the rate of the increase of the damping force on a contraction side with respect to the increase in the piston speed in the normal speed region can be made lower than that in the extremely low speed region.

In the contraction stroke, in the normal speed region in which the piston speed is the eighth predetermined value or more, the differential pressure between the upper chamber 19 and the lower chamber 20 is higher than that in the low speed region, but, since the first passage 72 is not throttled by the orifice, it is possible to allow the oil liquid to flow via the first passage 72 at a large flow rate by the main valve 71 being opened. By this and by throttling the second passages 172C and 440 with the orifice 175, it is possible to prevent the sub valve 431 from being deformed.

Further, at this time (in a case in which the piston speed is high), the differential pressure between the lower chamber 20 and the upper chamber 19 becomes large, but the second passages 172C and 440 are throttled with the orifice 175, and thus the pressure in the member inner chamber 433 communicating with the upper chamber 19 via the orifice 175 becomes the pressure between the lower chamber 20 and the upper chamber 19. Therefore, it is possible to prevent the differential pressure between the intermediate chamber 147 and the lower chamber 20 from becoming too large. By this and by opening the main valve 71 to allow the oil liquid to flow at a large flow rate through the first passage 72, it is possible to prevent the sub valve 431 from being deformed.

In the contraction stroke, the damping force characteristics by the damping valve mechanism 197 are also combined.

The same changes as those of the fourth embodiment with respect to the second embodiment can be made with respect to the first embodiment and can also be made with respect to the third embodiment. It is also possible to make the same changes with respect to the fifth to tenth and thirteenth embodiments which will be described later.

Fifth Embodiment

Next, a fifth embodiment will be described mainly based on FIGS. 11 to 13, focusing on portions different from the first embodiment. The portions common to the first embodiment are represented by the same terms and the same reference signs.

In a shock absorber 1D of the fifth embodiment, the stopper member 32, the pair of supports 33, the coil spring 34, and the buffer 35 of the first embodiment are not provided.

Further, in the shock absorber 1D of the fifth embodiment, a first damping force generating mechanism 42D on a contraction side is partially different from the first damping force generating mechanism 42. The first damping force generating mechanism 42D includes the valve seat portion 50 of the piston 18. The first damping force generating mechanism 42D has, in order from the piston 18 side in the axial direction, one disk 62, a plurality of (specifically two)

disks 64 having the same inner diameter and the same outer diameter, a plurality of (specifically three) disks 65 having the same inner diameter and the same outer diameter, a plurality of (specifically two) disks 66D having the same inner diameter and the same outer diameter, one disk 67, one disk 68D, and one annular member 69D.

The disk 66D has an outer diameter smaller than the outer diameter of the disk 65 and larger than the outer diameter of the disk 67. The disk 68D has an outer diameter which is the same as the outer diameter of the disk 65. The disk 66D, the disk 68D, and the annular member 69D are made of a metal. The attachment shaft portion 28 of the piston rod 21 can be fitted into each of the disks 66D, the disk 68D, and the annular member 69D. The disks 66D and 68D are plain disks (flat disks without protrusions) that each have a perforated circular flat plate shape having a constant thickness.

The annular member 69D has a stepped shape in which an outer portion in the radial direction is shifted in the axial direction with respect to a remaining portion. The annular member 69D is thicker and more rigid than the disks 62, 64, 65, 66D, 67, and 68D. The annular member 69D has a base plate portion 501 and a step plate portion 502 both having an annular shape. The attachment shaft portion 28 can be fitted to the base plate portion 501. The base plate portion 501 has a perforated circular flat plate shape having a constant thickness. The step plate portion 502 is outside the base plate portion 501 in the radial direction of the base plate portion 501. The step plate portion 502 is shifted from the base plate portion 501 in the axial direction of the base plate portion 501. The annular member 69D is in contact with the shaft step portion 29 at the base plate portion 501 in a state in which the step plate portion 502 protrudes from the base plate portion 501 to a side opposite to the piston 18.

The shock absorber 1D has an annular buffer 35D. The main shaft portion 27 of the piston rod 21 is fitted into the buffer 35D. The buffer 35D is provided on a side of the annular member 69D opposite to the piston 18. In the shock absorber 1D, the buffer 35D comes into contact with the rod guide 22 (see FIG. 1) when the piston rod 21 completely extends.

The plurality of disks 64, the plurality of disks 65, and the plurality of disks 66D constitute a main valve 71D on a contraction side which can be detached and seated with respect to the valve seat portion 50. When the main valve 71D is separated from the valve seat portion 50, the main valve 71D allows the passage in the plurality of passage holes 39 and the annular groove 56 to communicate with the upper chamber 19 and suppresses the flow of oil liquid with the valve seat portion 50 to generate a damping force. The annular member 69D and the disk 68D restrict the deformation of the main valve 71D in an opening direction beyond a specified value by coming into contact with the main valve 71D.

The passage in the plurality of passage holes 39 and the annular groove 56 and the passage between the main valve 71D and the valve seat portion 50 which appears when the valve is opened constitute the first passage 72 on a contraction side which is the same as that of the first embodiment. The first damping force generating mechanism 42D includes the main valve 71D and the valve seat portion 50 and is provided in the first passage 72. Similar to the first damping force generating mechanism 42 of the first embodiment, the fixed orifice that allows the upper chamber 19 and the lower chamber 20 to constantly communicate with each other is not formed in the first damping force generating mechanism 42D on a contraction side.

Figure 12:
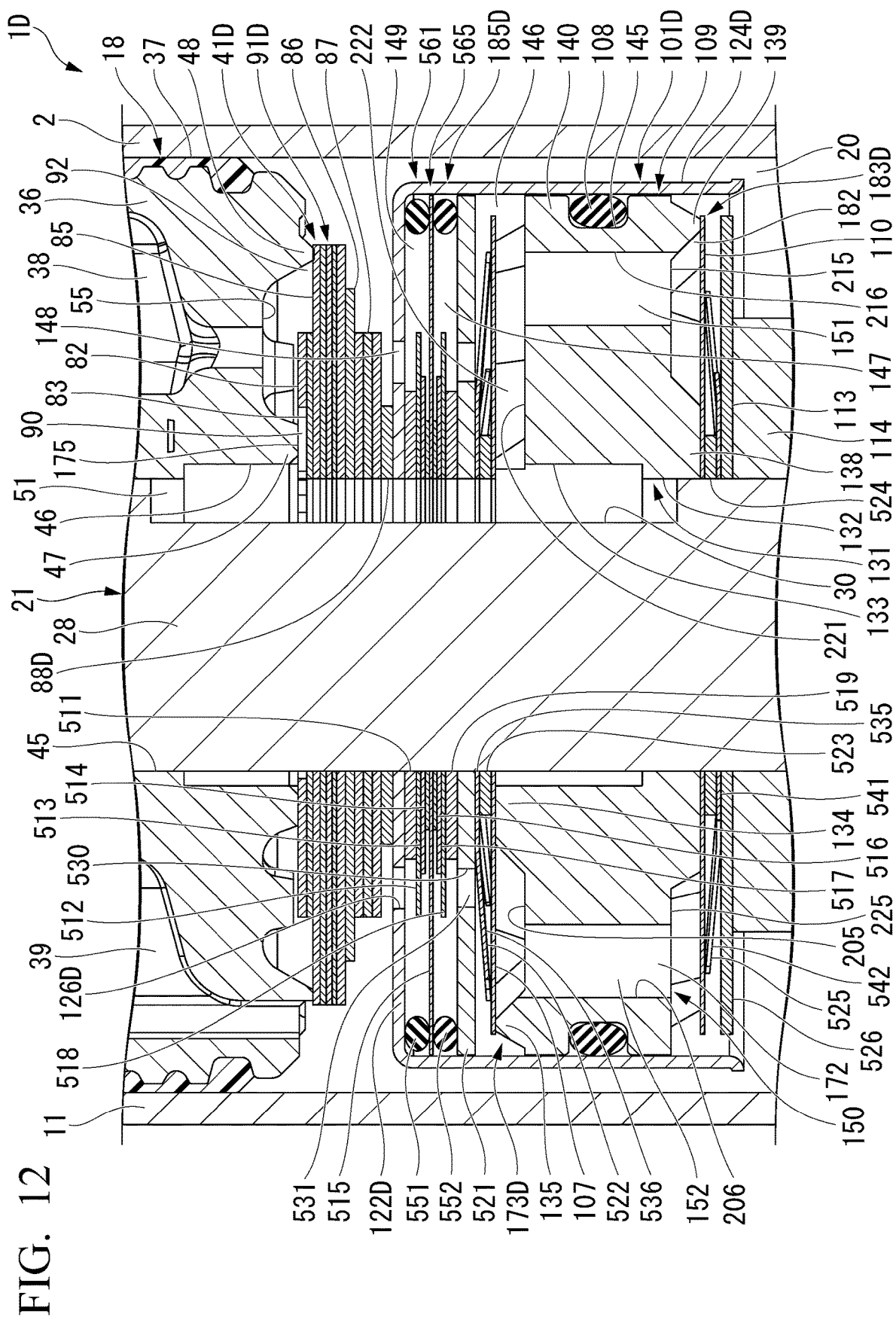
FIG. 12 is a partial cross-sectional view showing the periphery of a cap member and a valve seat member of the shock absorber according to the fifth embodiment of the present invention.
Figure 13:
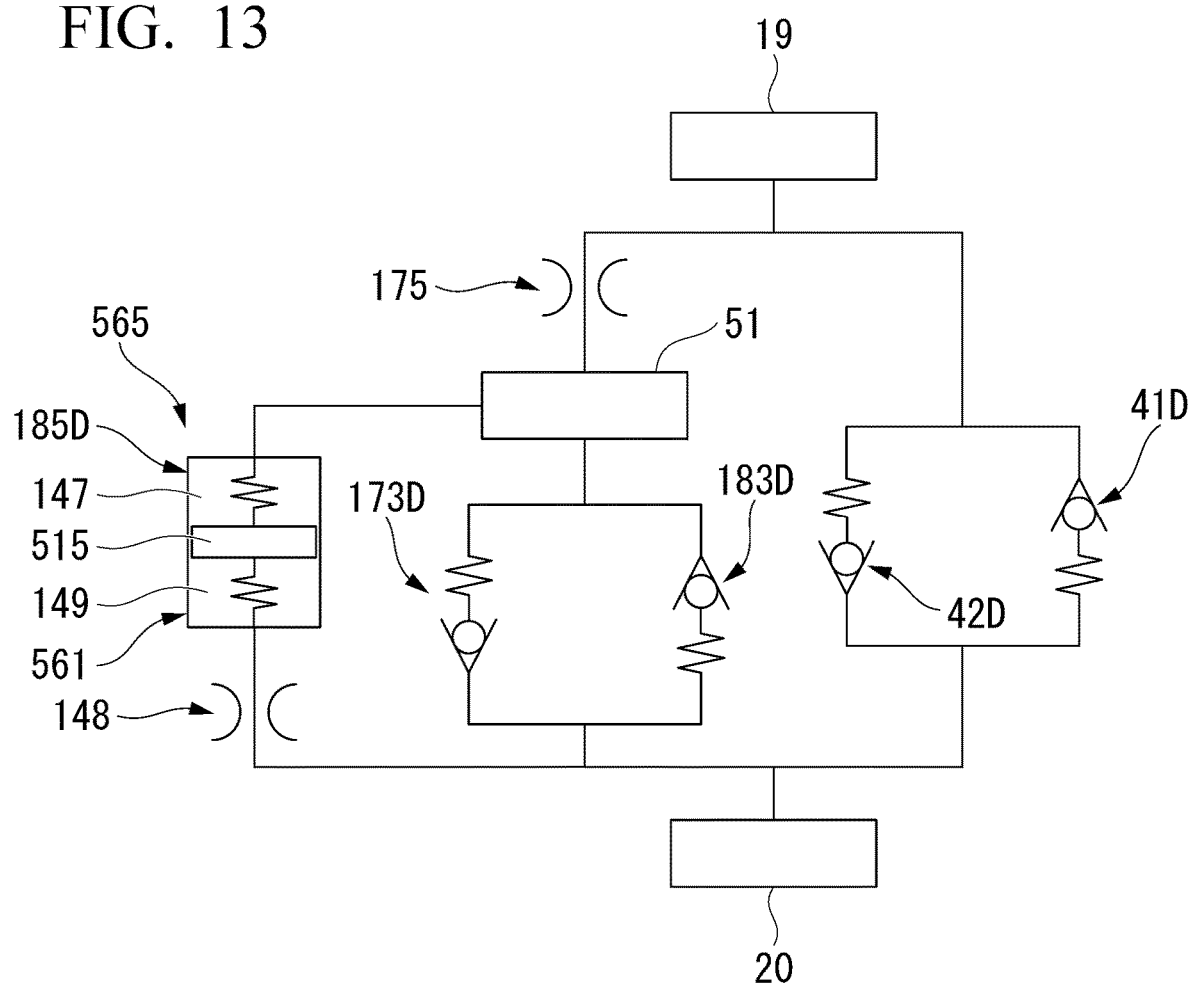
FIG. 13 is a hydraulic circuit diagram showing the shock absorber according to the fifth embodiment of the present invention.

As shown in FIG. 12, a first damping force generating mechanism 41D on an extension side includes the valve seat portion 48 of the piston 18 and has, in order from the piston 18 side in the axial direction, one disk 82, one disk 83, a plurality of (specifically four) disks 85 having the same inner diameter and the same outer diameter, one disk 86, a plurality of (specifically three) disks 87 having the same inner diameter and the same outer diameter, and one disk 88D.

The disk 88D has an outer diameter smaller than the outer diameter of the disk 87. The disk 88D is made of a metal. The disks 88D is a plain disk that has a perforated circular flat plate shape having a constant thickness into which the attachment shaft portion 28 of the piston rod 21 can be fitted.

The plurality of disks 85, the one disk 86, and the plurality of disks 87 constitute a main valve 91D on an extension side which can be detached and seated with respect to the valve seat portion 48. When the main valve 91D is separated from the valve seat portion 48, the main valve 91D allows the passage in the annular groove 55 and the plurality of passage holes 38 to communicate with the lower chamber 20 and suppresses the flow of oil liquid with the valve seat portion 48 to generate a damping force.

The passage in the plurality of passage holes 38 and the annular groove 55 and the passage between the main valve 91D and the valve seat portion 48 which appears when the valve is opened constitute the first passage 92 on an extension side which is the same as that of the first embodiment. The first damping force generating mechanism 41D includes the main valve 91D and the valve seat portion 48 and is provided in the first passage 92. Similar to the first damping force generating mechanism 41 of the first embodiment, the fixed orifice that allows the upper chamber 19 and the lower chamber 20 to constantly communicate with each other is not formed in the first damping force generating mechanism 41D on an extension side.

On a side of the first damping force generating mechanism 41D on an extension side opposite to the piston 18, in order from the first damping force generating mechanism 41D side, a cap member 101D which is partially different from the first embodiment, one disk 511, one disk 512, one disk 513, one disk 514, and one flexible disk 515 (a flexible member or a moving member) are provided such that the attachment shaft portion 28 of the piston rod 21 is fitted to the inside of each of them.

Further, on a side of the flexible disk 515 opposite to the piston 18, in order from the flexible disk 515 side, one disk 516, one disk 517, one disk 518, one disk 519, one stopper member 521, one spring disk 522, and one disk 523 are provided such that the attachment shaft portion 28 of the piston rod 21 is fitted to the inside of each of them.

Further, on a side of the disk 523 opposite to the piston 18, in order from the disk 523 side, the sub valve 107 (one side sub valve) similar to that of the first embodiment, the valve seat member 109 similar to that of the first embodiment, the sub valve 110 (the other side sub valve) similar to that of the first embodiment, one disk 524, one spring disk 525, one disk 526, and the annular member 114 similar to that of the first embodiment are provided such that the attachment shaft portion 28 of the piston rod 21 is fitted to the inside of each of them.

Figure 11:
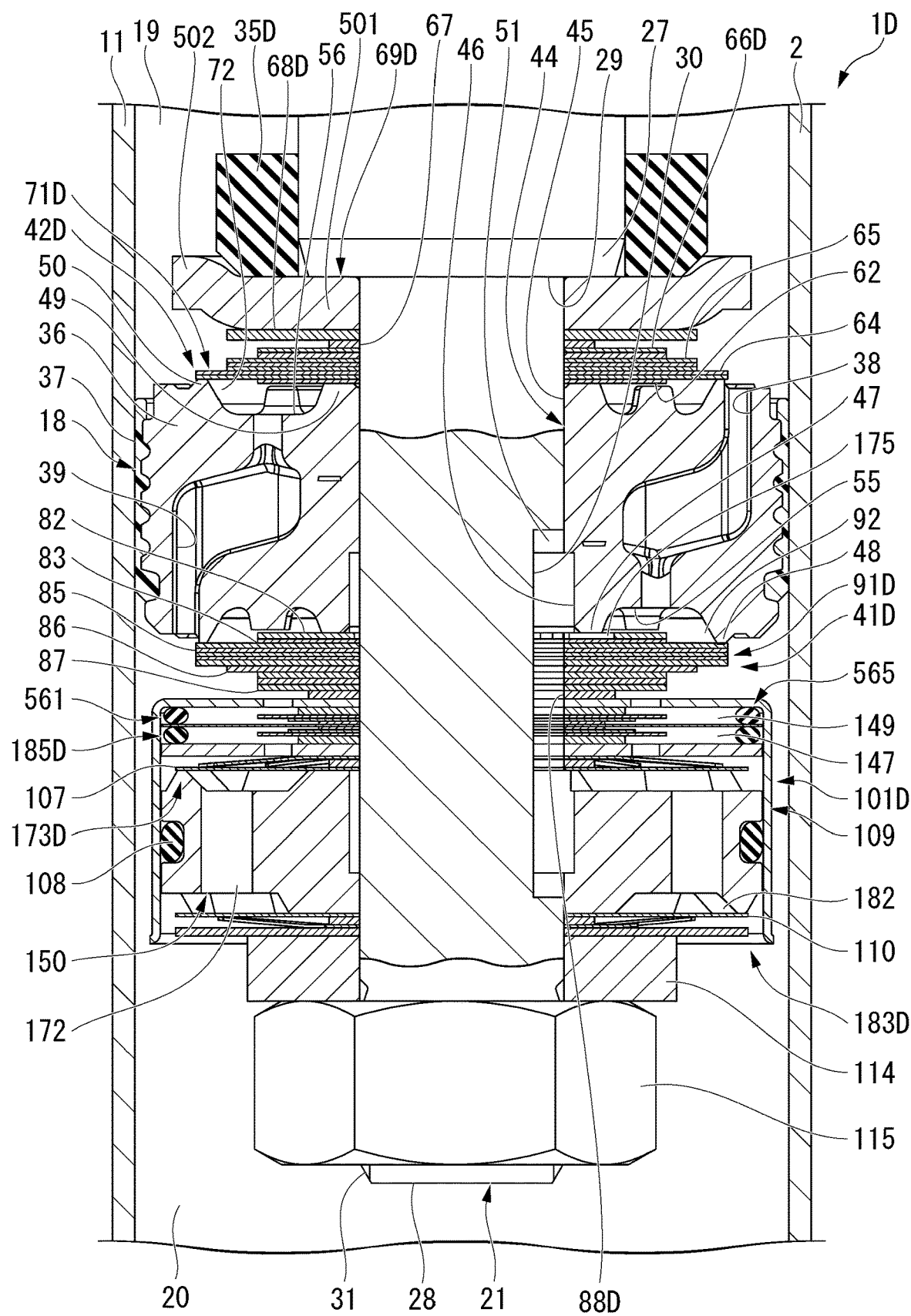
FIG. 11 is a partial cross-sectional view showing a main part of a shock absorber according to a fifth embodiment of the present invention.

As shown in FIG. 11, the nut 115 similar to that of the first embodiment is screwed to the male screw 31 of the attachment shaft portion 28 of the piston rod 21 which protrudes with respect to the annular member 114. As a result, at least the inner peripheral sides of the parts from the annular member 69D to the annular member 114 are clamped in the axial direction by the shaft step portion 29 and the nut 115.

As shown in FIG. 12, the cap member 101D is an integrally formed product having a bottomed tubular shape and is integrally formed by the plastic working of a metal plate. The cap member 101D has a bottom portion 122D having a perforated circular plate shape and a constant thickness and a cylindrical tubular portion 124D that extends from the outer peripheral edge portion of the bottom portion 122D in a direction opposite to the bottom portion 122D. The bottom portion 122D has the same shape as that of the bottom portion 122 of the first embodiment and is thinner than the bottom portion 122. A plurality of passage holes 126D similar to the passage holes 126 of the first embodiment are formed in the bottom portion 122D. The inside of the passage holes 126D is the communication passage 148. The tubular portion 124D has the same shape as that of the tubular portion 124 of the first embodiment and is thinner than the tubular portion 124. The cap member 101D is attached to the attachment shaft portion 28 of the piston rod 21 in a direction in which the tubular portion 124D protrudes from the bottom portion 122D to a side opposite to the piston 18.

The disks 511 to 514, 516 to 519, 523, 524, and 526, the flexible disk 515, the stopper member 521, and the spring disks 522 and 525 are all made of a metal. All of the disks 511 to 514, 516 to 519, 523, 524, and 526, the flexible disk 515, and the stopper member 521 are plain disks that each have a perforated circular flat plate shape having a constant thickness into which the attachment shaft portion 28 of the piston rod 21 can be fitted. The disks 511 to 514, 516 to 519, 523, 524, and 526, the flexible disk 515, the stopper member 521, and the spring disks 522 and 525 are all housed in the cap member 101D. The valve seat member 109 is also housed in the cap member 101D. The spring disks 522 and 525 each have an annular shape into which the attachment shaft portion 28 of the piston rod 21 can be fitted.

The disks 511 and 519 are common parts and each have an outer diameter smaller than twice the minimum distance from the center of the bottom portion 122D of the cap member 101D to the passage hole 126D. The disks 512 and 518 are common parts and each have an outer diameter larger than the outer diameter of each of the disks 511 and 519. The disks 513 and 517 are common parts and each have an outer diameter smaller than the outer diameter of each of the disks 512 and 518. The disks 514 and 516 are common parts and each have an outer diameter smaller than the outer diameter of each of the disks 513 and 517.

The flexible disk 515 has an outer diameter larger than the outer diameter of each of the disks 512 and 518. The outer diameter of the flexible disk 515 is slightly smaller than the inner diameter of the tubular portion 124D of the cap member 101D.

The stopper member 521 has an outer diameter slightly smaller than the inner diameter of the tubular portion 124D of the cap member 101D. A passage hole 530 penetrating the stopper member 521 in the axial direction is formed in the stopper member 521 such that the position of the passage hole 530 in the radial direction of the stopper member 521 coincides with the passage hole 126D of the cap member 101D. The inside of the passage hole 530 is a communication passage 531.

The spring disk 522 has a base plate portion 535 having a perforated circular flat plate shape to which the attachment shaft portion 28 is fitted, and a plurality of spring plate portions 536 extending from positions of the base plate portion 535 at equal intervals in the circumferential direction outward in the radial direction of the base plate portion 535. The base plate portion 535 has an outer diameter smaller than twice the minimum distance from the center of the stopper member 521 to the passage hole 530. The spring plate portions 536 are inclined with respect to the base plate portion 535 to be away from the base plate portion 535 in the axial direction of the base plate portion 535 toward an extension tip end side. The spring disk 522 is attached to the attachment shaft portion 28 such that the spring plate portions 536 extend from the base plate portion 535 toward the sub valve 107 in the axial direction of the base plate portion 535.

The disk 523 has an outer diameter smaller than the outer diameter of the base plate portion 535 of the spring disk 522. In the spring disk 522, the plurality of spring plate portions 536 are in contact with the sub valve 107. The disk 524 is a common part with the disk 523.

The spring disk 525 has a base plate portion 541 having a perforated circular flat plate shape to which the attachment shaft portion 28 is fitted, and a plurality of spring plate portions 542 extending from positions of the base plate portion 541 at equal intervals in the circumferential direction outward in the radial direction of the base plate portion 541. The base plate portion 541 has an outer diameter larger than the outer diameter of the disk 524. The spring plate portions 542 are inclined with respect to the base plate portion 541 to be away from the base plate portion 541 in the axial direction of the base plate portion 541 toward an extension tip end side. The spring disk 525 is attached to the attachment shaft portion 28 such that the spring plate portions 542 extend from the base plate portion 541 toward the sub valve 110 in the axial direction of the base plate portion 541. In the spring disk 525, the plurality of spring plate portions 542 are in contact with the sub valve 110. The disk 526 has an outer diameter which is the same as the outer diameter of the sub valve 110.

An O-ring 551 is provided between the bottom portion 122D of the cap member 101D and the flexible disk 515. The O-ring 551 is provided on the outer side of the flexible disk 515 in the radial direction with respect to the communication passage 148. At this position, the O-ring 551 is in contact with the flexible disk 515 and the bottom portion 122D with a tightening allowance. At this position, the O-ring 551 seals a portion between the flexible disk 515 and the bottom portion 122D over the entire circumference. The O-ring 551 supports the outer peripheral side of the flexible disk 515 clamped in the axial direction such that the inner peripheral side is integrated with the piston rod 21 on one side in the axial direction.

An O-ring 552 is provided between the flexible disk 515 and the stopper member 521. The O-ring 552 is a common part with the O-ring 551. The O-ring 552 is provided on the outer side of the flexible disk 515 in the radial direction with respect to the communication passage 531. At this position, the O-ring 552 is in contact with the flexible disk 515 and the stopper member 521 with a tightening allowance. At this position, the O-ring 552 seals a portion between the flexible disk 515 and the stopper member 521 over the entire circumference. The O-ring 552 is provided between the flexible disk 515 and the sub valve 107. The O-ring 552 supports the outer peripheral side of the flexible disk 515 on the other side opposite to the O-ring 551 in the axial direction.

The flexible disk 515 can be bent such that a portion radially inside the O-ring 551 approaches the bottom portion 122D or returns to the original state. The flexible disk 515 can be bent such that a portion between the O-ring 551 and the disks 514 and 516 approaches the bottom portion 122D or returns to the original state. The O-ring 551 has a circular cross section on a surface including the central axis. Therefore, when the amount of bending of the flexible disk 515 in a direction toward the bottom portion 122D increases, a support point of the O-ring 551 at which the flexible disk 515 is supported is moved toward an inner side of the flexible disk 515 in the radial direction. When the amount of bending of the flexible disk 515 decreases from this state, the support point of the O-ring 551 at which the flexible disk 515 is supported is moved toward an outer side of the flexible disk 515 in the radial direction.

The flexible disk 515 can be bent such that a portion radially inside the O-ring 552 approaches the stopper member 521 or returns to the original state. The flexible disk 515 can be bent such that a portion between the O-ring 551 and the disks 514 and 516 approaches the stopper member 521 or returns to the original state. The O-ring 552 has a circular cross section on a surface including the central axis. Therefore, when the amount of bending of the flexible disk 515 in a direction toward the stopper member 521 increases, a support point of the O-ring 552 at which the flexible disk 515 is supported is moved toward the inner side of the flexible disk 515 in the radial direction. When the amount of bending of the flexible disk 515 decreases from this state, the support point of the O-ring 552 at which the flexible disk 515 is supported is moved toward the outer side of the flexible disk 515 in the radial direction.

The cap member 101D, the O-ring 108, and the valve seat member 109 constitute a cap chamber 146 between the bottom portion 122D of the cap member 101D and the valve seat member 109. The sub valve 107 is provided in the cap chamber 146. The flexible disk 515 and the O-rings 551 and 552 are provided in the cap chamber 146. The flexible disk 515 is provided between the bottom portion 122D of the cap member 101D and the sub valve 107.

Due to the flexible disk 515 and the O-rings 551 and 552, the cap chamber 146 is divided into an intermediate chamber 147 on the sub valve 107 side with respect to the flexible disk 515 and a communication chamber 149 on the plurality of passage holes 126D side with respect to the flexible disk 515. The intermediate chamber 147 is provided between the flexible disk 515 and the stopper member 521. The flexible disk 515 and the O-rings 551 and 552 block the communication of the intermediate chamber 147 with the communication chamber 149 and the communication passage 148.

As the flexible disk 515 bends, the volumes of the intermediate chamber 147 and the communication chamber 149 change. That is, the bending of the flexible disk 515 causes the intermediate chamber 147 and the communication chamber 149 to have a function as an accumulator. When the communication chamber 149 absorbs the increase of the volume of the intermediate chamber 147, the volume of the communication chamber 149 decreases to discharge the oil liquid to the lower chamber 20. When the communication chamber 149 absorbs the decrease of the volume of the intermediate chamber 147, the volume of the communication chamber 149 increases to cause the oil liquid to flow in from the lower chamber 20. On the contrary, when the intermediate chamber 147 absorbs the increase of the volume of the communication chamber 149, the volume of the intermediate chamber 147 decreases to discharge the oil liquid to the upper chamber 19. When the intermediate chamber 147 absorbs the decrease of the volume of the communication chamber 149, the volume of the intermediate chamber 147 increases to cause the oil liquid to flow in from the upper chamber 19. It is configured to prevent the deformation of the flexible disk 515 from being hindered by the oil liquid in the intermediate chamber 147 and the communication chamber 149.

The sub valve 107 is seated on the valve seat portion 135 by a biasing force of the spring disk 522 and closes the second passage portion 152. The sub valve 107, the valve seat portion 135, the disk 523, the spring disk 522, and the stopper member 521 constitute a second damping force generating mechanism 173D on a contraction side which is provided in the second passage 172 on a contraction side, opens and closes the second passage 172, and suppresses the flow of the oil liquid from the second passage 172 to the upper chamber 19 to generate a damping force.

The intermediate chamber 147 communicating with the upper chamber 19 constitutes the second passage 172. The second damping force generating mechanism 173D and 183D each have a volume variable mechanism 185D that can change the volume of the intermediate chamber 147. The volume variable mechanism 185D is constituted by the flexible disk 515, the O-rings 551 and 552, the tubular portion 124D of the cap member 101D, the disks 516 to 519, the stopper member 521, the intermediate chamber 147, and the communication passage 531. The intermediate chamber 147 is provided between the flexible disk 515 and the sub valve 107 on the flow path. In the volume variable mechanism 185D, the flexible disk 515 changes to increase the volume of the intermediate chamber 147 by deforming and moving toward the bottom portion 122D and changes to reduce the volume of the intermediate chamber 147 by deforming and moving away from the bottom portion 122D.

The sub valve 110 is seated on the valve seat portion 139 by a biasing force of the spring disk 525 and closes the first passage portion 151. The sub valve 110, the valve seat portion 139, the disk 524, the spring disk 525, and the disk 526 constitute a second damping force generating mechanism 183D on an extension side which is provided in the second passage 182 on an extension side, opens and closes the second passage 182, and suppresses the flow of the oil liquid from the second passage 182 to the lower chamber 20 to generate a damping force.

The communication chamber 149 which constantly communicates with the lower chamber 20 via the communication passage 148 is disposed in parallel with the second passage 182. The second damping force generating mechanisms 173D and 183D each have a volume variable mechanism 561 that can change the volume of the communication chamber 149. The volume variable mechanism 561 is constituted by the flexible disk 515, the O-rings 551 and 552, the bottom portion 122D of the cap member 101D, the disks 511 to 514, the communication chamber 149, and the communication passage 148. The communication chamber 149 is provided between the flexible disk 515 and the sub valve 110 on the flow path via the lower chamber 20 and the communication passage 148. The flexible disk 515 changes to reduce the volume of the communication chamber 149 by deforming and moving toward the bottom portion 122D and changes to increase the volume of the communication chamber 149 by deforming and moving away from the bottom portion 122D. The flexible disk 515 and the O-rings 551 and 552 are shared between the volume variable mechanism 185D and the volume variable mechanism 561. The volume variable mechanism 185D and the volume variable mechanism 561 constitute an accumulator 565.

A gap is provided between the stopper member 521 and the tubular portion 124D of the cap member 101D. Therefore, a differential pressure in the radial direction is not generated in the O-ring 552. A differential pressure between the intermediate chamber 147 and the communication chamber 149 is applied to the O-ring 551. This differential pressure is the same as the differential pressure generated in the second damping force generating mechanisms 173D and 183D. Due to this differential pressure, the O-ring 551 seals a portion between the bottom portion 122D of the cap member 101D and the flexible disk 515. In the O-ring 551, the hardness of a rubber material and the tightening allowance with respect to the bottom portion 122D and the flexible disk 515 are set not to cause abnormal deformation at the differential pressure generated in the second damping force generating mechanisms 173D and 183D. A structure using the O-ring 551 is excellent in a function of preventing the oil liquid from leaking between the intermediate chamber 147 and the lower chamber 20.

A hydraulic circuit diagram of the shock absorber 1D described above is as shown in FIG. 13. That is, the first damping force generating mechanisms 41D and 42D and the second damping force generating mechanisms 173D and 183D are provided in parallel between the upper chamber 19 and the lower chamber 20, the orifice 175 and the piston rod passage portion 51 are provided between the upper chamber 19 and the second damping force generating mechanisms 173D and 183D, and the intermediate chamber 147 of the volume variable mechanism 185D of the accumulator 565 is connected to the piston rod passage portion 51. Further, the communication chamber 149 of the volume variable mechanism 561 of the accumulator 565 is connected to the lower chamber 20 via the communication passage 148 as an orifice.

Between the first damping force generating mechanism 41D on an extension side and the second damping force generating mechanism 183D on an extension side, the main valve 91D of the first damping force generating mechanism 41D has a rigidity and a valve opening pressure higher than those of the sub valve 110 of the second damping force generating mechanism 183D. Therefore, in the extension stroke, in an extremely low speed region in which a piston speed is lower than a predetermined value, the valve of the second damping force generating mechanism 183D is opened in a state in which the valve of the first damping force generating mechanism 41D is closed. Further, in a normal speed region in which the piston speed is this predetermined value or more, the valve of the first damping force generating mechanism 41D and the valve of the second damping force generating mechanism 183D are both opened.

That is, in the extension stroke, the pressure in the upper chamber 19 increases, and the pressure in the lower chamber 20 decreases. Then, although neither each of the first damping force generating mechanisms 41D and 42D nor each of the second damping force generating mechanisms 173D and 183D has a fixed orifice that allows the upper chamber 19 and the lower chamber 20 to constantly communicate with each other, the oil liquid in the upper chamber 19 flows into the intermediate chamber 147 via the passage in the plurality of passage holes 38 and the annular groove 55 of the piston 18, the orifice 175, the passage in the large-diameter hole portion 46 of the piston 18, the piston rod passage portion 51 in the passage cutout portion 30 of the piston rod 21, the passage in the large-diameter hole portion 133 of the valve seat member 109, the radial passage 222 in the passage groove 221 of the valve seat member 109, and the communication passage 531 of the stopper member 521. As a result, the pressure in the intermediate chamber 147 is increased. Therefore, in the volume variable mechanism 185D, a portion of the flexible disk 515 radially inside a contact position with the O-ring 551 bends toward the bottom portion 122D to increase the capacity of the intermediate chamber 147. As a result, the volume variable mechanism 185D suppresses the increase in the pressure in the intermediate chamber 147. At this time, since the flexible disk 515 bends and moves toward the bottom portion 122D, the volume variable mechanism 561 reduces the volume of the communication chamber 149.

Here, in the extension stroke of the shock absorber 1D at the time of low frequency input (at the time of large amplitude excitation), the amount of the oil liquid flowing from the upper chamber 19 into the intermediate chamber 147 becomes large as described above, and thus the flexible disk 515 is greatly deformed. When the amount of deformation of the flexible disk 515 becomes large, a reaction force due to the support rigidity on the clamped inner peripheral side becomes large, and the amount of deformation is limited. Accordingly, the pressure in the intermediate chamber 147 is increased. As a result, the pressure in the second passage 182 is increased to the state in which the valve of the second damping force generating mechanism 183D is opened.

Accordingly, the damping force steeply rises in the extension stroke until the valve of the second damping force generating mechanism 183D is opened in which the piston speed is low. Further, in the extension stroke, when the piston speed increases to the extremely low speed region, the valve of the second damping force generating mechanism 183D is opened in a state in which the valve of the first damping force generating mechanism 41D is closed. Then, the oil liquid in the upper chamber 19 flows to the lower chamber 20 via the second passage 182 on an extension side. Further, in the extension stroke, when the piston speed further increases to the normal speed region, the valve of the first damping force generating mechanism 41D is opened while a state in which the valve of the second damping force generating mechanism 183D is opened remains, and the oil liquid in the upper chamber 19 flows to the lower chamber 20 via the second passage 182 on an extension side and the first passage 92 on an extension side.

In the extension stroke at the time of high frequency input (at the time of small amplitude excitation) in which a higher frequency is input to the shock absorber 1D than that at the time of low frequency input described above, the amount of the oil liquid flowing from the upper chamber 19 into the intermediate chamber 147 is small. Therefore, the deformation of the flexible disk 515 is also small. Therefore, the volume variable mechanism 185D can absorb the volume of the oil liquid flowing into the intermediate chamber 147 by the amount of bending of the flexible disk 515. As a result, the increase of the pressure in the intermediate chamber 147 becomes small. Therefore, at the time of rising of an extremely low speed damping force, it is possible to make the state of the shock absorber a state in which, as it were, there is no flexible disk 515 and the intermediate chamber 147 constantly communicates with the lower chamber 20 through the communication passage 148 of the cap member 101D, that is, a state in which the structure of the shock absorber is the same as a structure having no second damping force generating mechanism 183D. Therefore, in the extension stroke, in comparison with the damping force characteristics at the time of low frequency input, the rise of the extremely low speed damping force becomes gentle.

Further, in the extremely low speed region, when the flexible disk 515 is bent, the valve of the second damping force generating mechanism 183D is opened while increasing the volume of the oil liquid flowing into the intermediate chamber 147, and thus the extremely low speed damping force with respect to the same piston speed is lower than that at the time of low frequency input in which the flexible disk 515 is completely bent and the volume of the oil liquid flowing into the intermediate chamber 147 is not changed. In other words, when the frequency of the piston 18 exceeds a predetermined frequency, the volume variable mechanism 185D including the flexible disk 515 limits the flow rate of the oil liquid to the sub valve 110 of the second damping force generating mechanism 183D.

Between the first damping force generating mechanism 42D on a contraction side and the second damping force generating mechanism 173D on a contraction side, the main valve 71D of the first damping force generating mechanism 42D has a rigidity and a valve opening pressure higher than those of the sub valve 107 of the second damping force generating mechanism 173D. Therefore, in the contraction stroke, in an extremely low speed region in which a piston speed is lower than a predetermined value, the valve of the second damping force generating mechanism 173D is opened in a state in which the valve of the first damping force generating mechanism 42D is closed. Further, in a normal speed region in which the piston speed is this predetermined value or more, the valve of the first damping force generating mechanism 42D and the valve of the second damping force generating mechanism 173D are both opened.

That is, in the contraction stroke, the pressure in the lower chamber 20 increases, and the pressure in the upper chamber 19 decreases. Then, although neither each of the first damping force generating mechanisms 41D and 42D nor each of the second damping force generating mechanisms 173D and 183D has a fixed orifice that allows the lower chamber 20 and the upper chamber 19 to constantly communicate with each other, the oil liquid in the lower chamber 20 flows into the communication chamber 149 via the communication passage 148 of the cap member 101D. As a result, the pressure in the communication chamber 149 is increased. Therefore, in the volume variable mechanism 561, a portion of the flexible disk 515 radially inside a contact position with the O-ring 552 bends toward the stopper member 521 to increase the capacity of the communication chamber 149. As a result, the volume variable mechanism 561 suppresses the increase in the pressure in the communication chamber 149. At this time, since the flexible disk 515 bends and moves toward the stopper member 521D, the volume variable mechanism 185D reduces the volume of the intermediate chamber 147.

Here, in the contraction stroke of the shock absorber 1D at the time of low frequency input (at the time of large amplitude excitation), the amount of the oil liquid flowing from the lower chamber 20 into the communication chamber 149 becomes large as described above, and thus the flexible disk 515 is greatly deformed. When the amount of deformation of the flexible disk 515 becomes large, a reaction force due to the support rigidity on the clamped inner peripheral side becomes large, the amount of deformation is limited, and the pressure in the communication chamber 149 is increased. As a result, the pressure in the communication chamber 149 is increased to the state in which the valve of the second damping force generating mechanism 173D is opened.

Accordingly, the damping force steeply rises in the contraction stroke until the valve of the second damping force generating mechanism 173D is opened in which the piston speed is low. Further, in the contraction stroke, when the piston speed increases to the extremely low speed region, the valve of the second damping force generating mechanism 173D is opened in a state in which the valve of the first damping force generating mechanism 42D is closed. Then, the oil liquid in the lower chamber 20 flows to the upper chamber 19 via the second passage 172 on a contraction side. Further, in the contraction stroke, when the piston speed further increases to the normal speed region, the valve of the first damping force generating mechanism 42D is opened while a state in which the valve of the second damping force generating mechanism 173D is opened remains, and the oil liquid in the lower chamber 20 flows to the upper chamber 19 via the second passage 172 on a contraction side and the first passage 72 on a contraction side.

In the contraction stroke at the time of high frequency input (at the time of small amplitude excitation) in which a higher frequency is input to the shock absorber 1D than that at the time of low frequency input described above, the amount of the oil liquid flowing from the lower chamber 20 into the communication chamber 149 is small. Therefore, the deformation of the flexible disk 515 is small. Therefore, the volume variable mechanism 561 can absorb the volume of the oil liquid flowing into the communication chamber 149 by the amount of bending of the flexible disk 515. Therefore, the increase in the pressure in the intermediate chamber 149 becomes small. Therefore, at the time of rising of an extremely low speed damping force, it is possible to make the state of the shock absorber a state in which, as it were, there is no flexible disk 515 and the communication chamber 149 constantly communicates with the upper chamber 19 through the communication passage 531 of the stopper member 521, that is, a state in which the structure of the shock absorber is the same as a structure having no second damping force generating mechanism 173D. Therefore, in the contraction stroke, in comparison with the damping force characteristics at the time of low frequency input, the rise of the extremely low speed damping force becomes gentle.

Further, in the extremely low speed region, when the flexible disk 515 is bent, the valve of the second damping force generating mechanism 173D is opened while increasing the volume of the oil liquid flowing into the communication chamber 149. Therefore, the extremely low speed damping force with respect to the same piston speed is lower than that at the time of low frequency input in which the flexible disk 515 is completely bent and the volume of the oil liquid flowing into the communication chamber 149 is not changed. In other words, when the frequency of the piston 18 exceeds a predetermined frequency, the volume variable mechanism 561 including the flexible disk 515 limits the flow rate of the oil liquid to the sub valve 107 of the second damping force generating mechanism 173D.

Here, the inclination of bending of the flexible disk 515 with respect to a load can be adjusted by the difference in the rigidity that can be adjusted by the plate thickness of the flexible disk 515 and the like. As a result, the inclination of the change in the damping force can be adjusted until the valves of the second damping force generating mechanisms 173D and 183D are opened.

At the time of low frequency input, if the inclination of the load with respect to the bending of the flexible disk 515 is too small (the spring constant is too low), the delay until the valves of the second damping force generating mechanisms 173D and 183D are opened becomes large. As a result, the extremely low speed damping force does not rise even at a low frequency, and there is a possibility that a spring damping function aimed at by the second damping force generating mechanisms 173D and 183D cannot be sufficiently obtained. Therefore, it is necessary to appropriately set the rigidity of the flexible disk 515 to be high and set the spring constants of the volume variable mechanisms 185D and 561 to be high.

Further, at the time of high frequency input, if the inclination of the load with respect to the bending of the flexible disk 515 is too large (the spring constant is too high), the load rises quickly with respect to the amount of the oil liquid flowing into the intermediate chamber 147 and the communication chamber 149 of the volume variable mechanisms 185D and 561 and reaches the valve opening pressure of the second damping force generating mechanisms 173D and 183D. As a result, even with a small amplitude excitation (a high frequency), the second damping force generating mechanisms 173D and 183D approach certain characteristics, and thus the effect of the volume variable mechanisms 185D and 561 is reduced. Therefore, it is necessary to appropriately set the rigidity of the flexible disk 515 to be low and set the spring constants of the volume variable mechanisms 185D and 561 to be low.

Therefore, it is necessary to appropriately adjust the spring constants of the volume variable mechanisms 185D and 561 such that the internal pressure increases at the low frequency and the internal pressure decreases at the high frequency which is a target of low damping according to specifications of the second damping force generating mechanisms 173D and 183D. With linear spring characteristics, it may be difficult to achieve both the low frequency and the high frequency, but as described above, the shock absorber 1D increases the support rigidity by moving the support points of the O-rings 551 and 552 at which the flexible disk 515 is supported toward an inner diameter side according to the amount of bending of the flexible disk 515. This results in a non-linear spring characteristic that provides the high rigidity with respect to the large bending, and it is possible to increase the spring constant at the low frequency and decrease the spring constant at the high frequency.

On the contrary, in a case in which the valve opening delay of the second damping force generating mechanisms 173D and 183D is too large, such as a case in which the valve opening pressure of the second damping force generating mechanisms 173D and 183D is high, when the flexible disk 515 bends to some extent, the bending of the flexible disk 515 is suppressed such that the load becomes high. When the flexible disk 515 bends to some extent, the above-described disks 511 to 514 and disks 516 to 519 come into contact with the flexible disk 515 to suppress the bending of the flexible disk 515.

In this way, it is possible to firmly generate the extremely low speed damping force with respect to the low frequency of spring damping, such as the responsiveness at the time of fine steering input and the flat feeling in ride quality on a smooth road, which requires the extremely low speed damping force. In addition, with respect to the high frequency and small amplitude input in which the abnormal noise due to the rod acceleration is generated, it is possible to weaken the extremely low speed damping force and improve the connection when the valves of the second damping force generating mechanisms 173D and 183D are opened. As a result, it is possible to suppress the generation of the abnormal noise caused by the rod acceleration. Therefore, it is possible to achieve both improvement in the performance of extremely low speed damping at the time of low frequency input and suppression of the generation of the abnormal noise at the time of high frequency input.

In the shock absorber 1D of the fifth embodiment, between the sub valve 107 in the cap chamber 146 and the bottom portion 122D of the cap member 101D, the movable and flexible disk 515 is provided. The volume variable mechanism 185D in which the intermediate chamber 147 of which the volume is changed by the movement of the flexible disk 515 is formed is provided between the flexible disk 515 and the sub valve 107. Therefore, it is possible to change the flow rate of the oil liquid flowing through the second passage 182 on an extension side. Therefore, it is possible to suppress the generation of the abnormal noise in the extension stroke.

Further, the shock absorber 1D has the sub valve 110 provided in the lower chamber 20 on a side opposite to the sub valve 107 of the valve seat member passage portion 150. The volume variable mechanism 561 in which the communication chamber 149 of which the volume is changed by the movement of the flexible disk 515 is formed is provided between the flexible disk 515 and the sub valve 110 on the flow path. Therefore, it is possible to change the flow rate of the oil liquid flowing through the second passage 172 on a contraction side. Therefore, it is possible to suppress the generation of the abnormal noise in the contraction stroke.

Further, the O-ring 551 is provided between the bottom portion 122D of the cap member 101D and the flexible disk 515, and the O-ring 552 is provided between the flexible disk 515 and the stopper member 521. Therefore, when the amount of bending of the flexible disk 515 increases, the support points of the O-rings 551 and 552 at which the flexible disk 515 is supported are moved toward an inner side in the radial direction. As a result, it is possible to make the flexible disk 515 having a non-linear spring characteristic that provides the high rigidity with respect to the large bending. As a member for supporting the outer peripheral side of the flexible disk 515, only at least one of the O-rings 551 and 552 may be employed and the other thereof may be substituted with a separate support member.

Here, it is preferable that the load characteristic of the accumulator 565 with respect to the bending of the flexible disk 515 be made such that it is easy to move with a small load in a region where the bending is small and it is difficult to move with a large load in a region where the deflection is large. For this purpose, setting is performed as one of the following (1) to (3). For example, a non-linear spring characteristic is set such that the spring becomes a low spring at a low load and the spring becomes a high spring at a high load.

(1) A non-linear characteristic which is set such that the spring constant is low and it is easy to bend with respect to minute bending, and the spring constant becomes high and it is difficult to bend when the bending is large.

(2) A non-linear characteristic which is set such that the spring constant is low and it is easy to bend with respect to minute bending, and it comes into contact with the stopper and does not bend any more when the bending is large.

(3) A linear characteristic which is set such that it bends appropriately even with a small amount of bending and the bending is appropriately suppressed when the bending is large.

Sixth Embodiment

Figure 14:
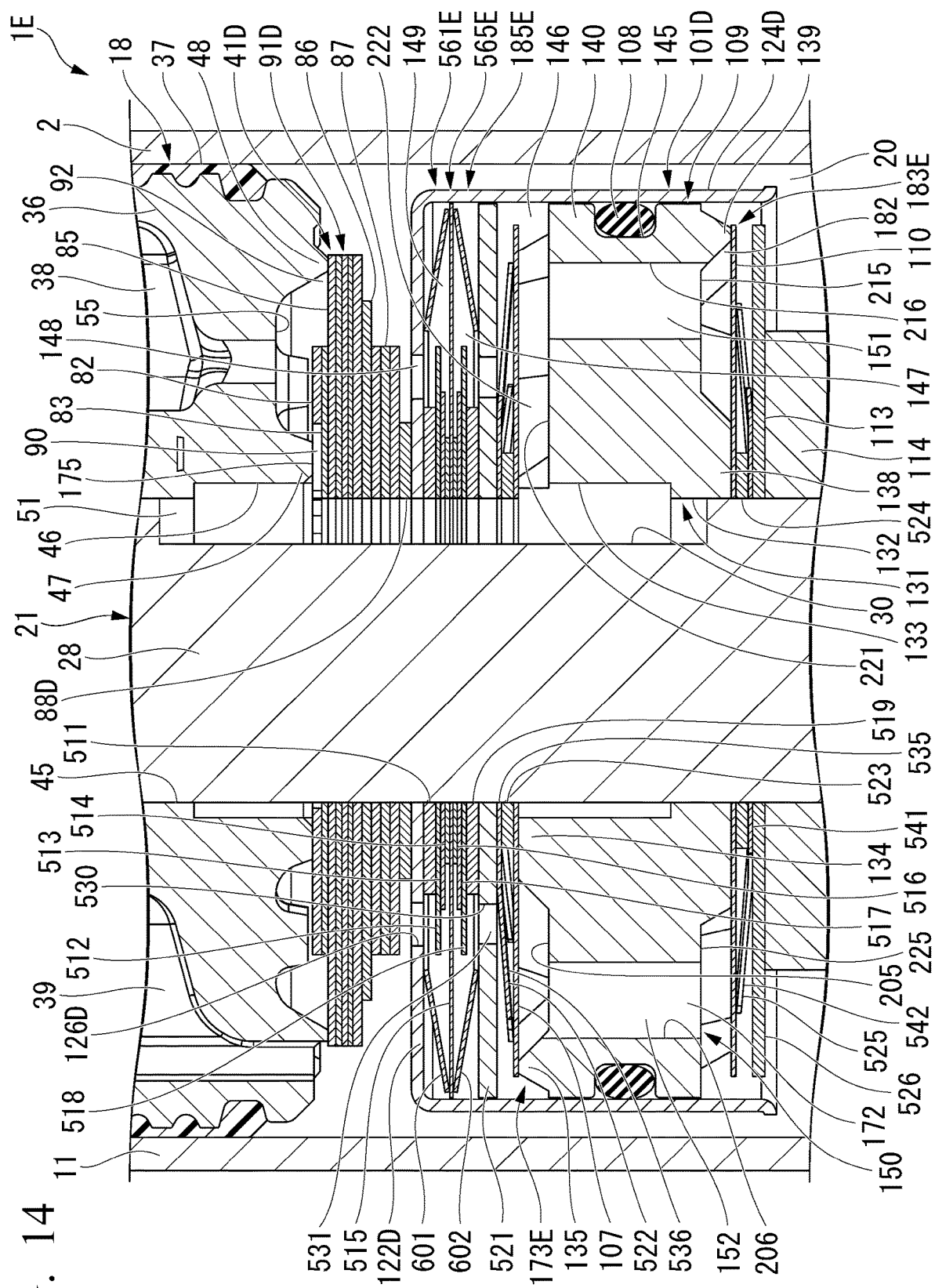
FIG. 14 is a partial cross-sectional view showing the periphery of a cap member and a valve seat member of a shock absorber according to a sixth embodiment of the present invention.

Next, a sixth embodiment will be described mainly based on FIGS. 14 to 16, focusing on portions different from the fifth embodiment. The portions common to the fifth embodiment are represented by the same terms and the same reference signs.

In a shock absorber 1E of the sixth embodiment, a second damping force generating mechanism 173E on a contraction side is partially different from the second damping force generating mechanism 173D. Further, in the shock absorber 1E of the sixth embodiment, a second damping force generating mechanism 183E on an extension side is partially different from the second damping force generating mechanism 183D. In the second damping force generating mechanisms 173E and 183E, a volume variable mechanism 561E is partially different from the volume variable mechanism 561. Further, in the second damping force generating mechanisms 173E and 183E, a volume variable mechanism 185E is partially different from the volume variable mechanism 185D. That is, the shock absorber 1E has an accumulator 565E that is partially different from the accumulator 565.

The volume variable mechanisms 561E and 185E are provided with conical disk springs 601 and 602 instead of the O-rings 551 and 552 of the volume variable mechanisms 561 and 185D. The conical disk spring 601 is provided between the bottom portion 122D of the cap member 101D and the flexible disk 515. The conical disk spring 602 is provided between the flexible disk 515 and the stopper member 521.

The conical disk spring 601 has a perforated tapered plate shape. The disks 511 to 514 are disposed inside the conical disk spring 601 in the radial direction. The conical disk spring 601 is inclined and extends to be located on the flexible disk 515 side in the axial direction toward the outer side in the radial direction. The inner peripheral edge portion of the conical disk spring 601 is in contact with the bottom portion 122D of the cap member 101D. The outer peripheral edge portion of the conical disk spring 601 is in contact with the flexible disk 515. The conical disk spring 601 supports the outer peripheral side of the flexible disk 515 of which the inner peripheral side is clamped in the axial direction on one side in the axial direction.

The conical disk spring 602 is a common part with the conical disk spring 601. The conical disk spring 602 has a perforated tapered shape. The disks 516 to 519 are disposed inside the conical disk spring 602 in the radial direction. The conical disk spring 602 is inclined and extends to be located on the flexible disk 515 side in the axial direction toward the outer side in the radial direction. The inner peripheral edge portion of the conical disk spring 602 is in contact with the stopper member 521. The outer peripheral edge portion of the conical disk spring 602 is in contact with the flexible disk 515. The conical disk spring 602 supports the outer peripheral side of the flexible disk 515 of which the inner peripheral side is clamped in the axial direction on the other side in the axial direction which is a side opposite to the conical disk spring 601.

In other words, the flexible disk 515 is supported by two conical disk springs 601 and 602. These conical disk springs 601 and 602 are disposed such that their concave sides face each other in a natural state.

In the volume variable mechanism 185E, when the oil liquid flows into the intermediate chamber 147 and the pressure in the intermediate chamber 147 is increased in the extension stroke, a portion of the flexible disk 515 radially inside a contact position with the conical disk spring 601 is bent toward the bottom portion 122D to increase the capacity of the intermediate chamber 147. At that time, in the conical disk spring 601, the support point at which the flexible disk 515 is supported does not move in the radial direction.

In the volume variable mechanism 561E, when the oil liquid flows into the communication chamber 149 and the pressure in the communication chamber 149 is increased in the contraction stroke, a portion of the flexible disk 515 radially inside a contact position with the conical disk spring 602 is bent toward the stopper member 521 to increase the capacity of the communication chamber 149. At that time, in the conical disk spring 602, the support point at which the flexible disk 515 is supported does not move in the radial direction.

In the shock absorber 1E of the sixth embodiment, the flexible disk 515 is supported by two conical disk springs 601 and 602 which are disposed such that their concave sides face each other in a natural state. Therefore, it is possible to maintain the support point at which the flexible disk 515 is supported at a constant position in the radial direction regardless of the amount of bending of the flexible disk 515. As a result, the flexible disk 515 can have a linear spring characteristic in which the rigidity does not change regardless of the amount of bending. When the flexible disk 515 bends to some extent, the disks 511 to 514 and the disks 516 to 519 come into contact with the flexible disk 515 to suppress the bending, and thus a non-linear spring characteristic can be obtained. When the rigidity is adjusted by adjusting the size and combination of the disks 511 to 514 and the disks 516 to 519, it is possible to achieve both improvement in the performance of extremely low speed damping at the time of low frequency input and suppression of the generation of the abnormal noise at the time of high frequency input as in the fifth embodiment.

When the conical disk springs 601 are 602 are used, it is possible to save space as compared with the case in which the O-rings 551 and 552 are used, and it is possible to suppress the increase in a basic shaft length of the shock absorber 1E due to addition of the accumulator 565E.

Figure 15:
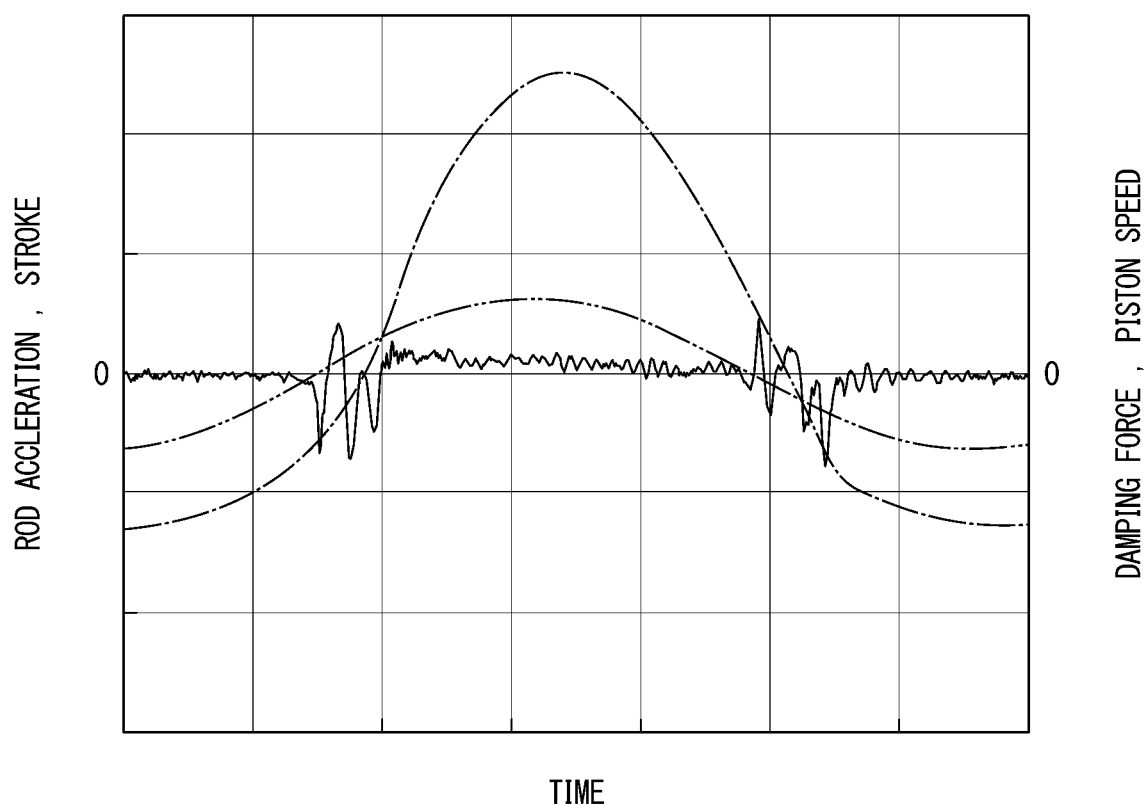
FIG. 15 is a characteristic diagram showing a damping force and the like of the shock absorber according to the sixth embodiment of the present invention.
Figure 16:
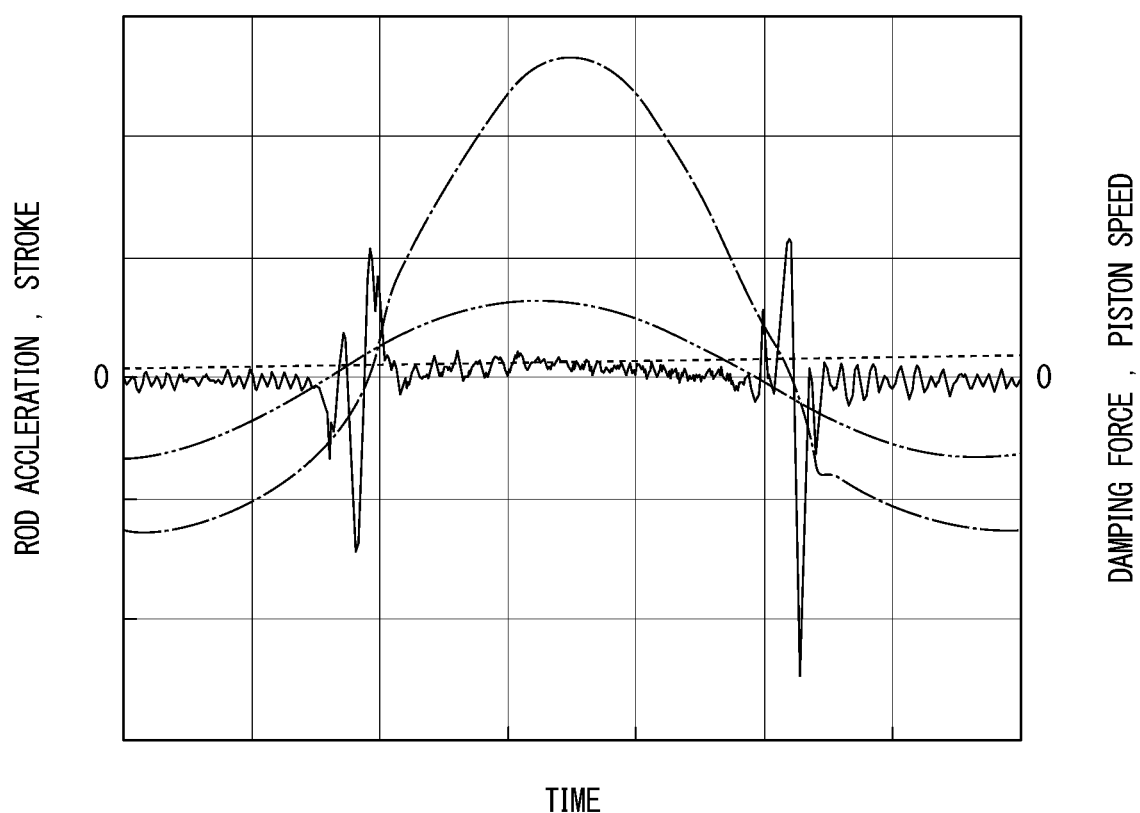
FIG. 16 is a characteristic diagram showing a damping force and the like of a shock absorber according to a comparative example.

FIG. 15 shows an actually measured value of rod acceleration of the shock absorber 1E of the sixth embodiment. FIG. 16 shows the results of a comparative example without the accumulator 565E. In FIGS. 15 and 16, the rod acceleration is shown by a solid line, the damping force is shown by a one-dot chain line, and the piston speed is shown by a two-dot chain line. As shown in FIG. 15, in the shock absorber 1E, it is possible to reduce the rod acceleration generated at the time of reversing the stroke from the extension stroke to the contraction stroke and at the time of reversing the stroke from the contraction stroke to the extension stroke as compared with the comparative example shown in FIG. 16. Therefore, it is possible to suppress the generation of the abnormal noise.

Seventh Embodiment

Figure 17:
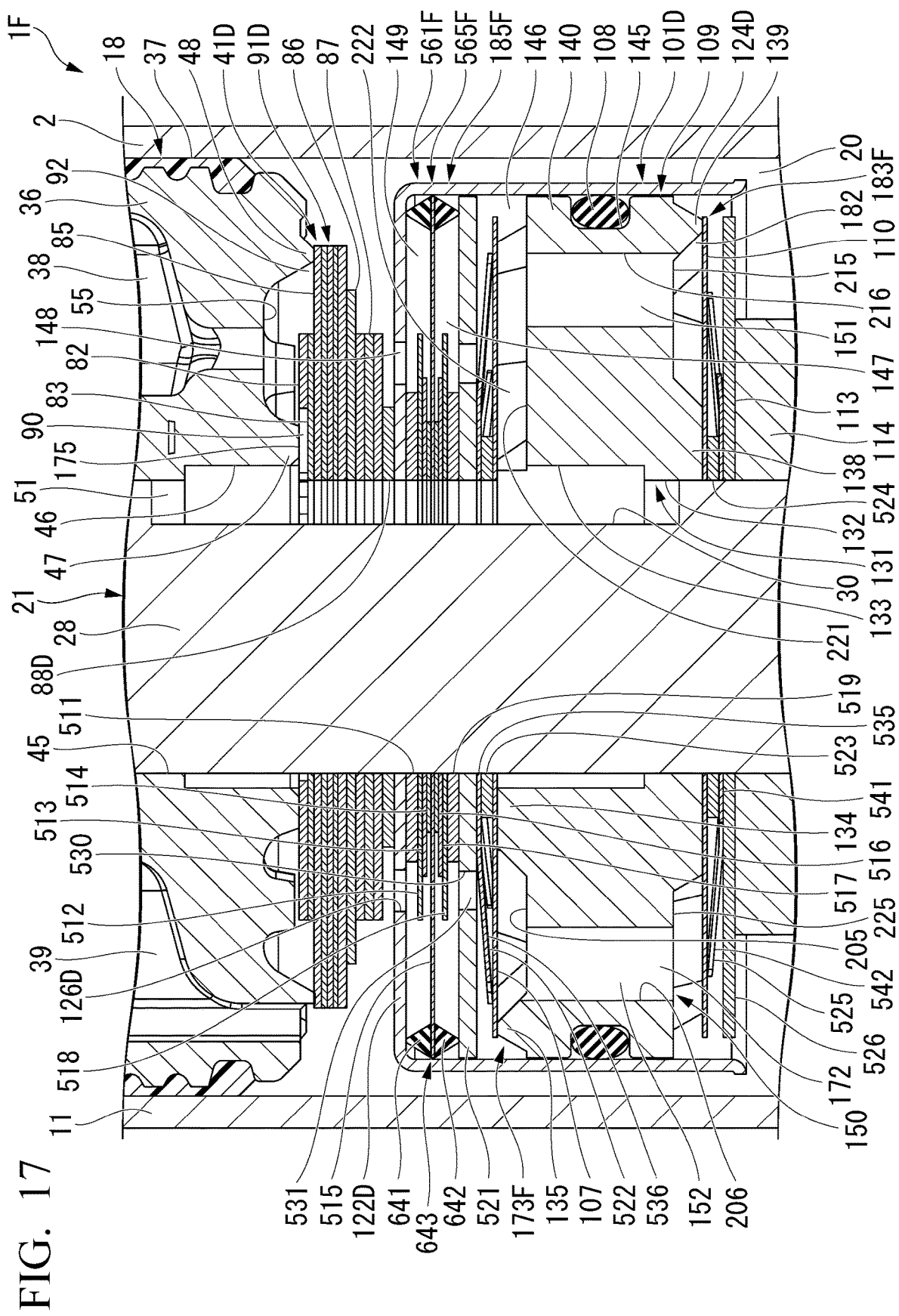
FIG. 17 is a partial cross-sectional view showing the periphery of a cap member and a valve seat member of a shock absorber according to a seventh embodiment of the present invention.

Next, a seventh embodiment will be described mainly based on FIG. 17, focusing on portions different from the fifth embodiment. The portions common to the fifth embodiment are represented by the same terms and the same reference signs.

In a shock absorber 1F of the seventh embodiment, a second damping force generating mechanism 173F on a contraction side is partially different from the second damping force generating mechanism 173D. Further, in the shock absorber 1F of the sixth embodiment, a second damping force generating mechanism 183F on an extension side is partially different from the second damping force generating mechanism 183D. In the second damping force generating mechanisms 173F and 183F, a volume variable mechanism 561F is partially different from the volume variable mechanism 561. In the second damping force generating mechanisms 173F and 183F, a volume variable mechanism 185F is partially different from the volume variable mechanism 185D. That is, the shock absorber 1F has an accumulator 565F that is partially different from the accumulator 565.

In the volume variable mechanisms 561F and 185F, instead of the O-rings 551 and 552 of the volume variable mechanisms 561 and 185D, annular seal members 641 and 642 are fixed to both sides of the outer peripheral side of the flexible disk 515 in the axial direction. The flexible disk 515 and the seal members 641 and 642 are integrated into one division disk 643. In other words, in the seventh embodiment, the division disk 643 which is one part is provided instead of the three parts of the O-rings 551 and 552 and the flexible disk 515 of the volume variable mechanisms 561 and 185D of the fifth embodiment.

The seal member 641 is stuck on the surface of the flexible disk 515 facing the bottom portion 122D. The seal member 641 has a triangular cross section on the surface including the central axis. The width of the seal member 641 in the radial direction becomes smaller as the distance from the flexible disk 515 in the axial direction of the flexible disk 515 increases.

The seal member 642 has the same shape as that of the seal member 641. The seal member 642 is stuck on the surface of the flexible disk 515 facing the stopper member 521. The seal member 642 has a triangular cross section on the surface including the central axis. The width of the seal member 642 in the radial direction becomes smaller as the distance from the flexible disk 515 in the axial direction of the flexible disk 515 increases.

A tip end portion of the seal member 641 on a side opposite to the flexible disk 515 is in contact with the bottom portion 122D of the cap member 101D over the entire circumference. The seal member 641 is in contact with the bottom portion 122D outside the communication passage 148 in the radial direction. A tip end portion of the seal member 642 on a side opposite to the flexible disk 515 is in contact with the stopper member 521 over the entire circumference. The seal member 642 is in contact with the stopper member 521 outside the communication passage 531 in the radial direction.

In the volume variable mechanism 185F, when the oil liquid flows into the intermediate chamber 147 and the pressure in the intermediate chamber 147 is increased in the extension stroke, a portion of the flexible disk 515 radially inside the seal member 641 is bent toward the bottom portion 122D to increase the capacity of the intermediate chamber 147.

In the volume variable mechanism 561F, when the oil liquid flows into the communication chamber 149 and the pressure in the communication chamber 149 is increased in the contraction stroke, a portion of the flexible disk 515 radially inside the seal member 642 is bent toward the stopper member 521 to increase the capacity of the communication chamber 149.

In the shock absorber 1F of the seventh embodiment, one division disk 643 in which the flexible disk 515 and the seal members 641 and 642 are integrated is used in the volume variable mechanisms 185F and 561F. Therefore, the assembling property can be improved. Further, by sticking the sealing members 641 and 642 to the flexible disk 515, it is possible to improve the sealing performance between the flexible disk 515 and the seal members 641 and 642. Further, by sticking the sealing members 641 and 642 to the flexible disk 515, it is possible to maintain the shapes of the seal members 641 and 642 at the flexible disk 515. Therefore, abnormal deformation of the seal members 641 and 642 in the radial direction can be suppressed, and the performance can be stabilized.

The operation and effect of the shock absorber 1F of the seventh embodiment are almost the same as those of the fifth embodiment.

Eighth Embodiment

Figure 18:
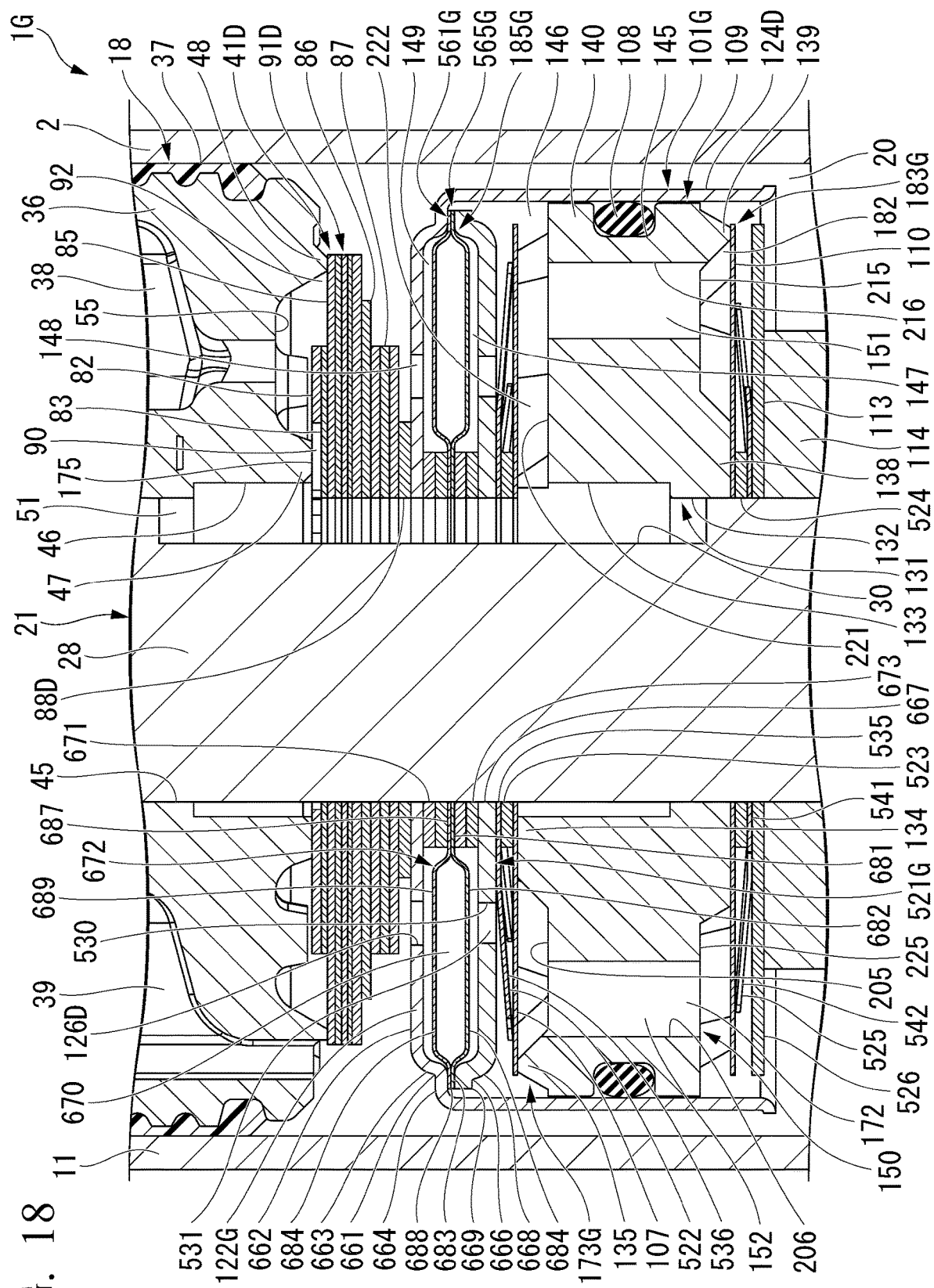
FIG. 18 is a partial cross-sectional view showing the periphery of a cap member and a valve seat member of a shock absorber according to an eighth embodiment of the present invention.

Next, an eighth embodiment will be described mainly based on FIG. 18, focusing on portions different from the fifth embodiment. The portions common to the fifth embodiment are represented by the same terms and the same reference signs.

In a shock absorber 1G of the eighth embodiment, a second damping force generating mechanism 173F on a contraction side is partially different from the second damping force generating mechanism 173D. Further, in the shock absorber 1F of the sixth embodiment, a second damping force generating mechanism 183G on an extension side is partially different from the second damping force generating mechanism 183D. In the second damping force generating mechanisms 173G and 183G, a volume variable mechanism 561G is partially different from the volume variable mechanism 561. In the second damping force generating mechanisms 173G and 183G, a volume variable mechanism 185G is partially different from the volume variable mechanism 185D. That is, the shock absorber 1G has an accumulator 565G that is partially different from the accumulator 565.

In the accumulator 565G, a cap member 101G is partially different from the cap member 101D. The cap member 101G has a shape in which a step portion 661 is provided on the tubular portion 124D side of the bottom portion 122D of the cap member 101D.

A bottom portion 122G of the cap member 101G has a bottom portion main body 662, an annular protruding portion 663, and a step plate portion 664. The bottom portion main body 662 has a perforated circular flat plate shape in which the plurality of passage holes 126D are formed. The annular protruding portion 663 has an annular shape and protrudes from the outer peripheral edge portion of the bottom portion main body 662 toward the tubular portion 124D in the axial direction of the bottom portion main body 662. The step plate portion 664 extends from the end edge portion of the annular protruding portion 663 on a side opposite to the bottom portion main body 662 outward of the annular protruding portion 663 in the radial direction and is connected to the tubular portion 124D. The annular protruding portion 663 and the step plate portion 664 form the step portion 661 that protrudes from the bottom portion main body 662 toward the tubular portion 124D in the axial direction of the bottom portion main body 662. The cap member 101G is also oriented such that the tubular portion 124D protrudes from the bottom portion 122G to a side opposite to the piston 18 in the axial direction of the bottom portion 122G.

In the accumulator 565G, a stopper member 521G is partially different from the stopper member 521. The stopper member 521G has a shape in which a step portion 666 is provided on the outer peripheral portion of the stopper member 521.

The stopper member 521G has a base plate portion 667, an annular protruding portion 668, and a step plate portion 669. The base plate portion 667 has a perforated circular flat plate shape in which the plurality of communication passages 531 are formed. The annular protruding portion 668 has an annular shape and protrudes from the outer peripheral edge portion of the base plate portion 667 toward one side of the base plate portion 667 in the axial direction. The step plate portion 669 extends from the end edge portion of the annular protruding portion 668 on a side opposite to the base plate portion 667 outward of the annular protruding portion 668 in the radial direction and has an annular shape. The annular protruding portion 668 and the step plate portion 669 form the step portion 666 that protrudes from the base plate portion 667 toward the one side of the base plate portion 667 in the axial direction. In the stopper member 521G, the step portion 666 is oriented to protrude from the base plate portion 667 toward the piston 18 in the axial direction of the base plate portion 667.

On a side of the bottom portion 122G of the cap member 101G opposite to the piston 18, in order from the bottom portion 122G side, a plurality of (specifically two) disks 671 having the same inner diameter and the same outer diameter, one laminate disk 672, a plurality of (specifically two) disks 673 having the same inner diameter and the same outer diameter, and a stopper member 521G are provided such that the attachment shaft portion 28 of the piston rod 21 is fitted to the inside of each of them. The spring disk 522 which is the same as that of the fifth embodiment is provided on a side of the stopper member 521G opposite to the piston 18.

The disk 671 has a perforated circular flat plate shape. The disk 671 has an outer diameter smaller than twice the minimum distance from the center of the cap member 101G to the passage hole 126D. The disk 673 is a common part with the disk 671.

The laminate disk 672 is formed as one part by laminating two single-plate disks 684 in a concave-convex shape which each have an inner plate portion 681, a bulging plate portion 682, and an outer plate portion 683. Each of the single-plate disks 684 is made of a metal and is formed by the press forming. The inner plate portion 681 has a perforated circular flat plate shape, and the attachment shaft portion 28 of the piston rod 21 is fitted to the inside of the inner plate portion 681. The bulging plate portion 682 protrudes from the outer peripheral edge portion of the inner plate portion 681 to one side of the inner plate portion 681 in the axial direction, then extends radially outward of the inner plate portion 681 in parallel with the inner plate portion 681, and then protrudes to a side of the inner plate portion 681 in the axial direction opposite to the one side. The outer plate portion 683 extends from the end edge portion of the bulging plate portion 682 on a side opposite to the inner plate portion 681 outward of the bulging plate portion 682 in the radial direction. The outer plate portion 683 is disposed on the same plane as the inner plate portion 681. Two single-plate disks 684 are prepared, the bulging plate portions 682 bulge in opposite directions, the inner plate portions 681 are laminated to each other, and the outer plate portions 683 are laminated to each other. As a result, the laminate disk 672 is formed.

The laminate disk 672 has an inner laminate plate portion 687 formed by laminating two inner plate portions 681, an outer laminate plate portion 688 formed by laminating two outer plate portions 683, and a bulging portion 689 constituted by two bulging plate portions 682 that bulge in opposite directions to each other. The inner laminate plate portion 687 and the outer laminate plate portion 688 are disposed on the same plane. The bulging portion 689 bulges on both sides in the axial direction between the inner laminate plate portion 687 and the outer laminate plate portion 688. The inside of the bulging portion 689 is an air chamber 670 filled with air and sealed. The laminating of the two single-plate disks 684 may be bonding or welding as long as the air chamber 670 is sealed and air leakage can be prevented by the laminating.

In the laminate disk 672, the inner laminate plate portion 687 is clamped between the disks 671 and 673 and is fixed to the piston rod 21 integrally with the disks 671 and 673. At the same time, in the laminate disk 672, the outer laminate plate portion 688 is clamped between the step plate portion 664 of the cap member 101G and the step plate portion 669 of the stopper member 521G and is fixed to the piston rod 21 integrally with the step plate portions 664 and 669. In this state, the laminate disk 672 forms the communication chamber 149 with the bottom portion 122G of the cap member 101G. Further, in this state, the laminate disk 672 forms the intermediate chamber 147 with the stopper member 521G. In the laminate disk 672, the bulging portion 689 faces the intermediate chamber 147 at one bulging plate portion 682. Further, the laminate disk 672 faces the communication chamber 149 at the other bulging plate portion 682. The laminate disk 672 divides the intermediate chamber 147 and the communication chamber 149 from each other.

The volume variable mechanism 185G is constituted by the laminate disk 672, the stopper member 521G, the two disks 673, the intermediate chamber 147 surrounded by these, and the communication passage 531. In the volume variable mechanism 185G, when the oil liquid flows into the intermediate chamber 147 and the pressure in the intermediate chamber 147 is increased in the extension stroke, the one bulging plate portions 682 of the laminate disk 672 facing the intermediate chamber 147 is deformed toward the other bulging plate portion 682 to reduce the capacity of the air chamber 670 and thus to increase the capacity of the intermediate chamber 147. At this time, the capacity of the communication chamber 149 basically does not change.

The volume variable mechanism 561G is constituted by the laminate disk 672, the bottom portion 122G of the cap member 101G, the two disks 671, the communication chamber 149 surrounded by these, and the communication passage 148. In the volume variable mechanism 561G, when the oil liquid flows into the communication chamber 149 and the pressure in the communication chamber 149 is increased in the contraction stroke, the other bulging plate portions 682 of the laminate disk 672 facing the communication chamber 149 is deformed toward the one bulging plate portion 682 to reduce the capacity of the air chamber 670 and thus to increase the capacity of the communication chamber 149. At this time, the capacity of the intermediate chamber 147 basically does not change.

That is, the volume variable mechanisms 185G and 561G are mechanisms that change the volume of the air chamber 670 when the differential pressure between the intermediate chamber 147 and the communication chamber 149 is received. In other words, the volume variable mechanisms 185G and 561G change the air volume of the air chamber 670 of the laminate disk 672 according to the differential pressure between the intermediate chamber 147 and the communication chamber 149 and absorbs the amount of the oil liquid flowing into the intermediate chamber 147 and the communication chamber 149. When the air pressure in the air chamber 670 reaches the valve opening pressure of the second damping force generating mechanisms 183G and 173G, the valves of the second damping force generating mechanisms 183G and 173G are opened. If the air volume of the air chamber 670 changes in a range where the air pressure of the air chamber 670 is lower than the valve opening pressure of the second damping force generating mechanisms 183G and 173G, the valves of the second damping force generating mechanisms 183G and 173G are not opened. The shock absorber 1G operates in this way at the time of high frequency and small amplitude input.

The relationship between the differential pressure between the intermediate chamber 147 and the communication chamber 149 and the bending of the laminate disk 672 is determined by the rise of air pressure due to the deformation of the laminate disk 672 and the change in the air volume of the air chamber 670 and the rigidity of the laminate disk 672 itself. If the rigidity of the laminate disk 672 is too high, the air chamber 670 is less likely to be deformed, and even at the time of high frequency and small amplitude input, the air chamber 670 is less likely to be deformed. As a result, even at the time of high frequency and small amplitude input, the internal pressure of the second passage 172 or the second passage 182 rises and the extremely low speed damping force rises. On the contrary, if the rigidity is too low, the deformation depends on the laminate disk 672 having a low spring constant, and even at the low frequency, the extremely low speed damping force does not rise or the volume of the air chamber 670 is close to zero. Then, the air pressure in the air chamber 670 rises steeply, which may cause the steep change in the oil pressure, the collapse of the damping force waveform, and the resulting abnormal noise. Therefore, in order to achieve both the target damping force performance of the second damping force generating mechanisms 183G and 173G and the abnormal noise suppression due to the extremely low damping reduction at the high frequency, the rigidity of the laminate disk 672 is appropriately set according to the specifications of the second damping force generating mechanisms 183G and 173G and the shock absorber 1G.

The shock absorber 1G of the eighth embodiment uses the laminate disk 672 having the deformable bulging portion 689 in which the air chamber 670 is provided in the volume variable mechanisms 185G and 561G. Therefore, the assembling property can be improved.

The laminate disk 672 may be made of rubber as well as made of a metal. Even if it is made of rubber, it operates in almost the same manner as the case in which it is made of a metal, and the same effect as the case in which it is made of a metal can be obtained.

Ninth Embodiment

Figure 19:
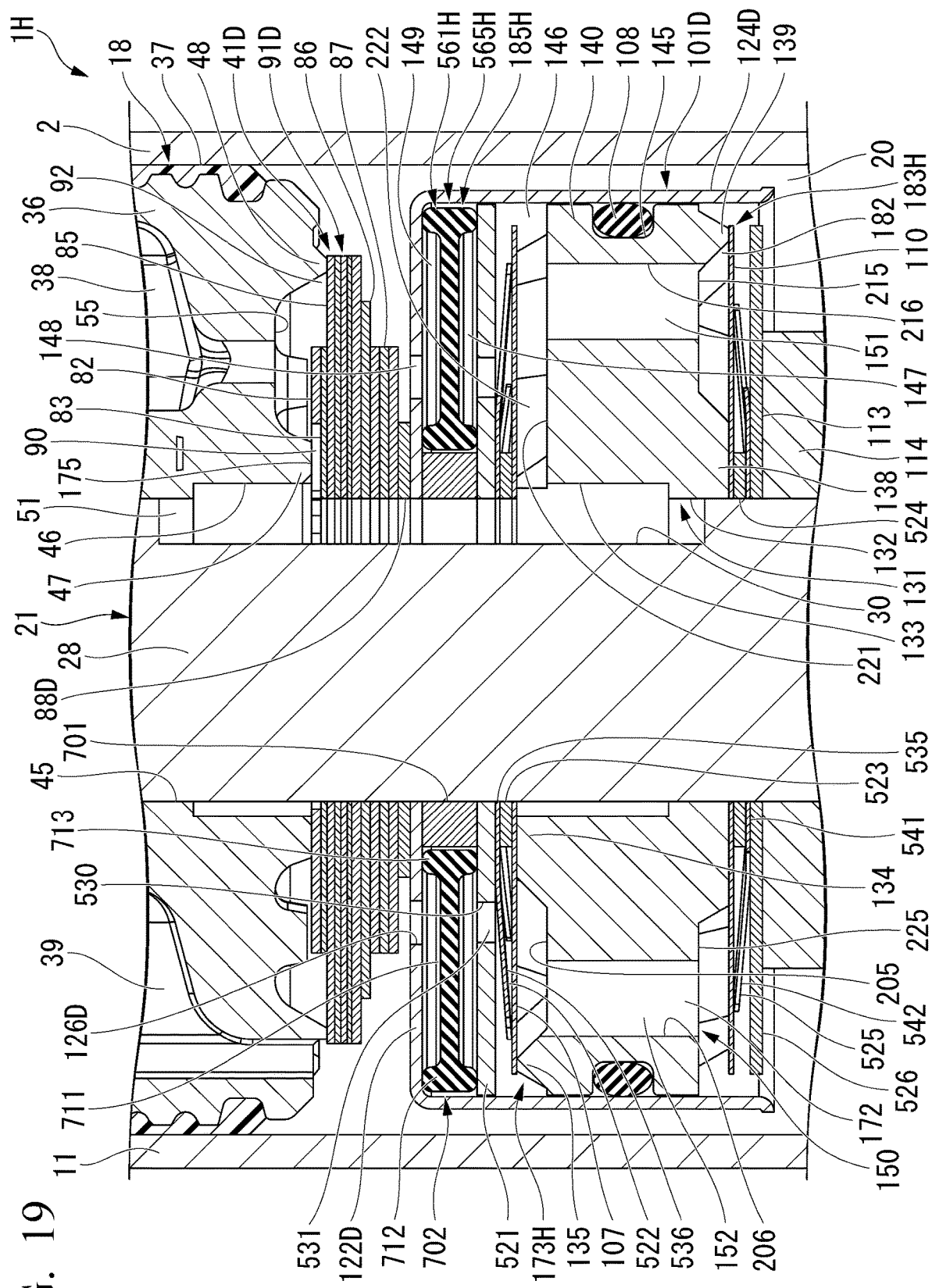
FIG. 19 is a partial cross-sectional view showing the periphery of a cap member and a valve seat member of a shock absorber according to a ninth embodiment of the present invention.

Next, a ninth embodiment will be described mainly based on FIG. 19, focusing on portions different from the fifth embodiment. The portions common to the fifth embodiment are represented by the same terms and the same reference signs.

In a shock absorber 1H of the ninth embodiment, a second damping force generating mechanism 173H on a contraction side is partially different from the second damping force generating mechanism 173D. Further, in the shock absorber 1H of the sixth embodiment, a second damping force generating mechanism 183H on an extension side is partially different from the second damping force generating mechanism 183D. In the second damping force generating mechanisms 173H and 183H, a volume variable mechanism 561H is partially different from the volume variable mechanism 561. In the second damping force generating mechanisms 173H and 183H, a volume variable mechanism 185H is partially different from the volume variable mechanism 185. That is, the shock absorber 1H has an accumulator 565H that is partially different from the accumulator 565.

In the volume variable mechanisms 561H and 185H, one spacer 701 is provided instead of the disks 511 to 514 and 516 to 519 of the volume variable mechanisms 561 and 185D. Further, in the volume variable mechanisms 561H and 185H, one seal member 702 is provided instead of the O-rings 551 and 552 and the flexible disk 515 of the volume variable mechanisms 561 and 185D.

The spacer 701 has a cylindrical shape and is made of a metal. The attachment shaft portion 28 of the piston rod 21 is fitted to the inside of the spacer 701. One end surface of the spacer 701 in the axial direction is in contact with the bottom portion 122D of the cap member 101D, and the other end surface thereof in the axial direction is in contact with the stopper member 521. The spacer 701 has an outer diameter smaller than twice the minimum distance from the center of the cap member 101D to the passage hole 126D. The outer diameter of the spacer 701 is smaller than twice the minimum distance from the center of the stopper member 521 to the passage hole 530.

The seal member 702 has a base plate portion 711, an outer tubular portion 712, and an inner tubular portion 713. The seal member 702 is an integrally formed product made of an elastically deformable rubber material. The base plate portion 711 has a perforated circular flat plate shape. The outer tubular portion 712 has a cylindrical shape and protrudes from the outer peripheral edge portion of the base plate portion 711 toward both sides of the base plate portion 711 in the axial direction. The inner tubular portion 713 has a cylindrical shape and protrudes from the inner peripheral edge portion of the base plate portion 711 toward both sides of the base plate portion 711 in the axial direction. The base plate portion 711, the outer tubular portion 712, and the inner tubular portion 713 have their central axes aligned with each other. The outer tubular portion 712 and the inner tubular portion 713 have the same length in the axial direction. The outer tubular portion 712 and the inner tubular portion 713 are aligned in a position in the axial direction. The outer tubular portion 712 and the inner tubular portion 713 protrude from the base plate portion 711 toward both sides of the base plate portion 711 in the axial direction by the same length. The seal member 702 has an H-shaped cross section on the surface including the central axis.

In the seal member 702, the inner tubular portion 713 has an inner diameter slightly larger than the outer diameter of the spacer 701. The inner tubular portion 713 has an outer diameter smaller than twice the minimum distance from the center of the cap member 101D to the passage hole 126D. The outer diameter of the inner tubular portion 713 is smaller than twice the minimum distance from the center of the stopper member 521 to the passage hole 530. In the seal member 702, the outer tubular portion 712 has an outer diameter slightly smaller than the inner diameter of the tubular portion 124D of the cap member 101D. The outer tubular portion 712 has an inner diameter larger than twice the maximum distance from the center of the cap member 101D to the passage hole 126D. The inner diameter of the outer tubular portion 712 is larger than twice the maximum distance from the center of the stopper member 521 to the passage hole 530. In the seal member 702, the passage hole 126D of the cap member 101D and the passage hole 530 of the spacer 701 are always positioned between the inner tubular portion 713 and the outer tubular portion 712 in the radial direction thereof.

In the seal member 702, the outer tubular portion 712 is in contact with the bottom portion 122D of the cap member 101D and the stopper member 521 with a tightening allowance over the entire circumference. Further, in the seal member 702, the inner tubular portion 713 is also in contact with the bottom portion 122D of the cap member 101D and the stopper member 521 with a tightening allowance over the entire circumference. Therefore, in the seal member 702, the outer tubular portion 712, the inner tubular portion 713, and the base plate portion 711 form the communication chamber 149 with the bottom portion 122D of the cap member 101D. Further, in the seal member 702, the outer tubular portion 712, the inner tubular portion 713, and the base plate portion 711 form the intermediate chamber 147 with the stopper member 521. In the seal member 702, the base plate portion 711 faces the intermediate chamber 147 on one side thereof in the axial direction and faces the communication chamber 149 on the other side thereof in the axial direction. The seal member 702 divides the intermediate chamber 147 and the communication chamber 149 from each other.

The volume variable mechanism 185H is constituted by the seal member 702, the stopper member 521, the intermediate chamber 147 surrounded by these, and the communication passage 531. In the volume variable mechanism 185H, when the oil liquid flows into the intermediate chamber 147 and the pressure in the intermediate chamber 147 is increased in the extension stroke, the base plate portion 711 of the sealing member 702 is deformed and moved toward the bottom portion 122D of the cap member 101D to increase the capacity of the intermediate chamber 147 and to reduce the capacity of the communication chamber 149, and thus the capacity of the intermediate chamber 147 is increased. At this time, when the base plate portion 711 comes into contact with the bottom portion 122D, further deformation of the base plate portion 711 is restricted.

The volume variable mechanism 561H is constituted by the seal member 702, the bottom portion 122D of the cap member 101D, the communication chamber 149 surrounded by these, and the communication passage 148. In the volume variable mechanism 561H, when the oil liquid flows into the communication chamber 149 and the pressure in the communication chamber 149 is increased in the contraction stroke, the base plate portion 711 of the sealing member 702 is deformed and moved toward the stopper member 521 to increase the capacity of the communication chamber 149 and to reduce the capacity of the intermediate chamber 147, and thus the capacity of the communication chamber 149 is increased. At this time, when the base plate portion 711 comes into contact with the stopper member 521, further deformation of the base plate portion 711 is restricted.

The accumulator 565H maintains the differential pressure between the intermediate chamber 147 and the communication chamber 149 by providing a sealing function at the contact portion between the bottom portion 122D of the cap member 101D and the sealing member 702 and at the contact portion between the stopper member 521 and the sealing member 702. Further, in the accumulator 565H, when the differential pressure is generated between the intermediate chamber 147 and the communication chamber 149, the base plate portion 711 that is not in contact with the bottom portion 122D of the cap member 101D and the stopper member 521 is bent and deformed. The base plate portion 711 begins to be deformed linearly according to the differential pressure between the intermediate chamber 147 and the communication chamber 149, but when the base plate portion 711 is bent to a certain extent, the base plate portion 711 comes into contact with the bottom portion 122D of the cap member 101D or the stopper member 521, and the bending is limited.

Therefore, in the accumulator 565H, with respect to the high frequency and small amplitude input in which the amount of the oil liquid flowing into the intermediate chamber 147 or the communication chamber 149 is small, the base plate portion 711 is deformed, and thus the spring constant becomes low. Further, in the accumulator 565H, at the time of the low frequency and large amplitude input in which the amount of oil liquid flowing into the intermediate chamber 147 or the communication chamber 149 is large, the base plate portion 711 comes into contact with the bottom portion 122D of the cap member 101D or the stopper member 521 and does not bend, and thus the spring constant becomes high. Therefore, the accumulator 565H has a non-linear spring like the accumulator 565 of the fifth embodiment and the accumulator 565E of the sixth embodiment. Therefore, the accumulator of the present embodiment provides the same function and effect as those of the accumulators 565 and 565E of the fifth and sixth embodiments.

In the shock absorber 1H of the ninth embodiment, the seal member 702 which is a single part made of rubber is used in the volume variable mechanisms 185H and 561H. Therefore, the assembling property can be improved.

Tenth Embodiment

Figure 20:
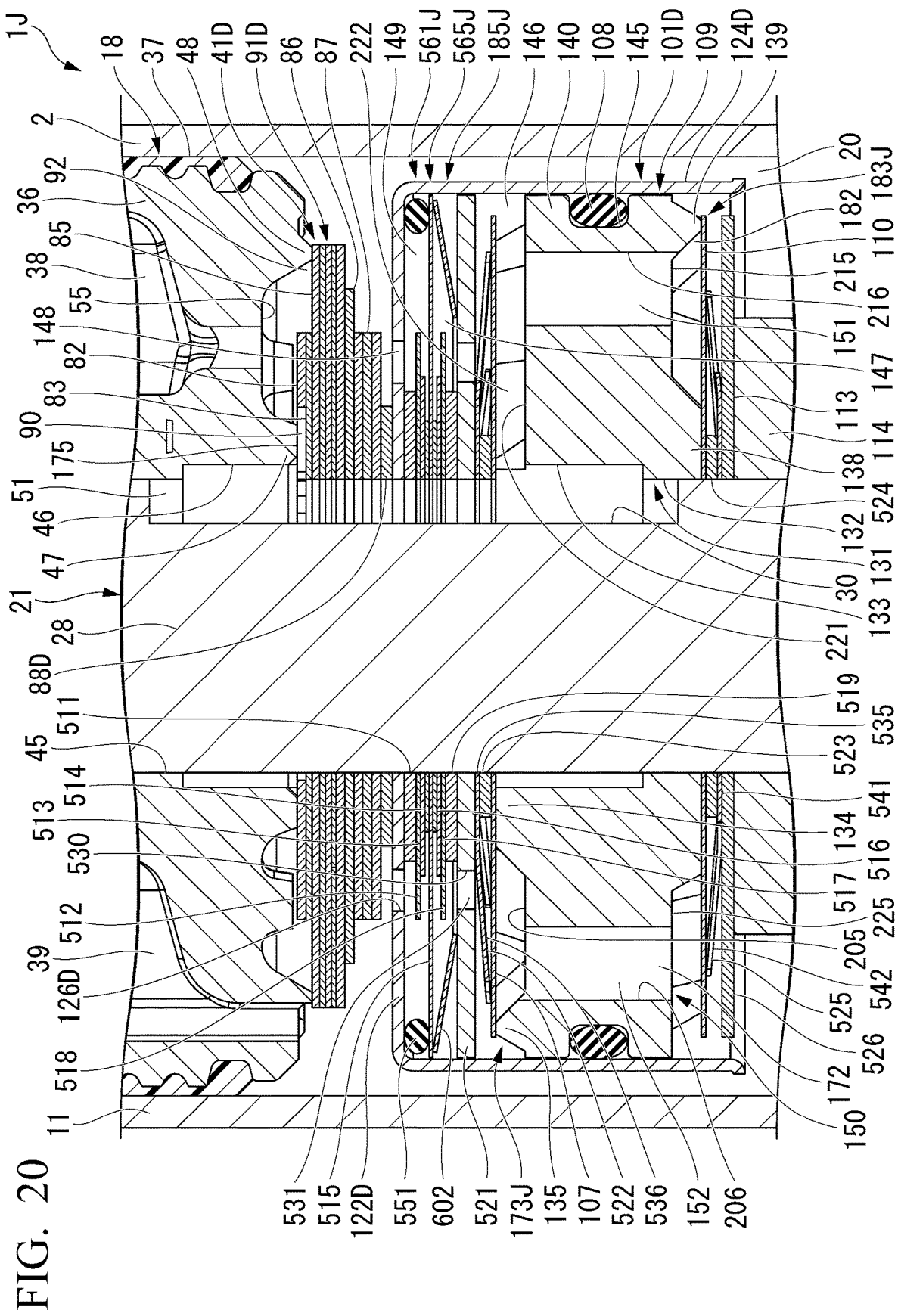
FIG. 20 is a partial cross-sectional view showing the periphery of a cap member and a valve seat member of a shock absorber according to a tenth embodiment of the present invention.

Next, a tenth embodiment will be described mainly based on FIG. 20, focusing on portions different from the fifth embodiment. The portions common to the fifth embodiment are represented by the same terms and the same reference signs.

In a shock absorber 1J of the tenth embodiment, a second damping force generating mechanism 173J on a contraction side is partially different from the second damping force generating mechanism 173D. Further, in the shock absorber 1J of the sixth embodiment, a second damping force generating mechanism 183J on an extension side is partially different from the second damping force generating mechanism 183D. In the second damping force generating mechanisms 173J and 183J, a volume variable mechanism 561J is partially different from the volume variable mechanism 561. In the second damping force generating mechanisms 173J and 183J, a volume variable mechanism 185J is partially different from the volume variable mechanism 185D. That is, the shock absorber 1J has an accumulator 565J that is partially different from the accumulator 565.

The volume variable mechanisms 561J and 185J are provided with conical disk spring 602 of the sixth embodiment instead of the O-ring 552 of the volume variable mechanisms 561 and 185D of the fifth embodiment. Therefore, the conical disk spring 602 is provided between the flexible disk 515 and the stopper member 521.

In the volume variable mechanism 185J, when the oil liquid flows into the intermediate chamber 147 and the pressure in the intermediate chamber 147 is increased in the extension stroke, a portion of the flexible disk 515 radially inside a contact position with the O-ring 551 is bent toward the bottom portion 122D to increase the capacity of the intermediate chamber 147. At that time, in the O-ring 551, the support point at which the flexible disk 515 is supported moves inward in the radial direction as the flexible disk 515 bends.

In the volume variable mechanism 561J, when the oil liquid flows into the communication chamber 149 and the pressure in the communication chamber 149 is increased in the contraction stroke, a portion of the flexible disk 515 radially inside a contact position with the conical disk spring 602 is bent toward the stopper member 521 to increase the capacity of the communication chamber 149. At that time, in the conical disk spring 602, the support point at which the flexible disk 515 is supported does not move in the radial direction.

The shock absorber 1J of the tenth embodiment operates in the same manner as in the fifth embodiment in the extension stroke and operates in the same manner as in the sixth embodiment in the contraction stroke.

Also in the above fifth to tenth embodiments, the second damping force generating mechanisms 173D to 173H, 173J, 183D to 183H, and 183J are provided on the lower chamber 20 side which is one of the upper chamber 19 and the lower chamber 20, but they can also be provided on the upper chamber 19 side.

Eleventh Embodiment

Next, an eleventh embodiment will be described mainly based on FIG. 21, focusing on portions different from the first to tenth embodiments. The portions common to the first to tenth embodiments are represented by the same terms and the same reference signs.

In the first to tenth embodiments, the case in which the first passage on an extension side and the second passage on an extension side are provided in parallel, and the first passage on a contraction side and the second passage on a contraction side are provided in parallel was explained as an example. However, in the first to tenth embodiments, the first passage on an extension side and the second passage on an extension side may be provided in series, and the first passage on a contraction side and the second passage on a contraction side may be provided in series.

Figure 21:
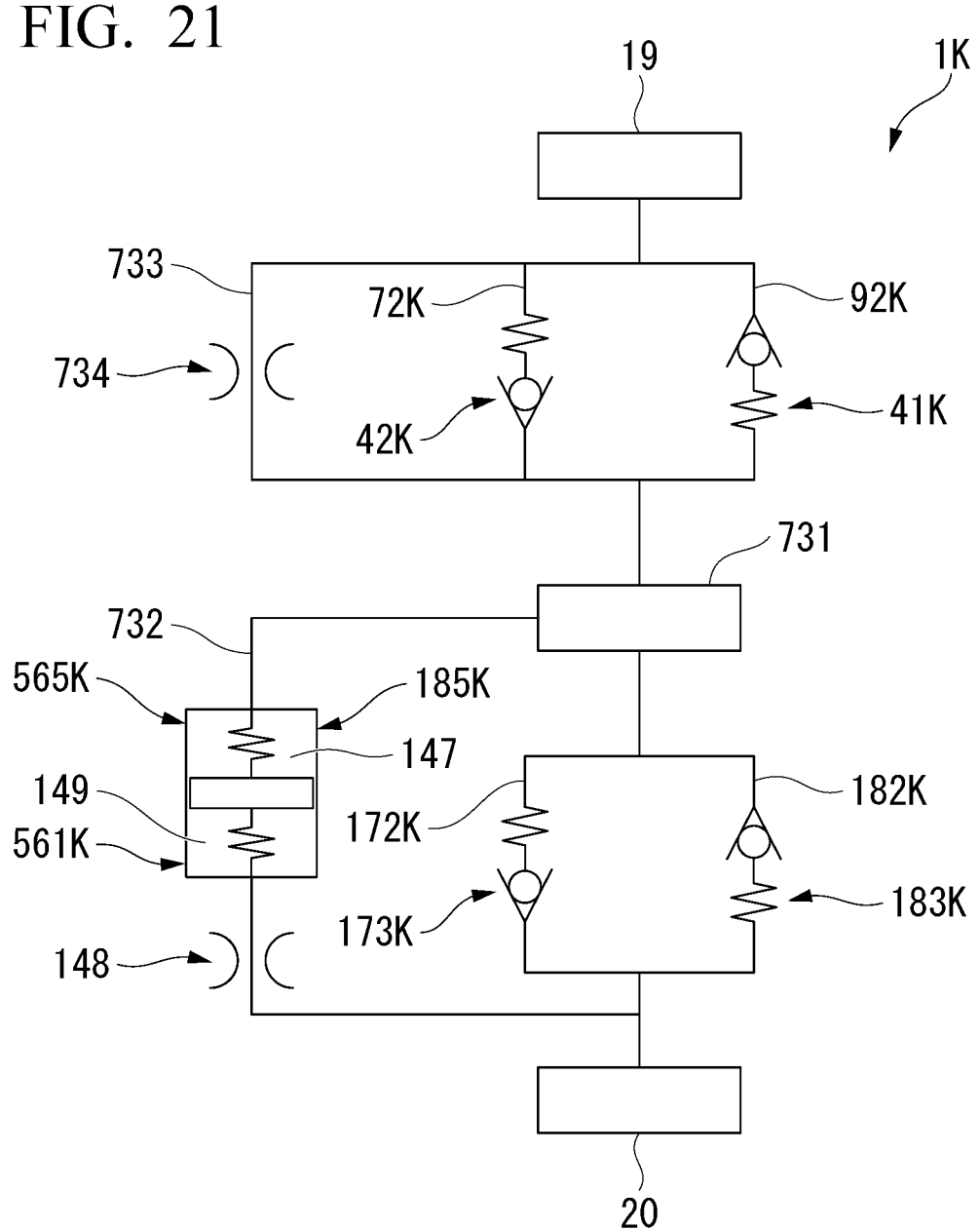
FIG. 21 is a hydraulic circuit diagram showing a shock absorber according to an eleventh embodiment of the present invention.

As shown in FIG. 21, in a shock absorber 1K of the eleventh embodiment, a first passage 92K on an extension side and a second passage 182K on an extension side are provided in series, and a first passage 72K on a contraction side and a second passage 172K on a contraction side are provided in series. In this case, for example, the first passage 92K on an extension side and the first passage 72K on a contraction side are provided in parallel, the second passage 182K on an extension side and the second passage 172K on a contraction side are provided in parallel, and a chamber 731 is provided between the first passages 92K and 72K and the second passages 182K and 172K.

Then, for example, a first damping force generating mechanism 41K on an extension side similar to the first damping force generating mechanism 41D is provided in the first passage 92K, and for example, a second damping force generating mechanism 183K on an extension side similar to the second damping force generating mechanism 183D is provided in the second passage 182K. Further, for example, a first damping force generating mechanism 42K on a contraction side similar to the first damping force generating mechanism 42D is provided in the first passage 72K, and for example, a second damping force generating mechanism 173K on a contraction side similar to the second damping force generating mechanism 173D is provided in the second passage 172K.

Then, a passage 732 which connects the chamber 731 and the lower chamber 20 in parallel with the second passages 172K and 182K is provided. An accumulator 565K is provided in this passage 732. In other words, the accumulator 565K is provided in parallel with the second damping force generating mechanisms 183K and 173K. In this case, the intermediate chamber 147 of a volume variable mechanism 185K is connected to a communication portion of the passage 732 with the chamber 731. Further, the communication chamber 149 of a volume variable mechanism 561K is connected to a communication portion of the passage 732 with the lower chamber 20. The volume variable mechanism 561K has the communication passage 148 as an orifice between the communication chamber 149 and the lower chamber 20.

Further, a passage 733 which connects the upper chamber 19 and the chamber 731 in parallel with the first passages 72K and 92K is provided. An orifice 734 is provided in this passage 733.

In the shock absorber 1K of the eleventh embodiment, the accumulator 565K is provided in parallel with the second damping force generating mechanisms 173K and 183K. Therefore, after the valves of the second damping force generating mechanisms 173K and 183K are opened, the second passages 172K and 182K become the main flow path of the oil liquid. Therefore, the oil liquid hardly flows in the accumulator 565K. Therefore, the accumulator 565K can maintain the flow rate of the oil liquid to be small and the pressure load due to the oil liquid to be small. Therefore, the reliability of the accumulator 565K can be kept high even if a high piston speed is input to the shock absorber 1K when a vehicle travels on a rough road or the like.

In order to achieve both the damping performance of the shock absorber 1K of the eleventh embodiment at low frequency vibration, that is, the target performance of the second damping force generating mechanisms 173K and 183K and the prevention of the abnormal noise of the shock absorber 1K at the time of high frequency vibration, the operation and its effect are the same as those in the fifth embodiment, for example.

Twelfth Embodiment

Next, a twelfth embodiment will be described mainly based on FIG. 22, focusing on portions different from the first to tenth embodiments. The portions common to the first to tenth embodiments are represented by the same terms and the same reference signs.

A shock absorber 1L of the twelfth embodiment is, for example, a shock absorber described in Japanese Unexamined Patent Application, First Publication No. 2013-133896 which is provided with an accumulator 565L. Specifically, a shock absorber in which a passage 751 is provided such that a rod-side oil chamber A and an intermediate chamber D of the shock absorber described in this publication communicate with each other, and the accumulator 565L is provided in the passage 751 is the shock absorber 1L of the twelfth embodiment.

Figure 22:
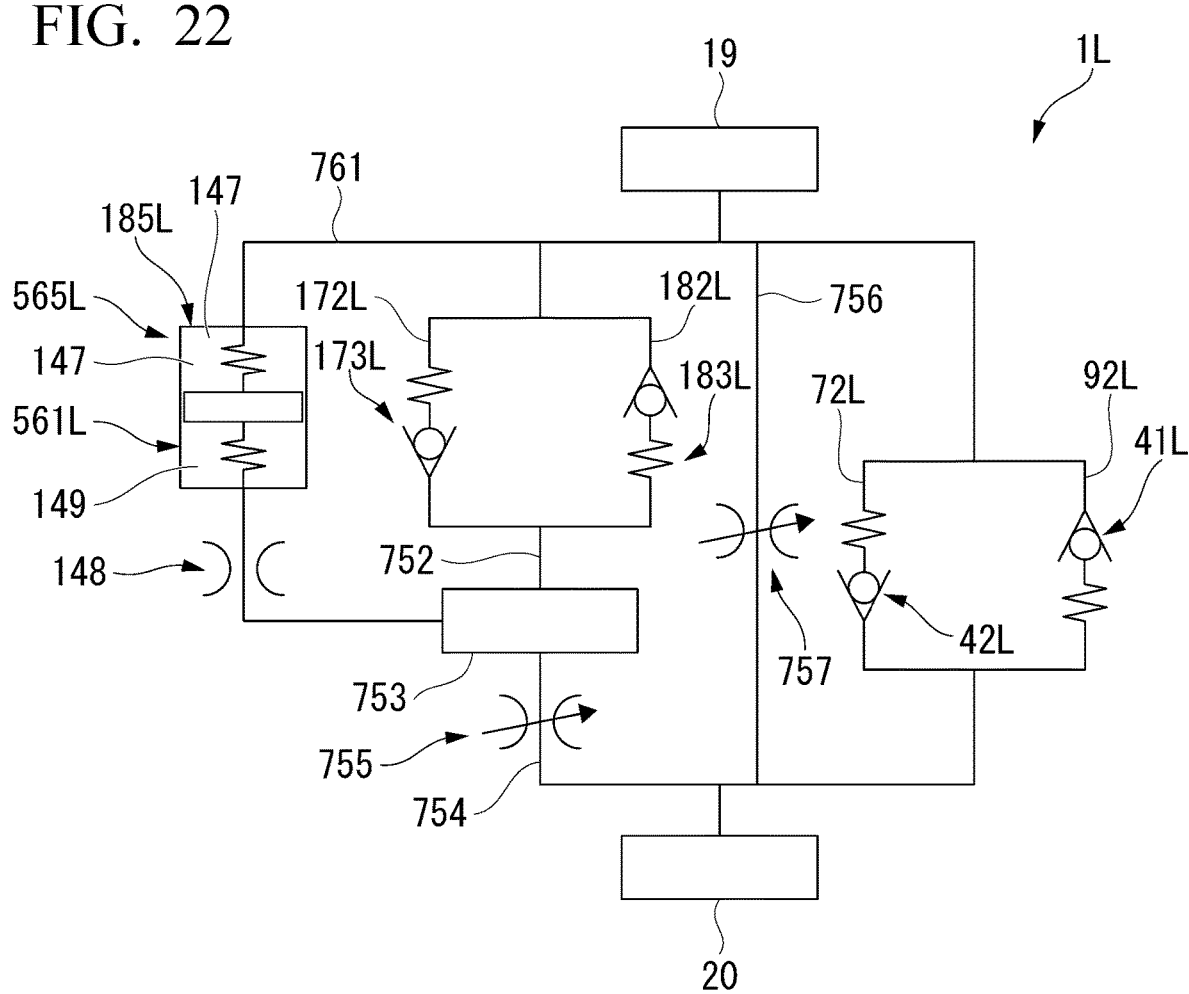
FIG. 22 is a hydraulic circuit diagram showing a shock absorber according to a twelfth embodiment of the present invention.

A hydraulic circuit diagram of the shock absorber 1L of the twelfth embodiment is as shown in FIG. 22. That is, in the shock absorber 1L, for example, a first damping force generating mechanism 41L on an extension side similar to the first damping force generating mechanism 41D is provided in the first passage 92L, and for example, a second damping force generating mechanism 183L on an extension side similar to the second damping force generating mechanism 183D is provided in a second passage 182L. Further, for example, a first damping force generating mechanism 42L on a contraction side similar to the first damping force generating mechanism 42D is provided in a first passage 72L, and for example, a second damping force generating mechanism 173L on a contraction side similar to the second damping force generating mechanism 173D is provided in a second passage 172L.

Then, a passage 752 that connects the second passages 182L and 172L and the lower chamber 20 is provided, and a chamber 753 is provided in the passage 752. This chamber 753 is the intermediate chamber D described in Japanese Unexamined Patent Application, First Publication No. 2013-133896. Further, a passage 754 that connects the chamber 753 and the lower chamber 20 is provided, and a variable orifice 755 is provided in the passage 754. Further, a passage 756 that connects the upper chamber 19 and the lower chamber 20 is provided in parallel with the first passages 92L and 72L, and a variable orifice 757 is provided in the passage 756.

The above is the shock absorber described in Japanese Unexamined Patent Application, First Publication No. 2013-133896.

In the shock absorber 1L of the twelfth embodiment, a passage 761 is provided to connect the upper chamber 19 and the chamber 753, and the accumulator 565L is provided in the passage 761. In this case, the intermediate chamber 147 of a volume variable mechanism 185L is connected to a communication portion of the passage 761 with the upper chamber 19, and the communication chamber 149 of a volume variable mechanism 561L is connected to a communication portion of the passage 761 with the chamber 753. The volume variable mechanism 561L has the communication passage 148 as an orifice between the communication chamber 149 and the chamber 753.

Thirteenth Embodiment

Next, a thirteenth embodiment will be described mainly based on FIG. 23, focusing on portions different from the fifth embodiment. The portions common to the fifth embodiment are represented by the same terms and the same reference signs.

Figure 23:
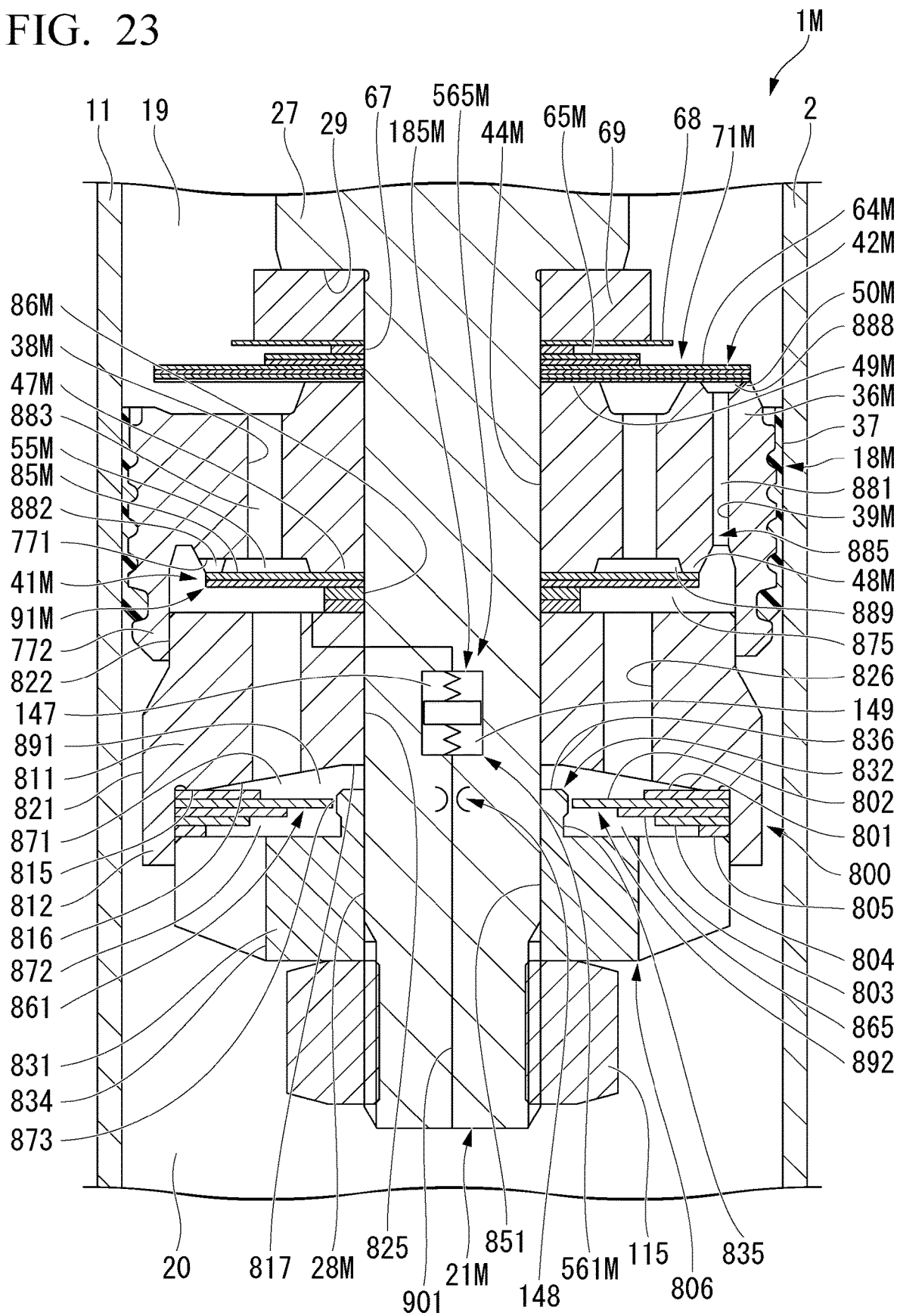
FIG. 23 is a partial cross-sectional view showing a main part of a shock absorber according to a thirteenth embodiment of the present invention.

As shown in FIG. 23, in a shock absorber 1M of the thirteenth embodiment, a piston rod 21M which is partially different from the piston rod 21 is used. The piston rod 21M has an attachment shaft portion 28M which is partially different from the attachment shaft portion 28, and the passage cutout portion 30 is not formed in the attachment shaft portion 28M.

Further, in the shock absorber 1M of the thirteenth embodiment, a piston 18M which is partially different from the piston 18 of the fifth embodiment is used. In the piston 18M, a piston main body 36M is partially different from the piston main body 36. In the piston main body 36M, a plurality of passage holes 38M that penetrate the piston main body 36M in the axial direction, and a plurality of (only one place is shown in FIG. 23 due to the cross section) passage holes 39M that penetrate the piston main body 36M in the axial direction are formed.

The plurality of passage holes 38M each have a shape extending linearly in the axial direction of the piston main body 36M and are formed at equal pitches in the circumferential direction of the piston main body 36M. An annular groove 55M which allows the plurality of passage holes 38M to communicate with a side opposite to the upper chamber 19 in the axial direction is formed in the piston main body 36M. A first damping force generating mechanism 41M on an extension side is provided on a side of the annular groove 55M opposite to the upper chamber 19.

The plurality of passage holes 39M each have a shape extending linearly in the axial direction of the piston main body 36M and are formed at a predetermined pitch in the circumferential direction of the piston main body 36M. All the passage holes 39M are formed on the outer side of the piston main body 36M in the radial direction with respect to all the passage holes 38M. A first damping force generating mechanism 42M on a contraction side is provided on the upper chamber 19 side of the plurality of passage holes 39M.

The piston main body 36M has substantially a disk shape. In the center of the piston main body 36M in the radial direction, an insertion hole 44M into which the attachment shaft portion 28M of the piston rod 21M is inserted is formed to penetrate the piston main body 36M in the axial direction. The insertion hole 44M has a straight shape, and the attachment shaft portion 28M of the piston rod 21M is fitted to the insertion hole 44M.

In the end portion of the piston main body 36M on a side opposite to the upper chamber 19 in the axial direction, an annular inner seat portion 47M is formed on the inner side of the piston main body 36M in the radial direction with respect to an opening of the annular groove 55M on a side opposite to the upper chamber 19. In the end portion of the piston main body 36M on a side opposite to the upper chamber 19 in the axial direction, an annular valve seat portion 48M constituting a part of the first damping force generating mechanism 41M is formed on the outer side of the piston main body 36M in the radial direction with respect to the opening of the annular groove 55M on a side opposite to the upper chamber 19. A passage groove 771 that penetrates the valve seat portion 48M in the radial direction is formed in the valve seat portion 48M.

In the end portion of the piston main body 36M on the upper chamber 19 side in the axial direction, an annular inner seat portion 49M is formed on the inner side of the piston main body 36M in the radial direction with respect to an opening of the plurality of passage holes 38M on the upper chamber 19 side. Further, in the end portion of the piston main body 36M on the upper chamber 19 side in the axial direction, an annular and deformed valve seat portion 50M is formed to surround one or a plurality of openings of the plurality of passage holes 39M on the upper chamber 19 side. A plurality of valve seat portions 50M are formed at intervals in the circumferential direction of the piston main body 36M. The plurality of passage holes 38M constantly communicate with the upper chamber 19 through a gap between the valve seat portions 50M.

The first damping force generating mechanism 42M on a contraction side includes the valve seat portion 50M of the piston 18M and has a plurality of (specifically four) disks 64M having the same inner diameter and the same outer diameter and a plurality of (specifically two) disks 65M having the same inner diameter and the same outer diameter. The disks 64M and 65M are made of a metal and each have a perforated circular flat plate shape having a constant thickness into which the attachment shaft portion 28M of the piston rod 21M can be fitted. The plurality of disks 64M are constantly in contact with the inner seat portion 49M and can be seated on the valve seat portion 50M to close the valve seat portion 50M. The plurality of disks 64M and the plurality of disks 65M made of a thin metal plate are flexible and constitute a main valve 71M on a contraction side which can be detached and seated with respect to the valve seat portion 50M.

The first damping force generating mechanism 41M on an extension side includes the valve seat portion 48M of the piston 18M and has a plurality of (specifically two) disks 85M having the same inner diameter and the same outer diameter. A plurality of (specifically two) disks 86M having the same inner diameter and the same outer diameter are provided on a side of the disk 85M opposite to the valve seat portion 48M. The disks 85M and 86M are made of a metal and each have a perforated circular flat plate shape having a constant thickness into which the attachment shaft portion 28M of the piston rod 21M can be fitted. The plurality of disks 85M are constantly in contact with the inner seat portion 47M and can be seated on the valve seat portion 48M to close the valve seat portion 48M. The disk 86M has an outer diameter smaller than the outer diameter of the disk 85M and smaller than the outer diameter of the inner seat portion 47M of the piston 18M. The plurality of disks 85M made of a thin metal plate are flexible and constitute a main valve 91M on an extension side which can be detached and seated with respect to the valve seat portion 48M.

In the piston main body 36M, on the outer side of the piston main body 36M in the radial direction with respect to the valve seat portion 48M, an annular fitting tubular portion 772 that protrudes toward a side opposite to upper chamber 19 with respect to the valve seat portion 48M is formed. The inner peripheral surface of the fitting tubular portion 772 is a cylindrical surface coaxial with the insertion hole 44M.

On a side of the disk 86M opposite to the upper chamber 19, one first case member 800 is provided such that the attachment shaft portion 28M of the piston rod 21M is fitted to the inside thereof. On a side of the first case member 800 opposite to the disk 86M, one disk 801, one disk valve 802, one disk 803, one disk 804, one disk 805, and one second case member 806 are provided such that the attachment shaft portion 28M of the piston rod 21M is fitted to the inside of each of them.

The first case member 800, the disks 801 and 803 to 805, the disk valve 802, and the second case member 806 are all made of a metal. The disks 801 and 803 to 805 and the disk valve 802 each have a perforated circular flat plate shape having a constant thickness and a constant width in the radial direction into which the attachment shaft portion 28 of the piston rod 21 can be fitted. The first case member 800 and the second case member 806 each have an annular shape into which the attachment shaft portion 28 of the piston rod 21 can be fitted.

The first case member 800 is an integrally formed product having a bottomed tubular shape and has a bottom portion 811 having a perforated circular plate shape and a tubular portion 812 having a cylindrical shape which protrudes from the outer peripheral edge portion of the bottom portion 811 to one side in the axial direction of the bottom portion 811. The tubular portion 812 has a cylindrical shape centered on the central axis of the bottom portion 811.

The first case member 800 is disposed in an orientation in which the tubular portion 812 is located closer to a side opposite to the piston 18M than the bottom portion 811, is fitted to the attachment shaft portion 28 at the inner peripheral portion of the bottom portion 811, and is in contact with the disk 86M at the end surface on a side of the bottom portion 811 opposite to the tubular portion 812.

The bottom portion 811 has, on the tubular portion 812 side in the axial direction, in order from the outer side in the radial direction, a flat outer bottom portion 815 which extends in a direction orthogonal to an axis of the first case member 800, an intermediate bottom portion 816 having a tapered shape which is inclined to be separated from the tubular portion 812 in the axial direction toward the inner side in the radial direction, and a flat inner bottom portion 817 which extends in a direction orthogonal to an axis of the first case member 800. The bottom portion 811 is thinner toward the inner side in the radial direction.

The tubular portion 812 has a continuous cylindrical shape over the entire circumference, and the inner peripheral surface thereof is a straight cylindrical surface having a constant inner diameter. The bottom portion 811 has a large diameter portion 821 whose outer peripheral surface forms the same cylindrical surface as the outer peripheral surface of the tubular portion 812, and a small diameter portion 822 whose outer diameter is smaller than that of the large diameter portion 821. The first case member 800 is fitted to the inner peripheral surface of the fitting tubular portion 772 of the piston 18M at the outer peripheral surface of the small diameter portion 822 which is a cylindrical surface.

The first case member 800 has an insertion hole 825 formed in the center in the radial direction thereof which penetrates the bottom portion 811 in the axial direction and into which the attachment shaft portion 28M of the piston rod 21M is inserted. The insertion hole 825 is coaxial with the small diameter portion 822, and the attachment shaft portion 28M is fitted thereto.

A through hole 826 is formed in the bottom portion 811 at a position of the intermediate bottom portion 816 in the radial direction to penetrate the bottom portion 811 in the axial direction. A plurality of through holes 826 are formed at intervals in the circumferential direction of the bottom portion 811.

The disks 801 and 803 to 805 and the disk valve 802 each have an outer diameter such that the outer peripheral surface of each of them can be fitted to the inner peripheral surface of the tubular portion 812 of the first case member 800. The inner peripheral surface of the tubular portion 812 is coaxial with the insertion hole 825. Further, the disks 801 and 803 to 805 and the disk valve 802 each have an inner diameter such that the attachment shaft portion 28M of the piston rod 21M can be inserted to the inside of each of them.

The inner diameter of the disk 801 is smaller than the inner diameter of the outer bottom portion 815. The inner diameter of the disk valve 802 is smaller than the inner diameter of the disk 801. The inner diameter of the disk 803 is smaller than the inner diameter of the disk 801 and larger than the inner diameter of the disk valve 802. The inner diameter of the disk 804 is larger than the inner diameter of the disk 801. The inner diameter of the disk 805 is larger than the inner diameter of the disk 804 and is equal to the inner diameter of the outer bottom portion 815.

The second case member 806 is an integrally formed product having a perforated circular plate shape and has a base portion 831 having a perforated circular plate shape and a passage forming portion 832 which protrudes from the inner peripheral edge portion of the base portion 831 to one side in the axial direction. A passage groove 834 that is inwardly recessed in the radial direction is formed in the outer peripheral portion of the base portion 831 to penetrate the base portion 831 in the axial direction. A plurality of passage grooves 834 are formed in the base portion 831 at intervals in the circumferential direction of the base portion 831. In the base portion 831, the end surface on the passage forming portion 832 side is a plane that extends in the direction orthogonal to the axis.

The passage forming portion 832 has a neck portion 835 protruding from the inner peripheral edge portion of the base portion 831 to one side in the axial direction of the base portion 831 and a head portion 836 protruding from the neck portion 835 to a side opposite to the base portion 831 in the axial direction of the base portion 831. The head portion 836 has an outer diameter larger than the outer diameter of the neck portion 835.

The neck portion 835 has a cylindrical shape centered on the central axis of the base portion 831, and the outer peripheral surface thereof is a cylindrical surface having a constant diameter. The head portion 836 has a cylindrical shape centered on the central axis of the base portion 831, and the outer peripheral surface thereof is a cylindrical surface having a constant diameter and chamfers on both sides in the axial direction thereof. The outer diameter of the head portion 836 is smaller than the inner diameter of the disk valve 802 by a predetermined amount.

The second case member 806 has an insertion hole 851 formed in the center in the radial direction thereof which penetrates the base portion 831 and the passage forming portion 832 in the axial direction and into which the attachment shaft portion 28 of the piston rod 21 is inserted. The outer diameter surface of the base portion 831, the outer peripheral surface of the neck portion 835, and the outer peripheral surface of the head portion 836 are coaxial with the insertion hole 851.

The second case member 806 is disposed in an orientation in which the passage forming portion 832 is located closer to the piston 18M than the base portion 831, is fitted to the attachment shaft portion 28M at the insertion hole 851, and is fitted to the tubular portion 812 of the first case member 800 at the base portion 831. The disk 801, the disk valve 802, and the disks 803 to 805 are interposed between the outer bottom portion 815 of the bottom portion 811 of the first case member 800 and the base portion 831 of the second case member 806. At this time, the outer peripheral side of the disk valve 802 is clamped between the outer bottom portion 815 of the first case member 800 and the disk 805 in the axial direction together with the outer peripheral sides of the disks 801, 803, and 804. As a result, the outer peripheral side of the disk valve 802 is integrally fixed to the piston rod 21M. The inner peripheral surface of the disk valve 802 which is a cylindrical surface overlaps the outer peripheral surface of the head portion 836 of the passage forming portion 832 of the second case member 806 which is a cylindrical surface in an axial position to face the outer peripheral surface of the head portion 836 in the radial direction.

The first case member 800, the second case member 806, and the disk 805 are integrally connected to the piston rod 21 to support the outer peripheral side of the disk valve 802 in a cantilevered manner via the disks 801, 803, and 804. The inner peripheral end of the disk valve 802 is a free end. In addition to the disk valve 802, also in the disks 801, 803, and 804, each inner peripheral side is a free end, and the disks 801, 803, and 804 can be elastically deformed. In the disk valve 802 and the disks 801, 803, and 804, each outer peripheral side is connected to the piston rod 21 to integrally move with the piston rod 21, and each inner peripheral side constitutes a sub valve 861 that can be elastically deformed. The disk valve 802 has a perforated circular plate shape, and its inner peripheral portion which is a free end faces the piston rod 21 via a passage forming portion 832.

The first case member 800 and the second case member 806 face each other such that the inner bottom portion 817 of the first case member 800 and the passage forming portion 832 of the second case member 806 are separated from each other in the axial direction in a state in which the disk 801, the disk valve 802, and the disk 803, 804, and 805 are interposed between the first case member 800 and the second case member 806. The first case member 800 and the second case member 806 form a case inner chamber 865 inside them. The sub valve 861 including the disk valve 802 is provided in the case inner chamber 865. The case inner chamber 865 constantly communicates with the lower chamber 20 via the passage in the passage groove 834 of the second case member 806.

The case inner chamber 865 is divided into an upper chamber communication chamber 871 on the upper chamber 19 side and a lower chamber communication chamber 872 on the lower chamber 20 side by the sub valve 861 including the disk valve 802. The upper chamber communication chamber 871 and the lower chamber communication chamber 872 constantly communicate with each other via a variable passage 873 between the disk valve 802 and the passage forming portion 832. The disk valve 802 supported in a cantilevered manner by the first case member 800, the disk 805, and the second case member 806 together with the disks 801, 803 and 804 is elastically deformed with a differential pressure between the upper chamber communication chamber 871 and the lower chamber communication chamber 872.

In the variable passage 873, when the disk valve 802 is not elastically deformed and the position of disk valve 802 in the axial direction overlaps the position of the outer peripheral surface of the head portion 836 which is a cylindrical surface in the axial direction, a flow path cross-sectional area is minimized. When the disk valve 802 is elastically deformed, as the distance from the head portion 836 increases, the flow path cross-sectional area increases.

The passage in the passage groove 834 of the second case member 806, the lower chamber communication chamber 872, the variable passage 873 between the sub valve 861 and the passage forming portion 832, the upper chamber communication chamber 871, the passage in the through hole 826 of the first case member 800, the chamber 875 between the first case member 800 and the piston 18M, a plurality of passage holes 39M of the piston 18M, and the passage between the main valve 71M and the valve seat portion 50M which appears when the valve is opened constitute a passage portion 881 on a contraction side through which the oil liquid flows from the lower chamber 20 which becomes an upstream side toward the upper chamber 19 which becomes a downstream side in the contraction stroke. The first damping force generating mechanism 42M on a contraction side which generates a damping force includes the main valve 71M and the valve seat portion 50M and is therefore provided in the passage portion 881. The passage portion 881 also includes the passage in the passage groove 771 formed in the piston 18M, the annular groove 55M, and the plurality of passage holes 38M. The passage in the passage groove 771 constitutes an orifice 882.

The passage in the plurality of passage holes 38M and the annular groove 55M of the piston 18M, the passage between the main valve 91M and the valve seat portion 48M which appears when the valve is opened, the chamber 875 between the first case member 800 and the piston 18M, the passage in the through hole 826 of the first case member 800, the upper chamber communication chamber 871, the variable passage 873 between the sub valve 861 and the passage forming portion 832, the lower chamber communication chamber 872, and the passage in the passage groove 834 of the second case member 806 constitute a passage portion 883 on an extension side through which the oil liquid flows from the upper chamber 19 which becomes an upstream side toward the lower chamber 20 which becomes a downstream side in the extension stroke. The first damping force generating mechanism 41M on an extension side which generates a damping force includes the main valve 91M and the valve seat portion 48M and is therefore provided in the passage portion 883. The passage portion 883 includes the passage in the passage groove 771 formed in the piston 18M. The passage portions 881 and 883 constitute a passage 885 through which the working fluid flows from one of the upper chamber 19 and the lower chamber 20 in the cylinder 2 which becomes an upstream side to the other thereof which becomes a downstream side by the movement of the piston 18M.

The passage between the main valve 71M and the valve seat portion 50M which appears when the valve is opened and the passage in the plurality of passage holes 39M constitute a first passage 888 on a contraction side through which the oil liquid flows to the upper chamber 19 by the movement of the piston 18M toward the lower chamber 20 side. Therefore, the first passage 888 is formed in the piston 18M. The first passage 888 is provided with the first damping force generating mechanism 42M on a contraction side that opens and closes the first passage 888 to generate a damping force.

The passage between the main valve 91M and the valve seat portion 48M which appears when the valve is opened and the passage in the annular groove 55M and the plurality of passage holes 38M constitute a first passage 889 on an extension side through which the oil liquid flows from the upper chamber 19 which becomes an upstream side in the cylinder 2 by the movement of the piston 18M toward the upper chamber 19 side. Therefore, the first passage 889 is formed in the piston 18M. The first passage 889 is provided with the first damping force generating mechanism 41M on an extension side that opens and closes the first passage 888 to generate a damping force.

The chamber 875 between the first case member 800 and the piston 18M, the passage in the through hole 826 of the first case member 800, the upper chamber communication chamber 871, the variable passage 873 between the sub valve 861 and the passage forming portion 832, the lower chamber communication chamber 872, and the passage in the passage groove 834 of the second case member 806 constitute a second passage 891 common to the passage portion 881 and the passage portion 883. The second passage 891 becomes a passage on a contraction side through which the oil liquid flows from the lower chamber 20 which becomes an upstream side toward the upper chamber 19 which becomes a downstream side in the contraction stroke. Further, the second passage 891 becomes a passage on an extension side through which the oil liquid flows from the upper chamber 19 which becomes an upstream side toward the lower chamber 20 which becomes a downstream side in the extension stroke.

The sub valve 861 and the passage forming portion 832 constitute a second damping force generating mechanism 892 in both expansion and contraction strokes which opens and closes the second passage 891 and suppresses the flow of the oil liquid in the second passage 891 to generate a damping force. Therefore, the second damping force generating mechanism 892 is provided in the second passage 891 common to the passage portion 881 and the passage portion 883.

The second passage 891 is in series with the first passage 888 on a contraction side, the first damping force generating mechanism 42M is provided in the first passage 888, and the second damping force generating mechanism 892 is provided in the second passage 891. Therefore, the first damping force generating mechanism 42M and the second damping force generating mechanism 892 are disposed in series.

The second passage 891 is in series with the first passage 889 on an extension side, the first damping force generating mechanism 41M is provided in the first passage 889, and the second damping force generating mechanism 892 is provided in the second passage 891. Therefore, the first damping force generating mechanism 41M and the second damping force generating mechanism 892 are disposed in series.

Between the first damping force generating mechanism 41M on an extension side and the second damping force generating mechanism 892 on an extension side, the main valve 91M of the first damping force generating mechanism 41M has a rigidity and a valve opening pressure higher than those of the sub valve 861 of the second damping force generating mechanism 892. Therefore, in the extension stroke, in an extremely low speed region in which a piston speed is lower than a predetermined value, the valve of the second damping force generating mechanism 892 is opened in a state in which the valve of the first damping force generating mechanism 41M is closed. Further, in a normal speed region in which the piston speed is this predetermined value or more, the valve of the first damping force generating mechanism 41M and the valve of the second damping force generating mechanism 892 are both opened.

That is, in the extension stroke, the piston 18M moves to the upper chamber 19 side, and thus the pressure in the upper chamber 19 increases and the pressure in the lower chamber 20 decreases, but in the extension stroke in which the piston speed is low, the passage portion 883 allows the upper chamber 19 and the lower chamber 20 communicate with each other via the variable passage 873 in a state in which the flow path cross-sectional area is the smallest. Therefore, the oil liquid in the upper chamber 19 flows to the lower chamber 20 via the passage in the plurality of passage holes 38M and the annular groove 55M of the piston 18M, the orifice 882, the chamber 875, the passage in the through hole 826 of the first case member 800, the upper chamber communication chamber 871, the variable passage 873 in a state in which the flow path cross-sectional area is the smallest, the lower chamber communication chamber 872, the passage in the passage groove 834 of the second case member 806.

Then, in an extremely low speed region in which the piston speed is higher than this, the sub valve 861 of the second damping force generating mechanism 892 is deformed toward the lower chamber communication chamber 872 and opened in a state in which the valve of the first damping force generating mechanism 41M is closed to allow the oil liquid to flow from the upper chamber 19 to the lower chamber 20 through the passage portion 883 including the variable passage 873. At this time, as the piston speed increases, the amount of deformation of the sub valve 861 toward the lower chamber communication chamber 872 increases, and the variable passage 873 with the passage forming portion 832 expands. As a result, even in the extremely low speed region, the damping force of the valve characteristics (the characteristics in which the damping force is substantially proportional to the piston speed) can be obtained.

Further, in the extension stroke, in the normal speed region in which the piston speed is higher, the valve of the first damping force generating mechanism 41M is opened while a state in which the sub valve 861 of the second damping force generating mechanism 892 is deformed toward the lower chamber communication chamber 872 to increase a valve opening amount remains as described above. That is, the sub valve 861 is deformed toward the lower chamber communication chamber 872, and the oil liquid flows from the upper chamber 19 to the lower chamber 20 through the passage portion 883 including the variable passage 873, but at this time, the flow of the oil liquid is throttled by the orifice 882 provided on the upstream side from the sub valve 861 in the passage portion 883, and thus in the passage portion 883, the pressure applied to the main valve 91M increases and a differential pressure increases, the main valve 91M is separated from the valve seat portion 48M, and the oil liquid flows from the upper chamber 19 to the lower chamber 20. Therefore, the oil liquid in the upper chamber 19 flows to the lower chamber 20 via the passage in the plurality of passage holes 38M and the annular groove 55M, the passage between the main valve 91M and the valve seat portion 48M, the chamber 875, the passage in the through hole 826 of the first case member 800, the upper chamber communication chamber 871, the variable passage 873 in a state in which the flow path cross-sectional area is expanded, the lower chamber communication chamber 872, the passage in the passage groove 834 of the second case member 806. As a result, even in the normal speed region, the damping force of the valve characteristics (the characteristics in which the damping force is substantially proportional to the piston speed) can be obtained.

Between the first damping force generating mechanism 42M on a contraction side and the second damping force generating mechanism 892 on an extension side, the main valve 71M of the first damping force generating mechanism 42M has a rigidity and a valve opening pressure higher than those of the sub valve 861 of the second damping force generating mechanism 892. Therefore, in the contraction stroke, in the extremely low speed region in which the piston speed is lower than a predetermined value, the valve of the second damping force generating mechanism 892 is opened in a state in which the valve of the first damping force generating mechanism 42M is closed, and in a normal speed region in which the piston speed is higher than the predetermined value, the valve of the first damping force generating mechanism 42M and the valve of the second damping force generating mechanism 892 are both opened.

That is, in the contraction stroke, the piston 18M moves to the lower chamber 20 side, and thus the pressure in the lower chamber 20 increases and the pressure in the upper chamber 19 decreases, but in the contraction stroke in which the piston speed is low, the passage portion 881 allows the upper chamber 19 and the lower chamber 20 communicate with each other via the variable passage 873 in a state in which the flow path cross-sectional area is the smallest. Therefore, the oil liquid in the lower chamber 20 flows to the upper chamber 19 via the passage in the passage groove 834 of the second case member 806, the lower chamber communication chamber 872, the variable passage 873 in a state in which the flow path cross-sectional area is the smallest, the upper chamber communication chamber 871, the passage in the through hole 826 of the first case member 800, the chamber 875, the orifice 882, and the passage in the annular groove 55M and the plurality of passage holes 38M of the piston 18M.

Then, in an extremely low speed region in which the piston speed is higher than this, the sub valve 861 of the second damping force generating mechanism 892 is deformed toward the upper chamber communication chamber 871 and opened in a state in which the valve of the first damping force generating mechanism 42M is closed. At this time, as the piston speed increases, the amount of deformation of the sub valve 861 toward the upper chamber communication chamber 871 increases, and the variable passage 873 with the passage forming portion 832 expands. As a result, even in the extremely low speed region, the damping force of the valve characteristics (the characteristics in which the damping force is substantially proportional to the piston speed) can be obtained.

Further, in the contraction stroke, in the normal speed region in which the piston speed is higher, the valve of the first damping force generating mechanism 42M is opened while a state in which the sub valve 861 of the second damping force generating mechanism 892 is deformed toward the upper chamber communication chamber 871 to increase a valve opening amount remains as described above. That is, the sub valve 861 is deformed toward the upper chamber communication chamber 871, and the oil liquid flows from the lower chamber 20 to the upper chamber 19 through the passage portion 881 including the variable passage 873, but at this time, in the passage portion 881, the flow rate of the oil liquid is throttled by the orifice 882 in one flow, and thus a differential pressure generated at the main valve 71M increases in the other flow, the main valve 71M is separated from the valve seat portion 50M, and the oil liquid flows from the lower chamber 20 to the upper chamber 19. Therefore, the oil liquid in the lower chamber 20 flows via the passage in the passage groove 834 of the second case member 806, the lower chamber communication chamber 872, the variable passage 873 in a state in which the flow path cross-sectional area is expanded, the upper chamber communication chamber 871, the passage in the through hole 826 of the first case member 800, the chamber 875, the passage in the plurality of passage holes 39M, and the passage between the main valve 71M and the valve seat portion 50M. As a result, even in the normal speed region, the damping force of the valve characteristics (the characteristics in which the damping force is substantially proportional to the piston speed) can be obtained.

The shock absorber 1M of the thirteenth embodiment is provided with a passage 901 that allows the chamber 875 and the lower chamber 20 to communicate with each other. In the second damping force generating mechanism 892, an accumulator 565M is provided in the passage 901. In this case, the intermediate chamber 147 of a volume variable mechanism 185M is connected to a communication portion of the passage 901 with the chamber 875, and the communication chamber 149 of a volume variable mechanism 561M is connected to a communication portion of the passage 901 with the lower chamber 20. The volume variable mechanism 561M has the communication passage 148 as an orifice between the communication chamber 149 and the lower chamber 20.

The shock absorber 1M of the thirteenth embodiment has the same hydraulic circuit diagram as that of the eleventh embodiment and has the same operation and effect as those of the eleventh embodiment.

Also in the above thirteenth embodiment, the second damping force generating mechanism 892 is provided on the lower chamber 20 side which is one of the upper chamber 19 and the lower chamber 20, but it can also be provided on the upper chamber 19 side.

In the above embodiment, a configuration in which the bottomed tubular cap member is provided between the piston and the valve seat member, the flexible member that closes the communication passage of the bottom portion of the cap member is provided in the cap chamber, and the intermediate chamber in which the communication with the communication passage is blocked by the flexible member is formed between the flexible member and the valve seat member is shown. However, the present invention is not limited to this, and as shown in, for example, Japanese Unexamined Patent Application, First Publication No. 2015-232403, a member forming the intermediate chamber may be provided separately.

The first to thirteenth embodiments show examples in which the present invention is applied to a mono-tube type hydraulic shock absorber, but the present invention is not limited to this, and the present invention may be used for a double-tube type hydraulic shock absorber in which the cylinder is constituted by an outer tube and an inner tube and a reservoir chamber is formed between the outer tube and the inner tube, and it is possible to use the present invention for any shock absorber including a pressure control valve that uses a packing valve having a structure in which the disk is provided with a sealing member.

In the first to thirteenth embodiments, the first passage, the second passage, the first damping force generating mechanism, and the second damping force generating mechanism are provided in a part such as the piston that moves integrally with the piston rod, but the present invention is not limited to this. For example, in a case of a double-tube type shock absorber, the first passage, the second passage, the first damping force generating mechanism, and the second damping force generating mechanism may be provided in a bottom valve provided on a side of the cylinder opposite to a side where the piston rod extends. Further, the first passage, the second passage, the first damping force generating mechanism, and the second damping force generating mechanism may be provided in a horizontal valve attached to the outer peripheral surface of the cylinder.

A first aspect of the embodiment described above includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows due to movement of the piston; a first damping force generating mechanism which is provided in the first passage and generates a damping force; and a second damping force generating mechanism which is provided in the second passage and generates a damping force. The second damping force generating mechanism includes a sub valve provided on one side of the second passage, and a volume variable mechanism that changes a volume of a volume chamber provided in parallel with the second passage. Therefore, it is possible to suppress the generation of abnormal noise.

According to a second aspect, in the first aspect, the volume variable mechanism includes the volume chamber and a moving member that moves to change the volume of the volume chamber.

According to a third aspect, in the first or second aspect, when a frequency thereof exceeds a predetermined frequency, a flow rate to the sub valve is limited by the volume variable mechanism.

According to a fourth aspect, in any one of the first to third aspects, the first passage and the second passage are connected in series.

According to a fifth aspect, in any one of the first to third aspects, the first passage and the second passage are connected in parallel.

A sixth aspect includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows due to movement of the piston; a first damping force generating mechanism which is provided in the first passage and generates a damping force; and a second damping force generating mechanism which is provided in the second passage and generates a damping force. The second damping force generating mechanism includes one side sub valve provided on one side of a valve seat member passage portion provided in a valve seat member of the second passage, and a bottomed tubular cap member provided between the piston and the valve seat member in the second passage. The valve seat member is provided in the cap member, and the one side sub valve is provided in a cap chamber between a bottom portion of the cap member and the valve seat member. In the second passage, an orifice is disposed on an upstream side or a downstream side from the one side sub valve in flow by which the one side sub valve is opened. In a region in which a piston speed is low, the one side sub valve is opened in a state in which a valve of the first damping force generating mechanism is closed. In a speed region in which the piston speed is higher than that in the region in which the piston speed is low, the valve of the first damping force generating mechanism and the one side sub valve are both opened. A communication passage communicating with one chamber is formed at the bottom portion of the cap member. In the cap chamber, between the one side sub valve and the bottom portion of the cap member, a movable moving member is provided. The other aspect of the present invention further includes a volume variable mechanism in which an intermediate chamber whose volume is changed by movement of the moving member is formed between the moving member and the one side sub valve.

According to a seventh aspect, the sixth aspect further includes: the other side sub valve provided on the other side of the valve seat member passage portion and provided in the one chamber; and a volume variable mechanism in which a volume chamber whose volume is changed by movement of the moving member is formed between the moving member and the other side sub valve via the one chamber.

According to an eighth aspect, in the sixth or seventh aspect, an O-ring is provided at least one of between the moving member and the bottom portion of the cap member and between the moving member and the one side sub valve.

According to a ninth aspect, in the seventh aspect, the moving member is supported by two conical disk springs, and these conical disk springs are disposed such that their concave sides face each other in a natural state.

A tenth aspect includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows from the chamber on an upstream side to the chamber on a downstream side in the cylinder due to movement of the piston; a first damping force generating mechanism which is provided in the first passage formed in the piston and generates a damping force; and a second damping force generating mechanism which is provided in an annular valve seat member disposed in one of the two chambers, is provided in the second passage which is parallel to the first passage, and generates a damping force, wherein the second damping force generating mechanism includes a first sub valve provided on one side of a valve seat member passage portion provided in the valve seat member of the second passage and a second sub valve provided on the other side thereof, and a bottomed tubular cap member provided between the piston and the valve seat member in the second passage, wherein the valve seat member is provided in the cap member, the first sub valve is provided in the one chamber, and the second sub valve is provided in a cap chamber between a bottom portion of the cap member and the valve seat member, wherein, in the second passage, an orifice is disposed on an upstream side or a downstream side from the first sub valve in flow by which the first sub valve is opened, wherein, in a region in which a piston speed is low, a valve of the second damping force generating mechanism is opened in a state in which a valve of the first damping force generating mechanism is closed, wherein, in a speed region in which the piston speed is higher than that in the region in which the piston speed is low, the valve of the first damping force generating mechanism and the valve of the second damping force generating mechanism are both opened, wherein a communication passage communicating with the one chamber is formed at the bottom portion of the cap member, wherein, in the cap chamber, between the second sub valve and the bottom portion of the cap member, a flexible member that closes the communication passage is provided, and wherein an intermediate chamber of which communication with the communication passage is blocked by the flexible member is formed between the flexible member and the second sub valve. Therefore, it is possible to suppress the generation of abnormal noise.

According to an eleventh aspect, in the tenth aspect, a flexible member side protruding portion which is constantly in contact with the bottom portion of the cap member is integrally formed with the flexible member.

According to a twelfth aspect, in the tenth or eleventh aspect, a cap member side protruding portion which is constantly in contact with the flexible member is integrally formed with the bottom portion of the cap member.

According to a thirteenth aspect, in any one of the tenth to thirteenth aspects, the valve seat member passage portion has a passage portion on an extension side and a passage portion on a contraction side, and a plurality of the passage portions on an extension side and a plurality of the passage portions on a contraction side are alternately provided on the same circumference.

A fourteenth aspect includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows from the chamber on an upstream side to the chamber on a downstream side in the cylinder due to movement of the piston; a first damping force generating mechanism which is provided in the first passage formed in the piston and generates a damping force; and a second damping force generating mechanism which is provided in an annular valve seat member disposed in one of the two chambers, is provided in the second passage which is parallel to the first passage, and generates a damping force, wherein the second damping force generating mechanism includes a first sub valve provided on one side of a valve seat member passage portion provided in the valve seat member of the second passage, and a bottomed tubular cap member provided between the piston and the valve seat member in the second passage, wherein the valve seat member is provided in the cap member, and the first sub valve is provided in the one chamber, wherein, in the second passage, an orifice is disposed on an upstream side or a downstream side from the first sub valve in flow by which the first sub valve is opened, wherein, in a region in which a piston speed is low, a valve of the second damping force generating mechanism is opened in a state in which a valve of the first damping force generating mechanism is closed, wherein, in a speed region in which the piston speed is higher than that in the region in which the piston speed is low, the valve of the first damping force generating mechanism and the valve of the second damping force generating mechanism are both opened, wherein a communication passage communicating with the one chamber is formed at the bottom portion of the cap member, wherein a flexible member that closes the communication passage is provided in a cap chamber between the bottom portion of the cap member and the valve seat member, and wherein an intermediate chamber of which communication with the communication passage is blocked by the flexible member is formed between the flexible member and the valve seat member.

A fifteenth aspect includes: a cylinder which is filled with a working fluid; a piston which is slidably provided in the cylinder and divides an inside of the cylinder into two chambers; a piston rod which is connected to the piston and extends outside the cylinder; a first passage and a second passage through which the working fluid flows from the chamber on an upstream side to the chamber on a downstream side in the cylinder due to movement of the piston; a first damping force generating mechanism which is provided in the first passage formed in the piston and generates a damping force; and a second damping force generating mechanism which is provided in an annular valve seat member disposed in one of the two chambers, is provided in the second passage which is parallel to the first passage, and generates a damping force, wherein the second damping force generating mechanism includes a first sub valve provided on one side of a valve seat member passage portion provided in the valve seat member of the second passage, wherein, in the valve seat member, the first sub valve is provided in the one chamber, wherein, in the second passage, an orifice is disposed on an upstream side or a downstream side from the first sub valve in flow by which the first sub valve is opened, wherein, in a region in which a piston speed is low, a valve of the second damping force generating mechanism is opened in a state in which a valve of the first damping force generating mechanism is closed, wherein, in a speed region in which the piston speed is higher than that in the region in which the piston speed is low, the valve of the first damping force generating mechanism and the valve of the second damping force generating mechanism are both opened, wherein a housing in which at least a part of the second passage is formed and a free piston which is provided in the housing to be movable and divides the second passage into an upstream side and a downstream side are provided, and wherein an intermediate chamber of which communication with the second passage is blocked by the free piston is formed.

INDUSTRIAL APPLICABILITY

According to the above-mentioned shock absorber, it is possible to suppress the generation of abnormal noise.

| [Reference Signs List] | |
| --- | --- |
| 1, 1A to 1M | Shock absorber |
| 2 | Cylinder |
| 18, 18M | Piston |
| 19 | Upper chamber |
| 20 | Lower chamber |

-continued

[Reference Signs List]

| | |
|---|---|
| 21 and 21M | Piston rod |
| 41, 41D, 41K to 41M, 42, 42D, 42K to 42M | First damping force generating mechanism |
| 51 | Piston rod passage portion |
| 72, 71K, 92, 92K, 888, 889 | First passage |
| 100, 100A, 515 | Flexible disk (flexible member, moving member) |
| 101, 101B, 101D, 101G | Cap member |
| 107 | Sub valve (second sub valve, one side sub valve) |
| 109, 109C | Valve seat member |
| 110, 431 | Sub valve (first sub valve, the other side sub valve) |
| 122, 122B, 122D, 122G | Bottom portion |
| 146 | Cap chamber |
| 147 | Intermediate chamber |
| 148 | Communication passage |
| 149 | Communication chamber (volume chamber) |
| 150, 150C | Valve seat member passage portion |
| 151, 151C | First passage portion (passage portion on extension side) |
| 152, 152C | Second passage portion (passage portion on contraction side) |
| 172, 172C, 172K, 182, 182K, 440, 891 | Second passage |
| 173, 173D to 173L, 183, 183, 183B, 183D to 183L, 441, 892 | Second damping force generating mechanism |
| 175 | Orifice |
| 185, 185A, 185B, 185E to 185H, 185J, 185K, 561, 561E to 561H, 561J, 561K | Volume variable mechanism |
| 222 | Radial passage |
| 302 | Disk protruding portion (flexible member side protruding portion) |
| 321B | Cap protruding portion (cap member side protruding portion) |
| 861 | Sub valve |

The invention claimed is:

1. A shock absorber comprising:
a cylinder which is filled with a working fluid;
a piston which is slidably provided in the cylinder and divides an inside of the cylinder into two chambers;
a piston rod which is connected to the piston and extends outside the cylinder;
a first passage and a second passage through which the working fluid flows due to movement of the piston;
a first damping force generating mechanism which is provided in the first passage and generates a damping force; and
a second damping force generating mechanism which is provided in the second passage and generates a damping force,
wherein the second damping force generating mechanism includes
a sub valve provided on one side of the second passage,
a volume variable mechanism that changes a volume of a volume chamber provided in parallel with the second passage, and
wherein, when a frequency thereof exceeds a predetermined frequency, a flow rate to the sub valve is limited by the volume variable mechanism.

2. The shock absorber according to claim 1, wherein the volume variable mechanism includes the volume chamber and a moving member that moves to change the volume of the volume chamber.

3. The shock absorber according to claim 1, wherein the first passage and the second passage are connected in series.

4. The shock absorber according to claim 1, wherein the first passage and the second passage are connected in parallel.

5. A shock absorber comprising:
a cylinder which is filled with a working fluid;
a piston which is slidably provided in the cylinder and divides an inside of the cylinder into two chambers;
a piston rod which is connected to the piston and extends outside the cylinder;
a first passage and a second passage through which the working fluid flows due to movement of the piston;
a first damping force generating mechanism which is provided in the first passage and generates a damping force; and
a second damping force generating mechanism which is provided in the second passage and generates a damping force,
wherein the second damping force generating mechanism includes
one side sub valve provided on one side of a valve seat member passage portion provided in a valve seat member of the second passage, and
a bottomed tubular cap member provided between the piston and the valve seat member in the second passage,
wherein the valve seat member is provided in the cap member, and the one side sub valve is provided in a cap chamber between a bottom portion of the cap member and the valve seat member,
wherein, in the second passage, an orifice is disposed on an upstream side or a downstream side from the one side sub valve in flow by which the one side sub valve is opened,
wherein, in a region in which a piston speed is low, the one side sub valve is opened in a state in which a valve of the first damping force generating mechanism is closed,
wherein, in a speed region in which the piston speed is higher than that in the region in which the piston speed is low, the valve of the first damping force generating mechanism and the one side sub valve are both opened,
wherein a communication passage communicating with one chamber is formed at the bottom portion of the cap member,
wherein, in the cap chamber, between the one side sub valve and the bottom portion of the cap member, a movable moving member is provided, and
wherein the shock absorber further comprises a volume variable mechanism in which an intermediate chamber whose volume is changed by movement of the moving member is formed between the moving member and the one side sub valve.

6. The shock absorber according to claim 5, further comprising:
the other side sub valve provided on the other side of the valve seat member passage portion and provided in the one chamber; and
a volume variable mechanism in which a volume chamber whose volume is changed by movement of the moving member is formed between the moving member and the other side sub valve via the one chamber.

7. The shock absorber according to claim 6, wherein an O-ring is provided at least one of between the moving member and the bottom portion of the cap member and between the moving member and the one side sub valve.

8. The shock absorber according to claim 6, wherein the moving member is supported by two conical disk springs, and the conical disk springs are disposed such that their concave sides face each other in a natural state.

9. A shock absorber comprising:
a cylinder which is filled with a working fluid;
a piston which is slidably provided in the cylinder and divides an inside of the cylinder into two chambers;
a piston rod which is connected to the piston and extends outside the cylinder;
a first passage and a second passage through which the working fluid flows from the chamber on an upstream side to the chamber on a downstream side in the cylinder due to movement of the piston;
a first damping force generating mechanism which is provided in the first passage formed in the piston and generates a damping force; and
a second damping force generating mechanism which is provided in an annular valve seat member disposed in one of the two chambers, is provided in the second passage which is parallel to the first passage, and generates a damping force,
wherein the second damping force generating mechanism includes
a first sub valve provided on one side of a valve seat member passage portion provided in the valve seat member of the second passage and a second sub valve provided on the other side thereof, and
a bottomed tubular cap member provided between the piston and the valve seat member in the second passage,
wherein the valve seat member is provided in the cap member, the first sub valve is provided in the one chamber, and the second sub valve is provided in a cap chamber between a bottom portion of the cap member and the valve seat member,
wherein, in the second passage, an orifice is disposed on an upstream side or a downstream side from the first sub valve in flow by which the first sub valve is opened,
wherein, in a region in which a piston speed is low, a valve of the second damping force generating mechanism is opened in a state in which a valve of the first damping force generating mechanism is closed,
wherein, in a speed region in which the piston speed is higher than that in the region in which the piston speed is low, the valve of the first damping force generating mechanism and the valve of the second damping force generating mechanism are both opened,
wherein a communication passage communicating with the one chamber is formed at the bottom portion of the cap member,
wherein, in the cap chamber, between the second sub valve and the bottom portion of the cap member, a flexible member that closes the communication passage is provided, and
wherein an intermediate chamber of which communication with the communication passage is blocked by the flexible member is formed between the flexible member and the second sub valve.

10. The shock absorber according to claim 9, wherein a flexible member side protruding portion which is constantly in contact with the bottom portion of the cap member is integrally formed with the flexible member.

11. The shock absorber according to claim 9, wherein a cap member side protruding portion which is constantly in contact with the flexible member is integrally formed with the bottom portion of the cap member.

12. The shock absorber according to claim 9, wherein the valve seat member passage portion has a passage portion on an extension side and a passage portion on a contraction side, and a plurality of the passage portions on an extension side and a plurality of the passage portions on a contraction side are alternately provided on the same circumference.

13. A shock absorber comprising:
a cylinder which is filled with a working fluid;
a piston which is slidably provided in the cylinder and divides an inside of the cylinder into two chambers;
a piston rod which is connected to the piston and extends outside the cylinder;
a first passage and a second passage through which the working fluid flows from the chamber on an upstream side to the chamber on a downstream side in the cylinder due to movement of the piston;
a first damping force generating mechanism which is provided in the first passage formed in the piston and generates a damping force; and
a second damping force generating mechanism which is provided in an annular valve seat member disposed in one of the two chambers, is provided in the second passage which is parallel to the first passage, and generates a damping force,
wherein the second damping force generating mechanism includes
a first sub valve provided on one side of a valve seat member passage portion provided in the valve seat member of the second passage, and
a bottomed tubular cap member provided between the piston and the valve seat member in the second passage,
wherein the valve seat member is provided in the cap member, and the first sub valve is provided in the one chamber,
wherein, in the second passage, an orifice is disposed on an upstream side or a downstream side from the first sub valve in flow by which the first sub valve is opened,
wherein, in a region in which a piston speed is low, a valve of the second damping force generating mechanism is opened in a state in which a valve of the first damping force generating mechanism is closed,
wherein, in a speed region in which the piston speed is higher than that in the region in which the piston speed is low, the valve of the first damping force generating mechanism and the valve of the second damping force generating mechanism are both opened,
wherein a communication passage communicating with the one chamber is formed at the bottom portion of the cap member,
wherein a flexible member that closes the communication passage is provided in a cap chamber between the bottom portion of the cap member and the valve seat member, and
wherein an intermediate chamber of which communication with the communication passage is blocked by the flexible member is formed between the flexible member and the valve seat member.

* * * * *